(12) United States Patent
Uotani et al.

(10) Patent No.: US 10,364,360 B2
(45) Date of Patent: *Jul. 30, 2019

(54) SURFACE COATING MATERIAL, COATING FILM, AND HYDROPHILIC OIL REPELLENT MEMBER

(71) Applicants: MITSUBISHI MATERIALS CORPORATION, Tokyo (JP); Mitsubishi Materials Electronic Chemicals Co., Ltd., Akita-shi (JP)

(72) Inventors: Masakazu Uotani, Akita (JP); Hiroshi Koshiyama, Akita (JP); Takeshi Kamiya, Akita (JP); Tsunetoshi Honda, Akita (JP); Kosei Sato, Akita (JP); Masato Fujita, Akita (JP); Daisuke Takano, Saitama (JP)

(73) Assignees: Mitsubishi Materials Corporation, Tokyo (JP); Mitsubishi Materials Electronic Chemicals Co., Ltd., Akita-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/329,426

(22) PCT Filed: Jul. 30, 2015

(86) PCT No.: PCT/JP2015/071661
§ 371 (c)(1),
(2) Date: Jan. 26, 2017

(87) PCT Pub. No.: WO2016/017761
PCT Pub. Date: Feb. 4, 2016

(65) Prior Publication Data
US 2017/0210916 A1    Jul. 27, 2017

(30) Foreign Application Priority Data

Jul. 30, 2014 (JP) .................. 2014-155553
Jul. 30, 2014 (JP) .................. 2014-155554
Oct. 7, 2014 (JP) .................. 2014-206782
Oct. 7, 2014 (JP) .................. 2014-206793
Oct. 7, 2014 (JP) .................. 2014-206795
Apr. 7, 2015 (JP) .................. 2015-078567

(51) Int. Cl.
| | |
|---|---|
| C09D 7/63 | (2018.01) |
| C09D 5/00 | (2006.01) |
| C09D 201/00 | (2006.01) |
| A41D 13/04 | (2006.01) |
| A41D 19/015 | (2006.01) |
| A43B 13/04 | (2006.01) |
| A43B 13/22 | (2006.01) |
| A43B 7/12 | (2006.01) |
| B05D 5/00 | (2006.01) |
| B05D 7/24 | (2006.01) |
| C09D 7/40 | (2018.01) |
| C09D 201/04 | (2006.01) |
| C09D 201/06 | (2006.01) |
| C09D 201/02 | (2006.01) |
| C09D 201/08 | (2006.01) |
| B32B 27/18 | (2006.01) |
| C09D 5/16 | (2006.01) |
| C09K 3/00 | (2006.01) |

(52) U.S. Cl.
CPC .............. *C09D 7/63* (2018.01); *A41D 13/04* (2013.01); *A41D 19/01558* (2013.01); *A43B 7/12* (2013.01); *A43B 13/04* (2013.01); *A43B 13/223* (2013.01); *B05D 5/00* (2013.01); *B05D 7/24* (2013.01); *B32B 27/18* (2013.01); *C09D 5/00* (2013.01); *C09D 5/16* (2013.01); *C09D 7/40* (2018.01); *C09D 201/00* (2013.01); *C09D 201/02* (2013.01); *C09D 201/025* (2013.01); *C09D 201/04* (2013.01); *C09D 201/06* (2013.01); *C09D 201/08* (2013.01); *C09K 3/00* (2013.01); *A41D 2500/54* (2013.01); *A41D 2600/20* (2013.01)

(58) Field of Classification Search
CPC .............. A41D 13/04; A41D 19/01558; A41D 2500/54; A41D 2600/20; A43B 13/04; A43B 13/223; A43B 7/12; B05D 5/00; B05D 7/24; C09D 5/00; C09D 7/1233
See application file for complete search history.

(56) References Cited

U.S. PATENT DOCUMENTS

| | | |
|---|---|---|
| 2,266,350 A | 12/1941 | Womack |
| 3,471,484 A | 10/1969 | Guenthner |
| 4,859,754 A | 8/1989 | Maekawa et al. |

(Continued)

FOREIGN PATENT DOCUMENTS

| | | |
|---|---|---|
| CN | 1805774 A | 7/2006 |
| GB | 1512348 A | 6/1978 |

(Continued)

OTHER PUBLICATIONS

English translation Japanese Patent No. 4406700 B2 (2009).*
International Search Report dated Oct. 20, 2015, issued for PCT/JP2015/071489 and English translation thereof.
International Search Report dated Oct. 20, 2015, issued for PCT/JP2015/071635 and English translation thereof.
International Search Report dated Oct. 20, 2015, issued for PCT/JP2015/071680 and English translation thereof.
International Search Report dated Oct. 27, 2015, issued for PCT/JP2015/071684 and English translation thereof.

(Continued)

*Primary Examiner* — John Kim
(74) *Attorney, Agent, or Firm* — Locke Lord LLP

(57) ABSTRACT

A surface coating material is provided for forming a hydrophilic oil repellent layer on at least a part of the surface of a substrate, and the surface coating material includes one or more fluorine-based compounds represented by the following formulas (1) to (4), a binder, and a solvent.

20 Claims, 4 Drawing Sheets

(56) References Cited

U.S. PATENT DOCUMENTS

| | | | |
|---|---|---|---|
| 5,443,724 | A | 8/1995 | Williamson et al. |
| 6,207,777 | B1 | 3/2001 | Shimada et al. |
| 2002/0004107 | A1 | 1/2002 | Rogers |
| 2009/0317621 | A1 | 12/2009 | Youngblood et al. |

FOREIGN PATENT DOCUMENTS

| | | | |
|---|---|---|---|
| GB | 2354458 A | 3/2001 | |
| JP | 45-002299 B | 1/1970 | |
| JP | 45-006006 B1 | 2/1970 | |
| JP | 46-031802 Y | 11/1971 | |
| JP | 49-040734 B1 | 11/1974 | |
| JP | 51-012462 A | 1/1976 | |
| JP | 51-012463 | 1/1976 | |
| JP | 51-059133 U | 5/1976 | |
| JP | 52-021130 U | 2/1977 | |
| JP | 52-052182 A | 4/1977 | |
| JP | 52-074960 A | 6/1977 | |
| JP | 52-090861 A | 7/1977 | |
| JP | 53-109266 A | 9/1978 | |
| JP | 53-111569 A | 9/1978 | |
| JP | 54-061362 A | 5/1979 | |
| JP | 60-139306 A | 7/1985 | |
| JP | 61-257211 A | 11/1986 | |
| JP | 62-035738 Y | 9/1987 | |
| JP | 63-037187 U | 3/1988 | |
| JP | 03-060791 A | 3/1991 | |
| JP | 03-144006 A | 6/1991 | |
| JP | 05-058970 A | 3/1993 | |
| JP | 05-137903 A | 6/1993 | |
| JP | 05-177766 A | 7/1993 | |
| JP | 05-272027 A | 10/1993 | |
| JP | 05-285305 A | 11/1993 | |
| JP | 05-329476 A | 12/1993 | |
| JP | 05-331455 A | 12/1993 | |
| JP | 06-134300 A | 5/1994 | |
| JP | 07-004535 U | 1/1995 | |
| JP | 07-024212 A | 1/1995 | |
| JP | 07-048464 A | 2/1995 | |
| JP | H07-204505 A | 8/1995 | |
| JP | 07-265605 A | 10/1995 | |
| JP | 07-284606 A | 10/1995 | |
| JP | 07-289801 A | 11/1995 | |
| JP | 08-243558 A | 9/1996 | |
| JP | 09-094401 A | 4/1997 | |
| JP | 09-227160 A | 9/1997 | |
| JP | 10-006973 A | 1/1998 | |
| JP | 10-007742 A | 1/1998 | |
| JP | 10-103816 A | 4/1998 | |
| JP | 10-204860 A | 8/1998 | |
| JP | 11-021866 A | 1/1999 | |
| JP | 11-114304 A | 4/1999 | |
| JP | 11-156104 A | 6/1999 | |
| JP | 11-244671 A | 9/1999 | |
| JP | 11-323812 A | 11/1999 | |
| JP | 2000-024656 A | 1/2000 | |
| JP | 2000-096082 A | 4/2000 | |
| JP | 2000-126505 A | 5/2000 | |
| JP | 2000-189954 A | 7/2000 | |
| JP | 2000-288303 A | 10/2000 | |
| JP | 2000-342359 A | 12/2000 | |
| JP | 2001-000960 A | 1/2001 | |
| JP | 2001-004125 A | 1/2001 | |
| JP | 2001-164450 A | 6/2001 | |
| JP | 2001-220374 A | 8/2001 | |
| JP | 2002-105433 A | 4/2002 | |
| JP | 2002-113301 A | 4/2002 | |
| JP | 2002-266329 A | 9/2002 | |
| JP | 2003-166173 A | 6/2003 | |
| JP | 2003-227117 A | 8/2003 | |
| JP | 2003-267900 A | 9/2003 | |
| JP | 2004-098047 A | 4/2004 | |
| JP | 2004-230278 A | 8/2004 | |
| JP | 2004-298711 A | 10/2004 | |
| JP | 2005-074316 A | 3/2005 | |
| JP | 2005-144436 A | 6/2005 | |
| JP | 2005-330354 A | 12/2005 | |
| JP | 2006-110452 A | 4/2006 | |
| JP | 2006-130743 A | 5/2006 | |
| JP | 2006-198483 A | 8/2006 | |
| JP | 2006-200269 A | 8/2006 | |
| JP | 2006-292326 A | 10/2006 | |
| JP | 2007-144239 A | 6/2007 | |
| JP | 2007-216184 A | 8/2007 | |
| JP | 2007-326821 A | 12/2007 | |
| JP | 2007-326836 A | 12/2007 | |
| JP | 2008-031511 A | 2/2008 | |
| JP | 2008-062127 A | 3/2008 | |
| JP | 2009-061376 A | 3/2009 | |
| JP | 2009-127015 A | 6/2009 | |
| JP | 2009-133173 A | 6/2009 | |
| JP | 4406700 B2 | 2/2010 | |
| JP | 2010-159563 A | 7/2010 | |
| JP | 2010-201321 A | 9/2010 | |
| JP | 2011-011172 A | 1/2011 | |
| JP | 2013-188680 A | 9/2013 | |
| JP | 2013-202569 A | 10/2013 | |
| JP | 2014-036931 A | 2/2014 | |
| JP | 2014-057920 A | 4/2014 | |
| JP | 2014-148504 A | 8/2014 | |
| JP | 2014-148670 A | 8/2014 | |
| JP | 2014-158996 A | 9/2014 | |
| KR | 10-2015-0001082 A | 1/2015 | |
| WO | 97/036951 A1 | 10/1997 | |
| WO | 2013/111372 A1 | 8/2013 | |
| WO | 2013/145372 A1 | 10/2013 | |

OTHER PUBLICATIONS

International Search Report dated Oct. 20, 2015, issued for PCT/JP2015/071544 and English translation thereof.
International Search Report dated Oct. 27, 2015, issued for PCT/JP2015/071661 and English translation thereof.
Search Report dated Jan. 4, 2018, issued for the European Patent Application No. 15827683.2.
Search Report dated Jan. 8, 2018, issued for the European Patent Application No. 15827639.4.
Search Report dated Jan. 15, 2018, issued for the European Patent Application No. 15827185.8.
Office Action dated May 15, 2018, issued for the Chinese patent application No. 201580041432.X and a partial English translation of the Search Report.
Office Action dated Aug. 21, 2018, issued for the Japanese patent application No. 2014-238242 and English translation thereof.
Office Action dated Aug. 21, 2018, issued for the Japanese patent application No. 2014-256646 and English translation thereof.
Office Action dated Jul. 24, 2018, issued for the Japanese patent application No. 2015-013505 and English translation thereof.
Office Action dated Jul. 24, 2018, issued for the Japanese patent application No. 2015-013696 and English translation thereof.
Office Action dated Nov. 20, 2018, issued for the Japanese patent application No. 2015-013695 and English translation thereof.
Office Action dated Sep. 11, 2018, issued for the Japanese patent application No. 2015-009441 and English translation thereof.
Office Action dated Sep. 11, 2018, issued for the Japanese patent application No. 2015-013699 and English translation thereof.
Office Action dated Sep. 25, 2018, issued for the Japanese patent application No. 2015-007194 and English translation thereof.
Office Action dated Sep. 25, 2018, issued for the Japanese patent application No. 2015-009440 and English translation thereof.
Office Action dated Feb. 26, 2019, issued for the Japanese patent application No. 2015-084239 and English translation thereof.
Office Action dated Feb. 26, 2019, issued for the Japanese patent application No. 2015-086020 and English translation thereof.
Office Action dated Feb. 26, 2019, issued for the Japanese patent application No. 2015-105865 and English translation thereof.
Notice of Allowance dated Mar. 5, 2019, issued for the Japanese patent application No. 2015-147198 and English translation thereof.

* cited by examiner

SURFACE COATING MATERIAL, COATING FILM, AND HYDROPHILIC OIL REPELLENT MEMBER

CROSS REFERENCE TO RELATED APPLICATIONS

This application is related to three co-pending applications: "OIL-WATER SEPARATION APPARATUS AND DRAINAGE SYSTEM" filed even date herewith in the names of Kosei SATO; Masato FUJITA; Masakazu UOTANI; Hiroshi KOSHIYAMA; Takeshi KAMIYA; Tsunetoshi HONDA; Hiroyuki IMAI and Daisuke TAKANO as a national phase entry of PCT/JP2015/071544; and "HYDROPHILIC OIL REPELLENT AND PRODUCTION METHOD OF SAME, SURFACE COATING MATERIAL, COATING FILM, RESIN COMPOSITION, OIL-WATER SEPARATION FILTER MATERIAL, AND POROUS BODY" filed even date herewith in the names of Masato FUJITA; Masakazu UOTANI; Takeshi KAMIYA; Tsunetoshi HONDA and Daisuke TAKANO as a national phase entry of PCT/JP2015/071489; which applications are assigned to the assignee of the present application and all three incorporated by reference herein.

TECHNICAL FIELD

The present invention relates to a surface coating material, a coating film, and a hydrophilic oil repellent member.

Priority is claimed on Japanese Patent Application No. 2014-155553, Japanese Patent Application No. 2014-155554, filed on Jul. 30, 2014, Japanese Patent Application No. 2014-206782, Japanese Patent Application No. 2014-206793, Japanese Patent Application No. 2014-206795, filed on Oct. 7, 2014, and Japanese Patent Application No. 2015-078567 filed on Apr. 7, 2015, the contents of which are incorporated herein by reference.

BACKGROUND ART

In the related art, to make it difficult for stains to adhere to the surface of various substrates and allow stains to be easily removed by washing with water, many techniques and materials for imparting hydrophilicity and oil repellency to the surface have been proposed.

Specifically, in Patent Document 1, a technique of performing a surface treatment of glass using a water and oil repellent in the related art is described. However, in this case, there is a problem in that fine water droplets remain on the surface of the glass, and due to this, spots are formed. To solve this problem, a hydrophilic oil repellent treatment agent obtained by combining both a fluorine-containing silane compound and a hydrophilic silane compound has been proposed.

In addition, in Patent Document 2, a surface-modifying agent formed of a copolymer of a fluorine-based vinyl monomer having a fluoroalkyl group, a cationic, anionic, or nonionic vinyl monomer, and the like is disclosed. Furthermore, in Patent Document 2, a method of imparting antifouling properties and antifogging properties by applying the surface-modifying agent to a slide glass and forming a hydrophilic oil repellent layer on the surface of the slide glass as a substrate is disclosed.

In addition, in Patent Document 3, a method of forming a film on a glass surface and imparting durability, easy cleaning properties, and antifogging properties by performing a plasma treatment in an atmosphere in which an oxygen-containing compound having a perfluorocarbon and an oxygen atom and having neither a C—H bond nor a halogen atom is present is disclosed.

In addition, in Patent Document 4, a method of exerting antifouling properties and easy cleaning properties by a coating film containing a fluorine-based oligomer having a hydrophilic group and an oil repellent group, although sufficient antifouling properties cannot be exerted in water and oil repellent coating and hydrophilic and lipophilic coating, is disclosed.

The techniques disclosed in these Patent Documents 1 to 4 are expected to be applied to applications in which hydrophilicity and oil repellency is imparted to a substrate (surface of a substrate) and to obtain antifouling properties and anti-fogging properties.

CITATION LIST

Patent Literature

[Patent Document 1] Japanese Unexamined Patent Application, First Publication No. H05-331455
[Patent Document 2] Japanese Unexamined Patent Application, First Publication No. 2002-105433
[Patent Document 3] Japanese Unexamined Patent Application, First Publication No. 2008-031511
[Patent Document 4] Japanese Unexamined Patent Application, First Publication No. 2009-127015

SUMMARY OF INVENTION

Technical Problem

However, in the techniques disclosed in Patent Documents 1 to 4, if cleaning is performed once after being contaminated, hydrophilicity and oil repellency disappears, and there is a problem in sustainability of effect.

In addition, according to the surface-modifying agent disclosed in Patent Document 2, there is a problem that the substrate is limited to glass since a silane-based compound is used. There is a problem that a hydrophilic oil repellent applicable to other substrates has not been found.

Furthermore, in a case where hydrophilicity and oil repellency is exhibited by a combination of compounds, there are problems that it is difficult to align the functions of the hydrophilic group and the oil repellent group in a well-balanced manner, and the coating film formed on the surface of a substrate does not exhibit sufficient hydrophilicity and oil repellency.

The present invention has been made in consideration of the above-described circumstances, and provides a surface coating material capable of imparting sufficient hydrophilicity and oil repellency to various substrates and capable of forming a hydrophilic oil repellent layer (coating film) having excellent sustainability of a hydrophilic oil repellent effect. In addition, the present invention provides a hydrophilic oil repellent member provided with a hydrophilic oil repellent layer (coating film) which exhibits hydrophilicity and oil repellency on a part or all of the surface of the substrate.

Solution to Problem

In a case where a fluorine-based compound is used as a surface treatment agent, the treated surface typically shows water and oil repellency, and as the number of carbon atoms of the fluorine structure increases, the water repellency generally increases. However, as a result of thorough studies, the present inventors found that a compound obtained by adding a hydrophilicity imparting group to a specific nitrogen-containing fluorine-based compound has unusual characteristics which could not be realized with the fluorine-based compounds in the related art, that is, hydrophilicity and oil repellency, and in particular, even a compound in which the number of carbon atoms of the fluorine structure is large exhibits excellent hydrophilicity and excellent oil repellency at the same time, and found a method of fixing the nitrogen-containing fluorine-based compound on the surface of the substrate, and completed the present invention.

The present invention relates to a surface coating material, a coating film, and a hydrophilic oil repellent member in which the above-described problems have been solved by the following configuration.

[1] A surface coating material which forms a hydrophilic oil repellent layer on at least a part of the surface of a substrate, including one or more fluorine-based compounds represented by the following formulas (1) to (4), a binder, and a solvent.

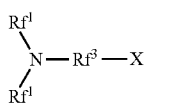
(1)

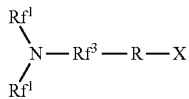
(2)

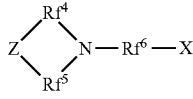
(3)

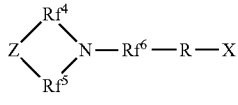
(4)

In the above formulas (1) and (2), $Rf^1$ and $Rf^2$ each represents a linear or branched perfluoroalkyl group having 1 to 6 carbon atoms, which are the same as or different from each other. In addition, $Rf^3$ represents a linear or branched perfluoroalkylene group having 1 to 6 carbon atoms.

In the above formulas (3) and (4), $Rf^4$, $Rf^5$, and $Rf^6$ each represents a linear or branched perfluoroalkylene group having 1 to 6 carbon atoms, which are the same as or different from each other. In addition, Z includes any one of an oxygen atom, a nitrogen atom, a $CF_2$ group, and a CF group.

In addition, in the above formulas (2) and (4), R represents a linking group which is a divalent organic group.

In addition, in the above formulas (1) to (4), X is any one hydrophilicity imparting group selected from the group consisting of anion type hydrophilicity imparting groups, cation type hydrophilicity imparting groups, and amphoteric type hydrophilicity imparting groups.

[2] The surface coating material according to [1], in which the mass composition ratio between the fluorine-based compound and the solvent is within a range of 0.05 to 50:99.95 to 50.

[3] The surface coating material according to [1] or [2], in which the binder includes any one of a resin, a water soluble resin, and water glass.

[4] The surface coating material according to any one of [1] to [3], in which the mass composition ratio between the fluorine-based compound and the binder is within a range of 0.2 to 99.9:99.8 to 0.1.

[5] The surface coating material according to any one of [1] to [4], in which the solvent is water, an organic solvent, or a mixture of water and an organic solvent.

[6] A coating film, including one or more fluorine-based compounds represented by the formulas (1) to (4) and a binder.

[7] A hydrophilic oil repellent member, having a substrate and a hydrophilic oil repellent layer provided on a part or all of the surface of the substrate, in which the hydrophilic oil repellent layer includes one or more fluorine-based compounds represented by the formulas (1) to (4).

[8] The hydrophilic oil repellent member according to [7], in which the hydrophilic oil repellent layer further includes a binder.

[9] The hydrophilic oil repellent member t according to [7] or [8], in which the substrate is any one or a combination of two or more selected from the group consisting of glass, plastic, metal, ceramics, stainless steel, aluminum, wood, stone, cement, concrete, fiber, cloth, paper, and leather.

[10] The hydrophilic oil repellent member according to [7] or [8], in which the substrate is a PET film or a glass plate.

[11] The hydrophilic oil repellent member according to [10], in which the total light transmittance is 90% or greater.

[12] The hydrophilic oil repellent member according to any one of [8] to [11], in which the binder is an organic binder or an inorganic binder.

[13] The hydrophilic oil repellent member according to any one of [7] to [12], in which a static contact angle for water on the surface of the substrate provided with a hydrophilic oil repellent layer is 15° or less, and a static contact angle for n-hexadecane is 65° or greater.

[14] The hydrophilic oil repellent member according to any one of [7] to [13], in which the substrate is a kitchen utensil used in a kitchen or a sanitary utensil used in a sanitary facility.

[15] The hydrophilic oil repellent member according to any one of [7] to [13], in which the substrate is an oil contamination protection tool for preventing sticking of oils.

[16] A production method of a fluorine-based compound (hydrophilic oil repellent) represented by the formulas (1) to (4), in which a carboxylic acid halide or a sulfonic acid halide having a nitrogen-containing perfluoroalkyl group represented by the following formula (5) or (6) is used as a raw material.

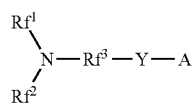
(5)

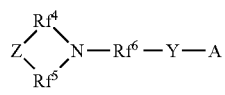
(6)

In the above formula (5), $Rf^1$ and $Rf^2$ each represents a linear or branched perfluoroalkyl group having 1 to 6 carbon atoms, which are the same as or different from each other. In addition, $Rf^3$ represents a linear or branched perfluoroalkylene group having 1 to 6 carbon atoms.

In the above formula (6), $Rf^4$, $Rf^5$, and $Rf^6$ each represents a linear or branched perfluoroalkylene group having 1 to 6 carbon atoms, which are the same as or different from each other. In addition, Z includes any one of an oxygen atom, a nitrogen atom, a $CF_2$ group, and a CF group.

In addition, in the above formulas (5) and (6), Y is CO or $SO_2$.

Furthermore, in the above formulas (5) and (6), A is any one halogen atom selected from the group consisting of fluorine, chlorine, bromine, and iodine.

In the production method of a fluorine-based compound (hydrophilic oil repellent) having such a configuration, a carboxylic acid halide or a sulfonic acid halide having a nitrogen-containing perfluoroalkyl group is used as a raw material, and thus, it is possible to easily synthesize various derivatives.

[17] The surface coating material according to any one of [1] to [5], in which the solvent contains an alcohol-based solvent, a fluorine-based solvent, or a mixed solvent of an alcohol-based solvent and a fluorine-based solvent.

[18] The surface coating material according to [17], in which the alcohol-based solvent contains one or more selected from the group consisting of methanol, ethanol, 1-propanol, 2-propanol, n-butanol, sec-butanol, and t-butanol.

[19] A member with a stain adhesion preventing film, having a main body and a stain adhesion preventing film formed on at least a part of the surface of the main body, in which the stain adhesion preventing film includes one or more fluorine-based compounds represented by the formulas (1) to (4).

Here, the stain adhesion preventing film corresponds to the surface coating layer of the hydrophilic oil repellent member.

In addition, the coating film corresponds to the surface coating layer including the binder or the stain adhesion preventing film.

[20] The member with a stain adhesion preventing film according to [19], in which the main body is a kitchen utensil used in a kitchen, a sanitary utensil used in a sanitary facility, or a resin film.

Since the stain adhesion preventing film including a fluorine-based compound which is a hydrophilic oil repellent is provided on at least a part of the surface of the main body, the member with a stain adhesion preventing film having such a configuration has excellent antifouling properties and easy cleaning properties.

[21] An oil contamination protection tool for preventing sticking of oils, having a substrate covering a part of the body and an oil/water separator having hydrophilicity and oil repellency formed on at least a part of the substrate, in which the oil/water separator includes a fluorine-based compound having an oil repellency imparting group and a hydrophilicity imparting group.

According to the oil contamination protection tool having such a configuration, it is possible to suppress adhesion of fats and oils to the oil contamination protection tool, and even if oil adheres to the oil contamination protection tool, it is possible to easily wash out the adhered oil by washing with water. That is, by the oil/water separator formed on the substrate, hydrophilicity and oil repellency is imparted to the substrate. If oil comes into contact with the substrate on which the oil/water separator has been formed, due to the oil repellency of the oil/water separator, the oil agglomerates as oil droplets having a large static contact angle. Only by shooting out water, due to the hydrophilicity of the oil/water separator, moisture becomes an aqueous layer having a small static contact angle and spreads along the surface of the substrate, and oil droplets are easily peeled off and washed off.

[22] The oil contamination protection tool according to [21], including one or more selected from the compounds having the structure represented by each of the formulas (1) to (4) as the fluorine-based compound.

[23] The oil contamination protection tool according to [21] or [22], in which the oil/water separator configures an oil/water separation layer including the fluorine-based compound and a binder, the oil/water separation layer is formed so as to cover at least a part of the substrate.

[24] The oil contamination protection tool according to any one of [21] to [23], in which the substrate forms a shoe sole configuring a shoe, and the oil/water separator is formed at a groove portion of a tread pattern of the shoe sole.

[25] The oil contamination protection tool according to any one of [21] to [23], in which the substrate forms a glove, and the oil/water separator is formed on at least a holding surface side of the glove.

[26] The oil contamination protection tool according to any one of [21] to [23], in which the substrate forms an apron, and the oil/water separator is formed on at least the surface side of the apron.

[27] The oil contamination protection tool according to any one of [21] to [23], in which the substrate forms working clothes, and the oil/water separator is formed on at least the surface side of the working clothes.

Advantageous Effects of Invention

Since the surface coating material of the present invention includes a fluorine-based compound which is a hydrophilic oil repellent, a binder, and a solvent, it is possible to form a hydrophilic oil repellent layer (coating film) having excellent coatability, capable of imparting sufficient hydrophilicity and oil repellency to various substrates, and having excellent sustainability of a hydrophilic oil repellent effect.

Since the coating film of the present invention includes a fluorine-based compound which is a hydrophilic oil repellent and a binder, the coating film has excellent adhesion to various substrates, and when the coating film is provided on at least a part of the surface of a substrate, it is possible to impart sufficient hydrophilicity and oil repellency.

Since a hydrophilic oil repellent layer is provided on at least a part of the surface of a substrate by the surface coating material described above, the hydrophilic oil repellent member of the present invention shows hydrophilicity and oil repellency.

DESCRIPTION OF EMBODIMENTS

Figure 1:
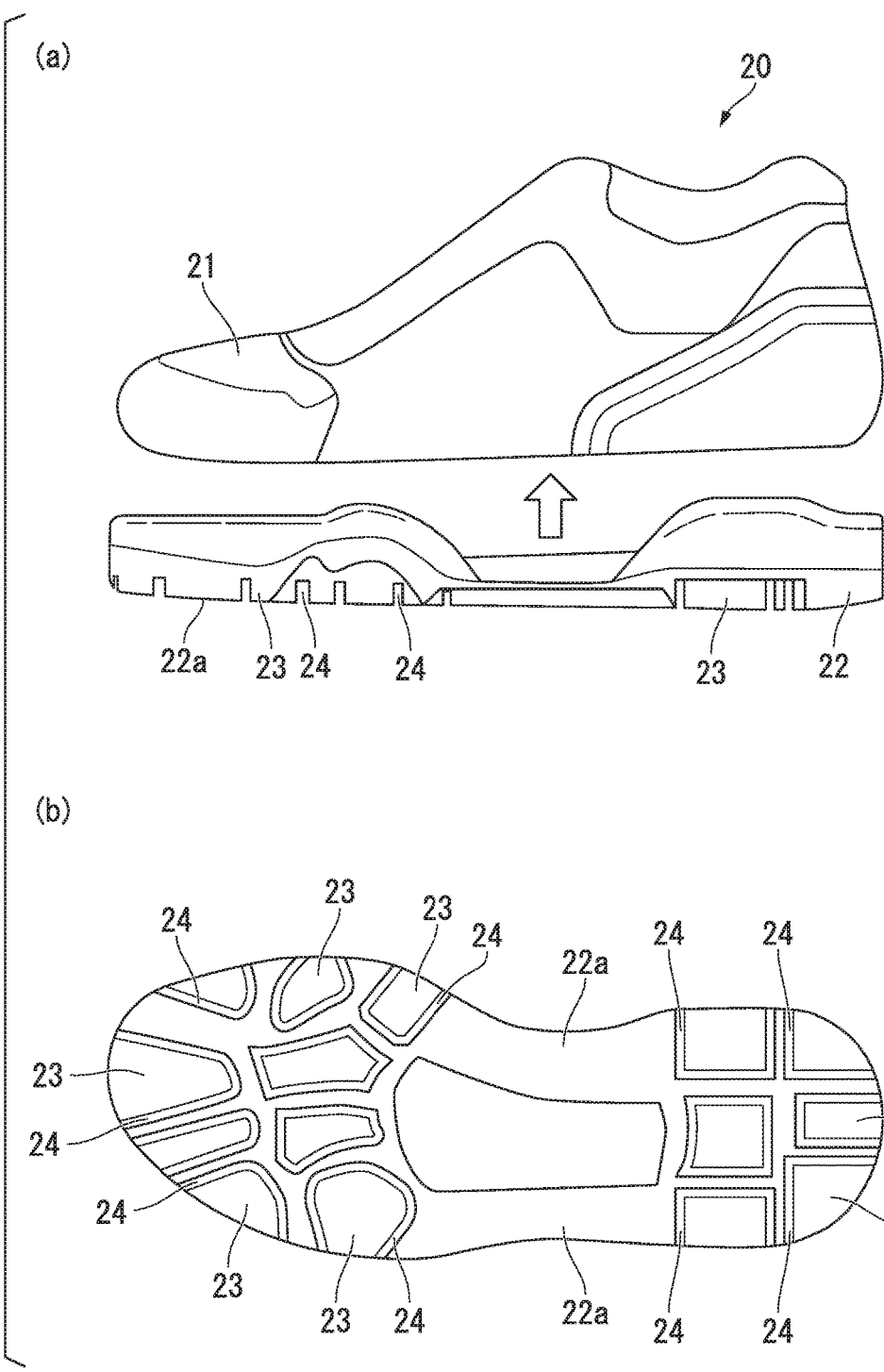
FIG. 1 is a plan view showing a work shoe which is one example of an oil contamination protection tool.

Hereinafter, the surface coating material which is one embodiment to which the present invention has been applied will be described together with a coating film and a hydrophilic oil repellent formed by using the surface coating material.

<Surface Coating Material>

First, the configuration of the surface coating material which is one embodiment to which the present invention is applied will be described.

The surface coating material of the present embodiment is obtained by forming a hydrophilic oil repellent layer (or, "coating film") which exhibits hydrophilicity and oil repellency on a part or all of the surface of a substrate, by applying to various substrates.

Specifically, the surface coating material of the present embodiment includes a nitrogen-containing fluorine-based compound (fluorine-based compound) represented by the following formulas (1) to (4), a binder, and a solvent.

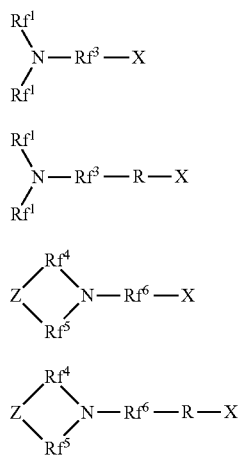

Here, in the above formulas (1) and (2), $Rf^1$ and $Rf^2$ each represents a linear or branched perfluoroalkyl group having 1 to 6 carbon atoms, which are the same as or different from each other. In addition, $Rf^3$ represents a linear or branched perfluoroalkylene group having 1 to 6 carbon atoms.

$Rf^1$ and $Rf^2$ each preferably represents a linear or branched perfluoroalkyl group having 1 to 4 carbon atoms, which are the same as or different from each other. In addition, $Rf^3$ preferably represents a linear or branched perfluoroalkylene group having 1 to 4 carbon atoms.

In addition, in the above formulas (3) and (4), $Rf^4$, $Rf^5$, and $Rf^6$ represents a linear or branched perfluoroalkylene group having 1 to 6 carbon atoms, which are the same as or different from each other. In addition, Z includes any one of an oxygen atom, a nitrogen atom, a $CF_2$ group, and a CF group. In addition, in a case where Z includes a nitrogen atom or a CF group, a perfluoroalkyl group branched from Z may be bonded to Z.

$Rf^4$, $Rf^5$, and $Rf^6$ each preferably represents a linear or branched perfluoroalkylene group having 1 to 4 carbon atoms, which are the same as or different from each other.

In addition, in the above formulas (2) and (4), R represents a linking group which is a divalent organic group. Here, R may be a linear or branched organic group. In addition, R may or may not include one or more types of bonds selected from an ether bond, an ester bond, an amide bond, and a urethane bond in the molecular chain.

In addition, in the above formulas (1) to (4), X is any one hydrophilicity imparting group selected from the group consisting of anion type hydrophilicity imparting groups, cation type hydrophilicity imparting groups, and amphoteric type hydrophilicity imparting groups.

As described above, the nitrogen-containing fluorine-based compound represented by the formulas (1) to (4) is a hydrophilic oil repellent including an oil repellency imparting group and a hydrophilicity imparting group in the molecule. In addition, the surface coating material of the present embodiment may be obtained by using a mixture including two or more fluorine-based compounds selected from the group consisting of nitrogen-containing fluorine-based compounds represented by the formulas (1) to (4) as a hydrophilic oil repellent.

Hereinafter, nitrogen-containing fluorine-based compounds as the hydrophilic oil repellent will be described in detail.

(Hydrophilic Oil Repellent)

"Linear Nitrogen-Containing Fluorine-Based Compound"

In the linear (or branched) nitrogen-containing fluorine-based compound represented by the above formula (1) or (2), a nitrogen-containing perfluoroalkyl group formed of $Rf^1$ and $Rf^2$ and a nitrogen-containing perfluoroalkylene group formed of $Rf^3$ configure an oil repellency imparting group.

In addition, in the nitrogen-containing fluorine-based compound represented by the above formula (1) or (2), the total number of carbon atoms to which fluorine is bonded, in $Rf^1$ to $Rf^3$ which are the oil repellency imparting groups is preferably within a range of 4 to 18. If the number of carbon atoms to which fluorine is bonded is less than 4, since an oil repellent effect is not sufficient, this is not preferable.

Specific examples of the structure of the oil repellency imparting group in the above formula (1) or (2) include structures of the following formulas (7) to (24).

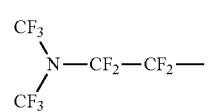

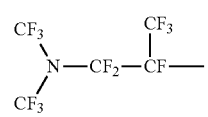

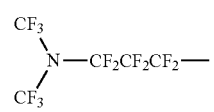

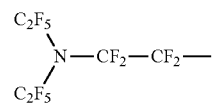

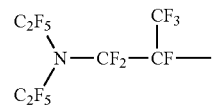

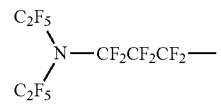

-continued

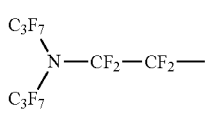 (13)

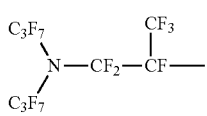 (14)

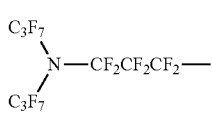 (15)

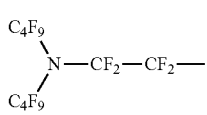 (16)

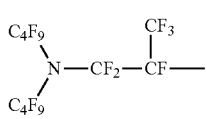 (17)

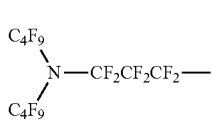 (18)

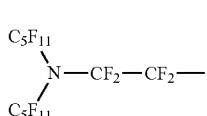 (19)

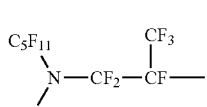 (20)

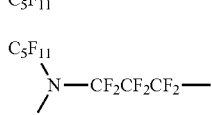 (21)

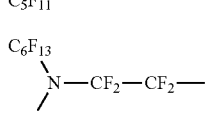 (22)

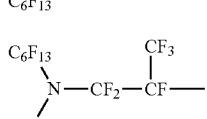 (23)

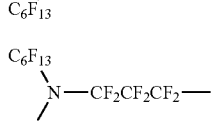 (24)

(Cyclic Nitrogen-Containing Fluorine-Based Compound)

In the cyclic nitrogen-containing fluorine-based compound represented by the above formula (3) or (4), a nitrogen-containing perfluoroalkylene group formed of $Rf^4$, $Rf^5$, and $Rf^6$, and Z configure an oil repellency imparting group.

In addition, in the nitrogen-containing fluorine-based compound represented by the above formula (3) or (4), the total number of carbon atoms to which fluorine is bonded, in $Rf^4$ to $Rf^6$ and Z which are the oil repellency imparting groups is preferably within a range of 4 to 18, and more preferably within a range of 5 to 12. If the number of carbon atoms to which fluorine is bonded is less than 4, since an oil repellent effect is not sufficient, this is not preferable.

Specific examples of the structure of the oil repellency imparting group in the above formula (3) or (4) include structures of the following formulas (25) to (49).

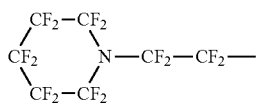 (25)

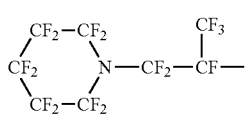 (26)

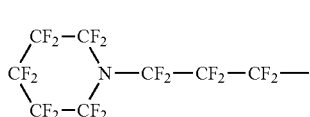 (27)

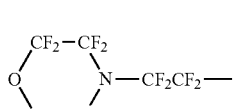 (28)

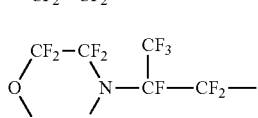 (29)

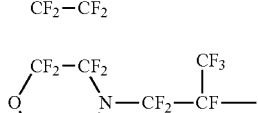 (30)

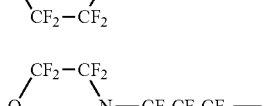 (31)

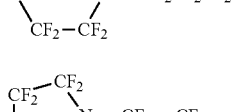 (32)

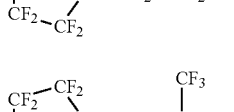 (33)

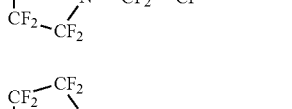 (34)

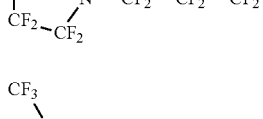 (35)

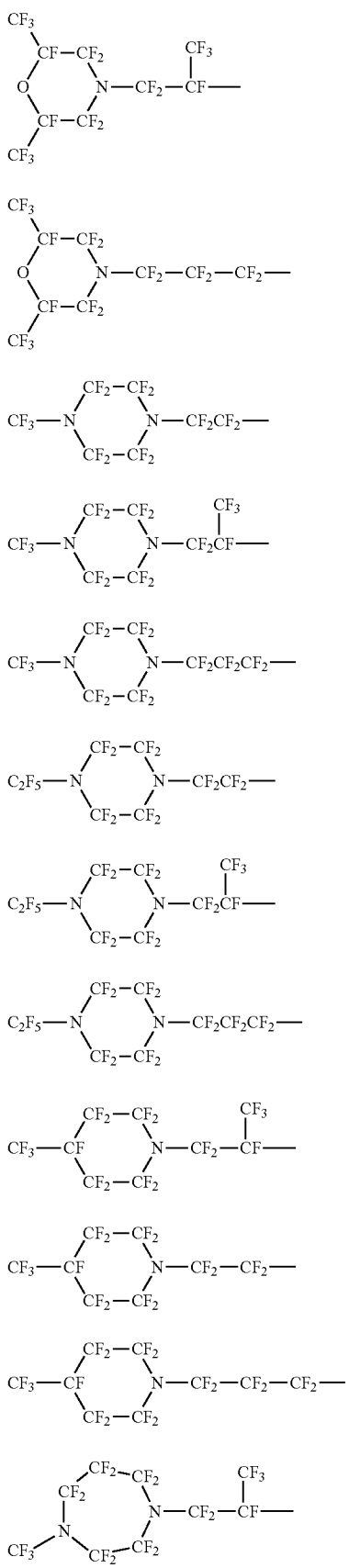
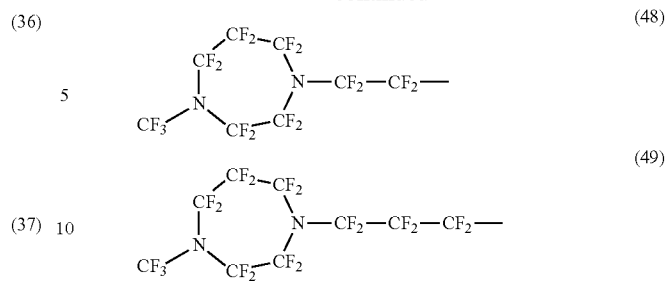

Here, in the above formulas (2) and (4), R is a linking group connecting an oil repellency imparting group and a hydrophilicity imparting group in the molecular chain. The structure of the linking group R is not particularly limited as long as it is a divalent organic group. Specific examples of the linking group R include an oxygen atom [—O—], a carbonyl group [—C(=O)—], an imino group [—NH—], a sulfonyl group [—S(=O)$_2$—], an —OP(=O)(O—)O— group, a hydrocarbon group having 1 to 20 carbon atoms, and combinations thereof. In addition, the linking group R may include one or more selected from polyoxyalkylene groups and epoxy groups. The hydrocarbon group may be a saturated hydrocarbon group or an unsaturated hydrocarbon group. In addition, the hydrocarbon group may be a chain-like hydrocarbon group or a cyclic hydrocarbon group. The chainlike hydrocarbon group may be linear or branched. Examples of the hydrocarbon group include an alkylene group, an alkenylene group, and an arylene group. The imino group and the hydrocarbon group may have a substituent.

In addition, the linking group R may or may not include one or more types of functional groups selected from an ether bond, an ester bond, an amide bond, and a urethane bond in the molecular chain. The amide bond includes a carboxylic acid amide bond and a sulfonamide bond. The ester bond includes a carboxylic acid ester bond, a sulfonic acid ester bond, and a phosphoric acid ester bond.

The linking group R is preferably suitably selected and introduced, according to the characteristics desired to be imparted to the nitrogen-containing fluorine-based compound. Specific examples thereof include a case where it is desired to adjust the solubility in a solvent, a case where it is desired to improve durability by improving adhesion to a substrate, and a case where it is desired to improve compatibility with a resin component or the like. As the method, there are a method of adjusting the presence or absence and the type of polar group affecting intermolecular interaction, a method of adjusting the chain length of a hydrocarbon group having a linear or branched structure, and a method of introducing a structure similar to a part of the chemical structure included in the substrate or the resin component.

In addition, in the above formulas (1) to (4), X is any one hydrophilicity imparting group selected from the group consisting of anion type hydrophilicity imparting groups, cation type hydrophilicity imparting groups, and amphoteric type hydrophilicity imparting groups.

Hereinafter, the structure of the hydrophilic oil repellent (nitrogen-containing fluorine-based compound) used in the surface coating material of the present embodiment will be described by dividing the hydrophilicity imparting groups X into cases.

(Anion Type)

In a case where the hydrophilicity imparting group X is an anion type, X is an anion type hydrophilicity imparting group having "—$CO_2M^1$", "—$SO_3M^1$", "—$OSO_3M^1$", "—$OP(OH)O_2M^1$", "—$OPO_3M^1{}_2$", "=$O_2PO_2M^1$", or "—$PO(OH)_y(OM^1)_{2-y}$" ($M^1$ represents an alkali metal, an alkali earth metal, Mg, Al, or $R^1R^2R^3R^4N^+$; $R^1$ to $R^4$ are each independently a hydrogen atom or a linear or branched alkyl group having 1 to 20 carbon atoms, and preferably having 1 to 10 carbon atoms, and y represents an integer of 0 to 2) at the terminal. The above-described structure example of the terminal shows a case where $M^1$ is monovalent. In addition, in a case where $M^1$ is divalent, two identical anions may be bonded to $M^1$, or two different types of anions may be bonded to $M^1$.

Examples of the alkali metal include lithium (Li), sodium (Na), potassium (K), and cesium (Cs). In addition, examples of the alkali earth metal include calcium (Ca), strontium (Sr), and barium (Ba).

In addition, the quaternary ammonium salt ($R^1R^2R^3R^4N^+$) is not particularly limited as long as $R^1$ to $R^4$ are each independently a hydrogen atom or a linear or branched alkyl group having 1 to 20 carbon atoms, and preferably having 1 to 10 carbon atoms. Here, if the number of carbon atoms of the alkyl group is 20 or less, since the hydrophilicity and oil repellency is not impaired, this is preferable. More specific examples of the compound in which all of $R^1$, $R^2$, $R^3$, and $R^4$ are the same include $(CH_3)_4N^+$, $(C_2H_5)_4N^+$, $(C_3H_7)_4N^+$, $(C_4H_9)_4N^+$, $(C_5H_{11})_4N^+$, $(C_6H_{13})_4N^+$, $(C_7H_{15})_4N^+$, $(C_8H_{17})_4N^+$, $(C_9H_{19})_4N^+$, and $(C_{10}H_{21})_4N^+$. In addition, as a case where all of $R^1$, $R^2$, and $R^3$ are methyl groups, a compound in which $R^4$ is $(C_2H_5)$, $(C_6H_{13})$, $(C_8H_{17})$, $(C_9H_{19})$, $(C_{10}H_{21})$, $(C_{12}H_{25})$, $(C_{14}H_{29})$, $(C_{16}H_{33})$, or $(C_{18}H_{37})$ is exemplified. Furthermore, as a case where both $R^1$ and $R^2$ are methyl groups, a compound in which both $R^3$ and $R^4$ are $(C_8H_{17})$, $(C_{10}H_{21})$, $(C_{12}H_{25})$, $(C_{14}H_{29})$, $(C_{16}H_{33})$, or $(C_{18}H_{37})$ is exemplified. In addition, as a case where $R^1$ is a methyl group, a compound in which all of $R^2$, $R^3$, and $R^4$ are $(C_4H_9)$ or $(C_8H_{17})$ is exemplified.

In applications used in contact with water, it is desired to have durability against water and persistence of a hydrophilic oil repellent effect. From the above viewpoint, in the hydrophilic oil repellent used in the surface coating material of the present embodiment, a nitrogen-containing fluorine-based compound is desired to be a sparingly soluble compound having low solubility in water. That is, in a case where the hydrophilicity imparting group X is an anion type, in the hydrophilic oil repellent used in the surface coating material of the present embodiment, $M^1$ which is a counter ion is preferably an alkali earth metal, Mg, or Al, and, in particular, Ca, Ba, and Mg are preferable since they have excellent hydrophilicity and oil repellency and low solubility in water.

Here, in a case where the hydrophilicity imparting group X is an anion type, specific examples (here, the structure of $M^1$ which is a counter ion is excluded) of the structure of the hydrophilic oil repellent represented by the formula (1) or (2) (that is, a linear nitrogen-containing fluorine-based compound) include structures of the following formulas (50) to (117).

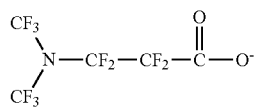
(50)

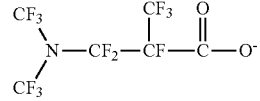
(51)

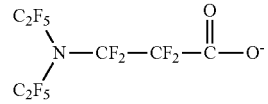
(52)

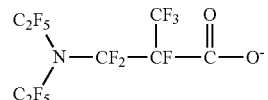
(53)

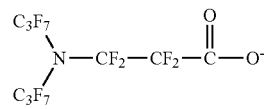
(54)

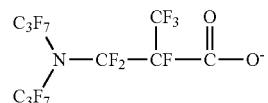
(55)

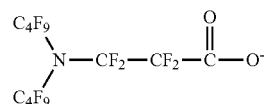
(56)

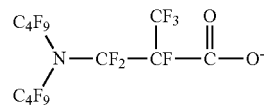
(57)

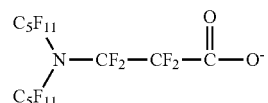
(58)

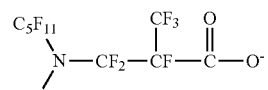
(59)

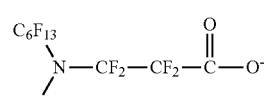
(60)

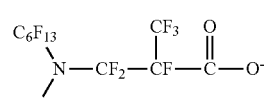
(61)

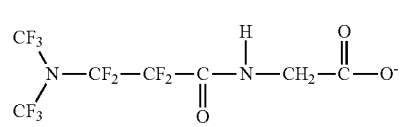
(62)

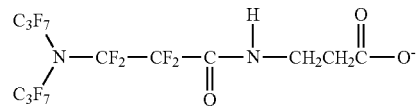
(63)

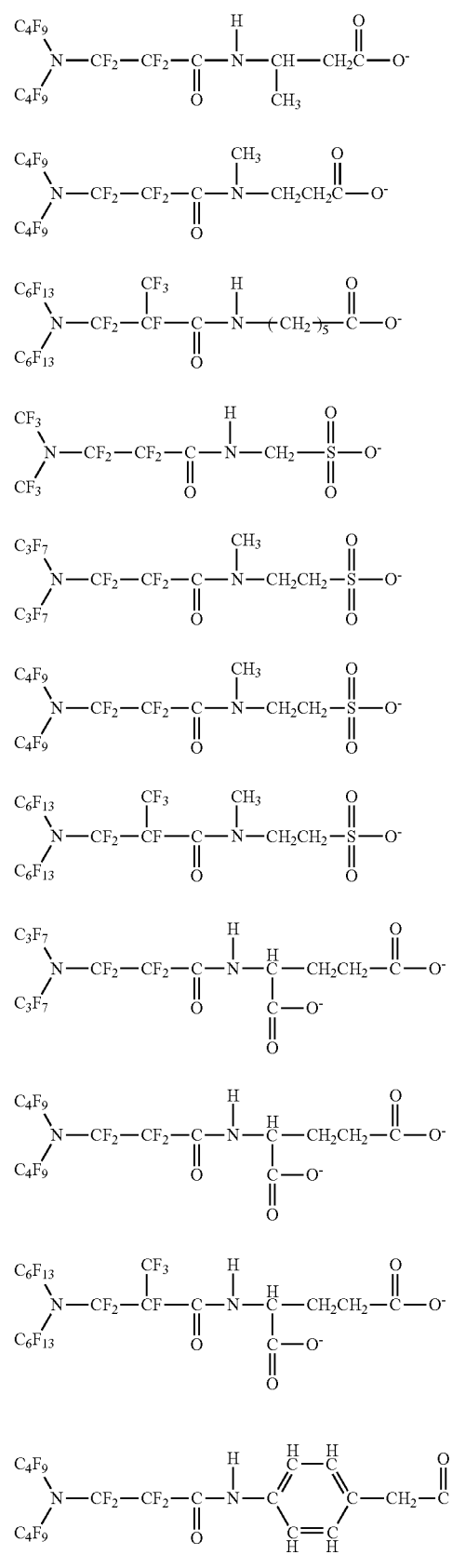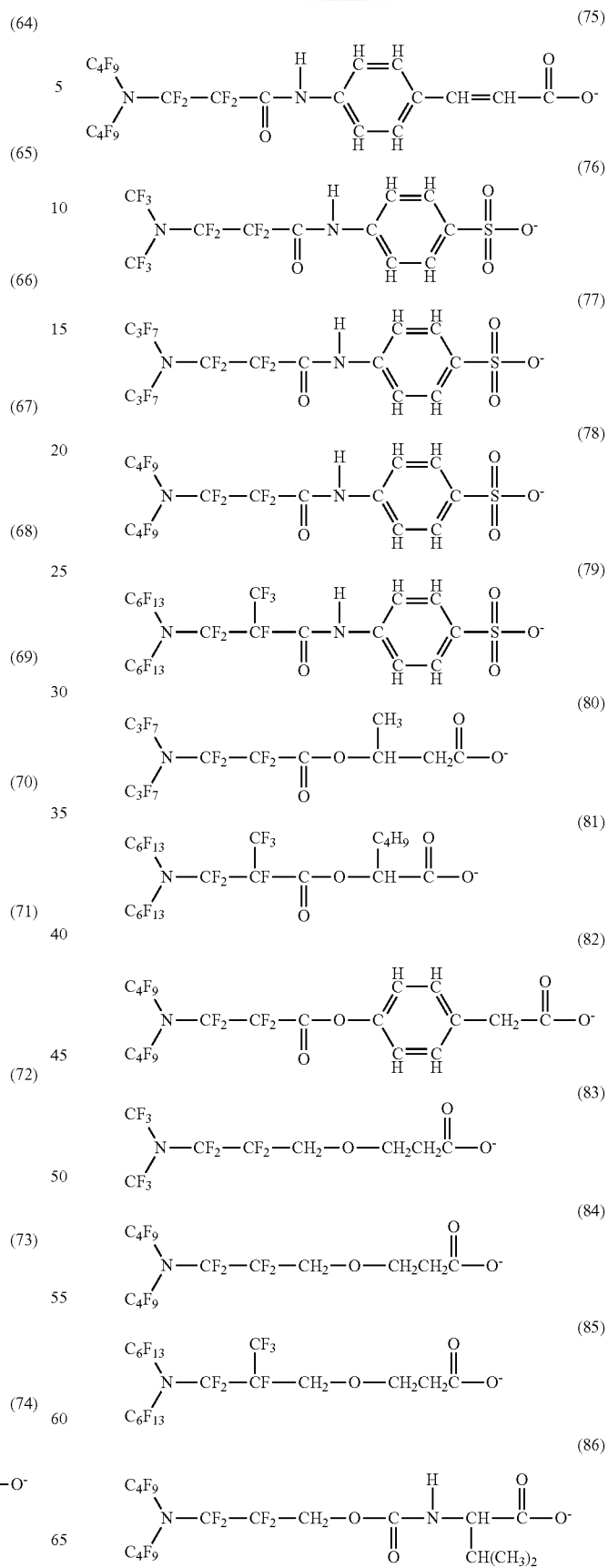

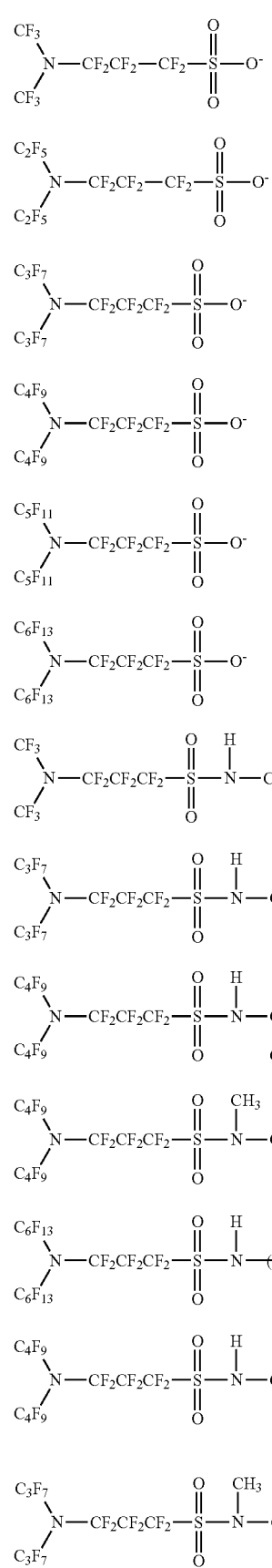
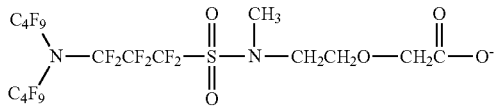
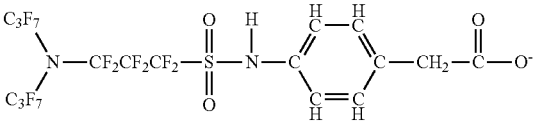
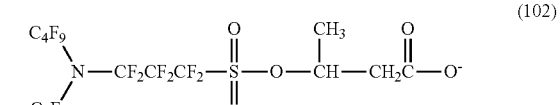
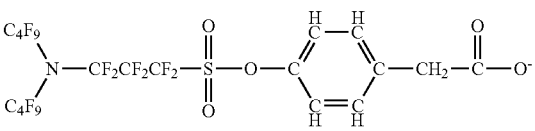
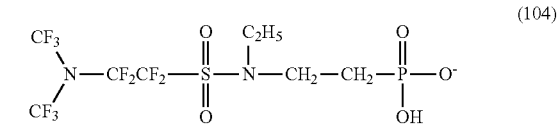
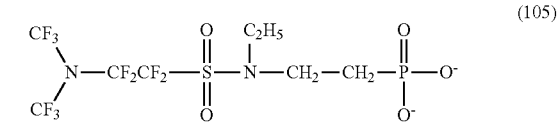
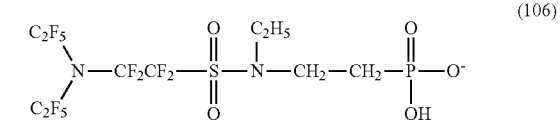
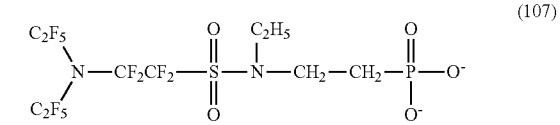
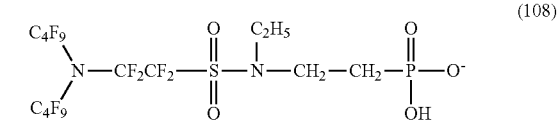
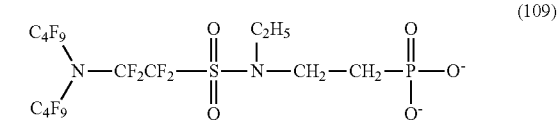
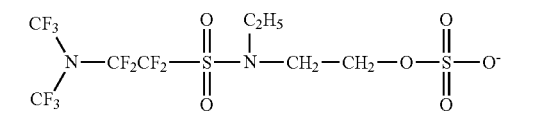
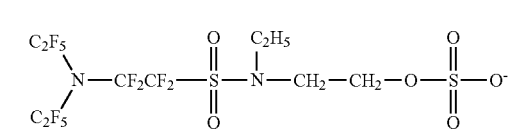

(112) 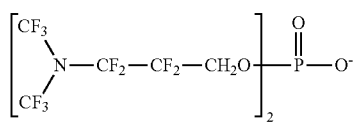
(113) 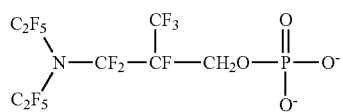
(114) 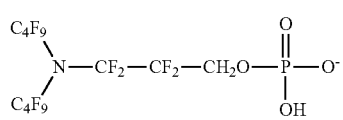
(115) 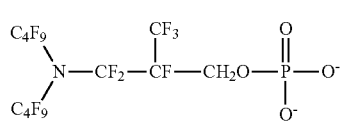
(116) 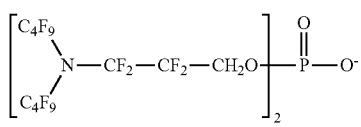
(117) 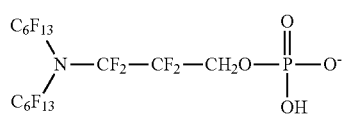
In contrast, specific examples (here, the structure of $M^1$ which is a counter ion is excluded) of the structure of the hydrophilic oil repellent represented by the formula (3) or (4) (that is, a cyclic nitrogen-containing fluorine-based compound) include structures of the following formulas (118) to (189).
(118) 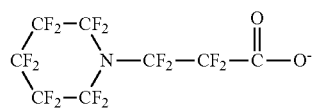
(119) 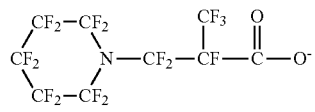
(120) 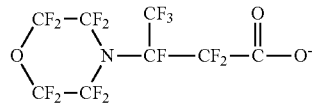
(121) 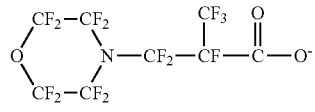
(122) 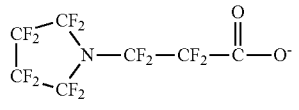
(123) 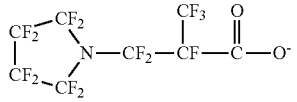
(124) 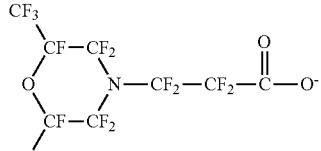
(125) 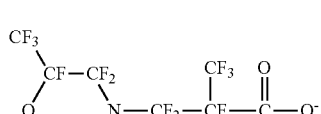
(126) 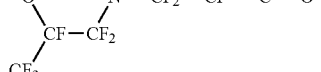
(127) 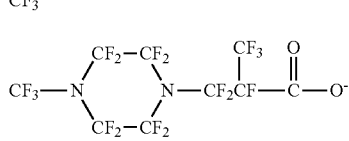
(128) 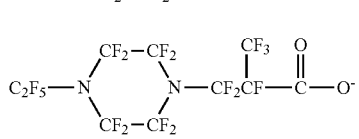
(129) 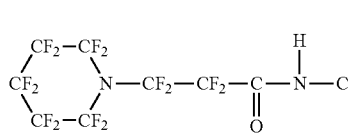
(130) 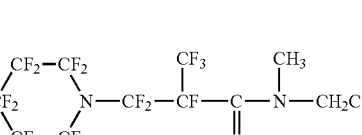
(131) 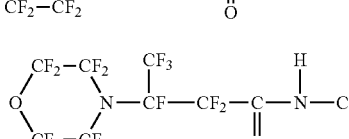
(132) 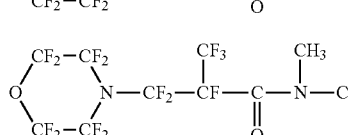
(133) 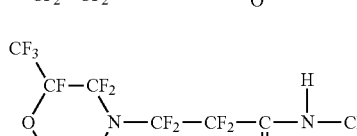

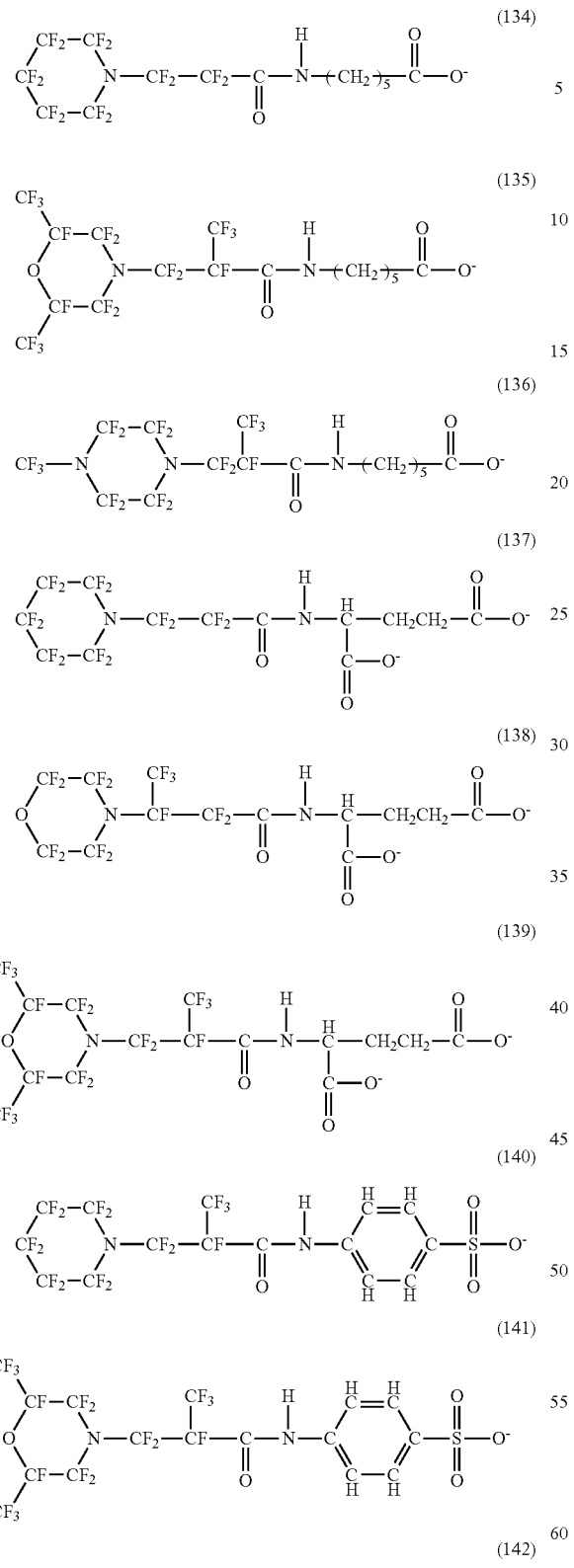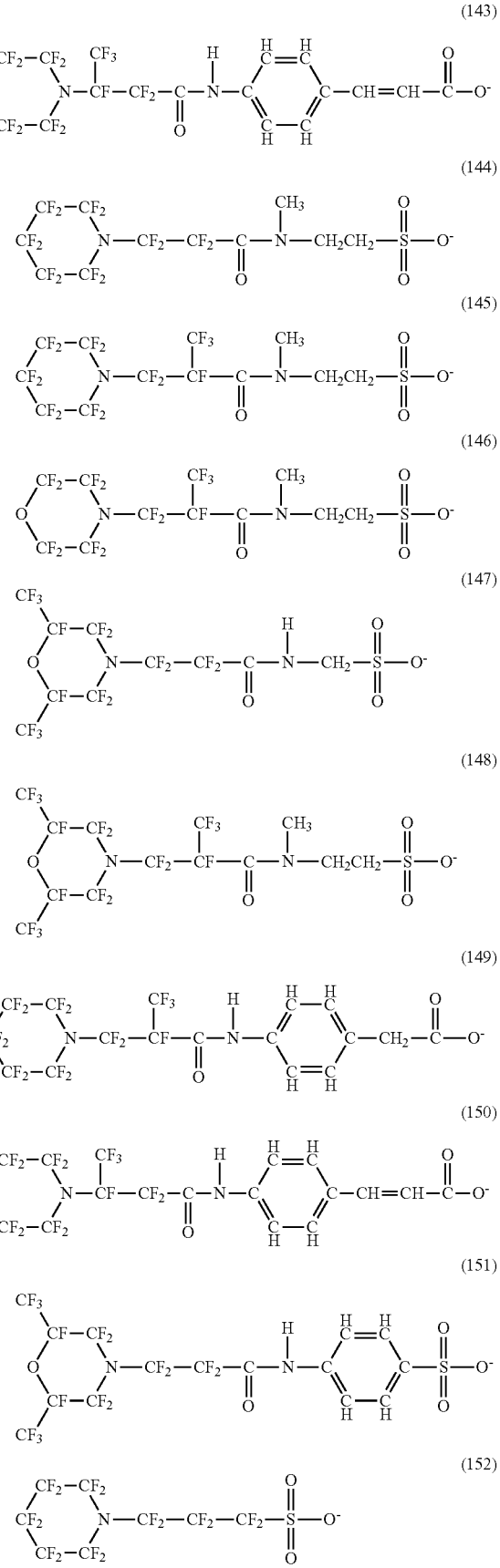

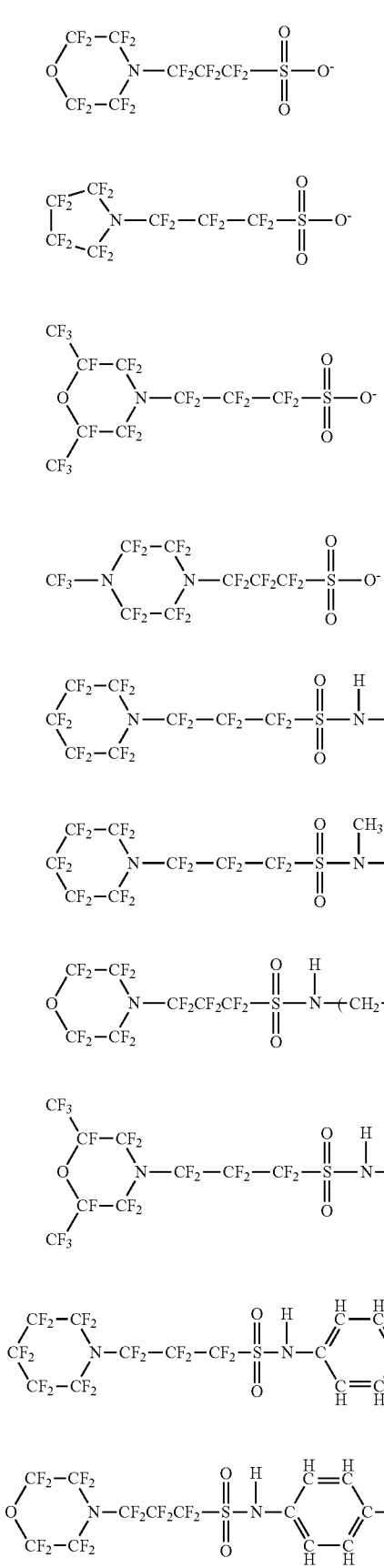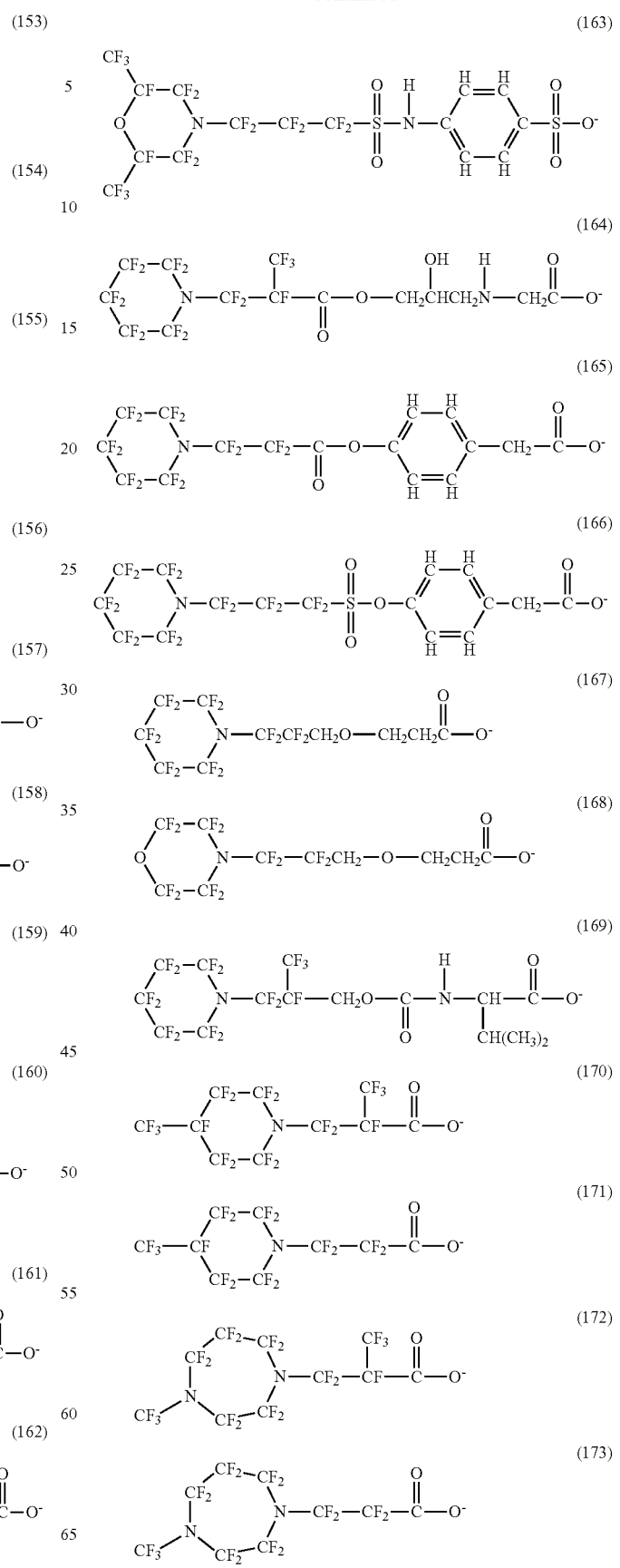

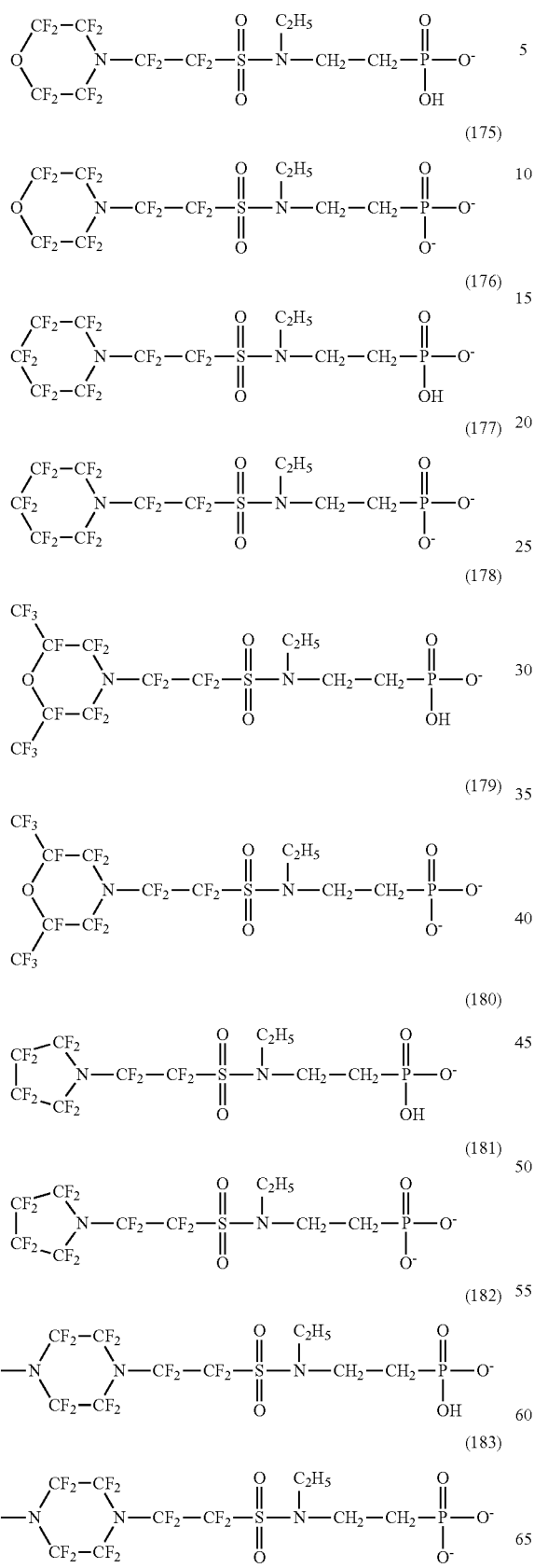

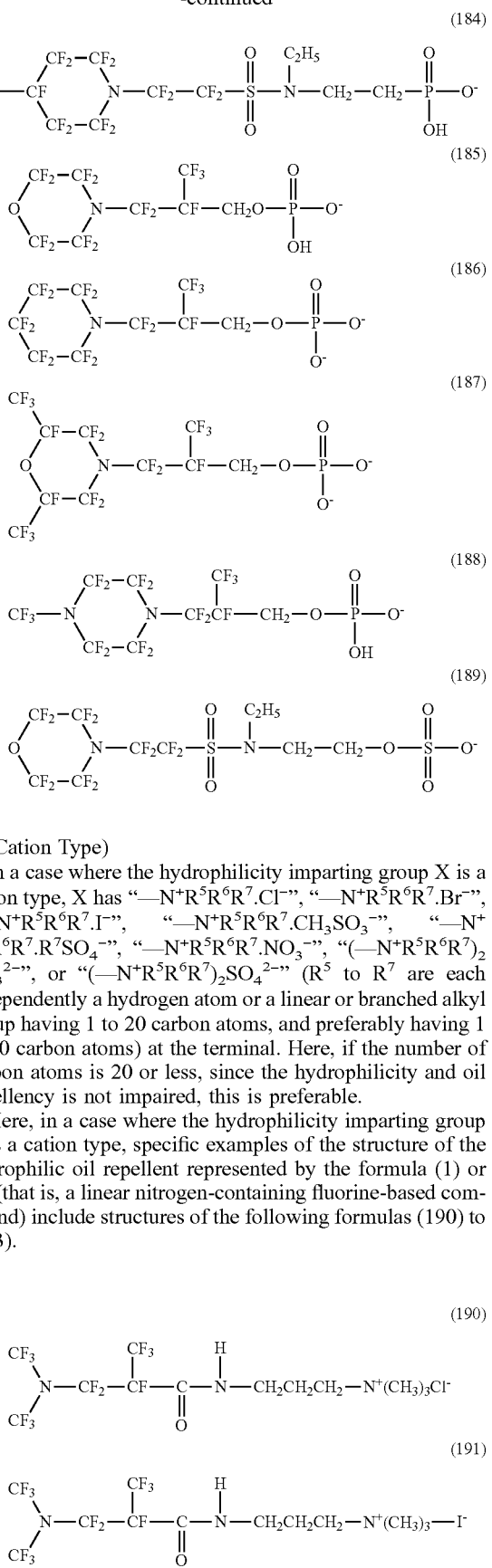

(Cation Type)

In a case where the hydrophilicity imparting group X is a cation type, X has "—$N^+R^5R^6R^7.Cl^-$", "—$N^+R^5R^6R^7.Br^-$", "—$N^+R^5R^6R^7.I^-$", "—$N^+R^5R^6R^7.CH_3SO_3^-$", "—$N^+R^5R^6R^7.R^7SO_4^-$", "—$N^+R^5R^6R^7.NO_3^-$", "(—$N^+R^5R^6R^7)_2CO_3^{2-}$", or "(—$N^+R^5R^6R^7)_2SO_4^{2-}$" ($R^5$ to $R^7$ are each independently a hydrogen atom or a linear or branched alkyl group having 1 to 20 carbon atoms, and preferably having 1 to 10 carbon atoms) at the terminal. Here, if the number of carbon atoms is 20 or less, since the hydrophilicity and oil repellency is not impaired, this is preferable.

Here, in a case where the hydrophilicity imparting group X is a cation type, specific examples of the structure of the hydrophilic oil repellent represented by the formula (1) or (2) (that is, a linear nitrogen-containing fluorine-based compound) include structures of the following formulas (190) to (223).

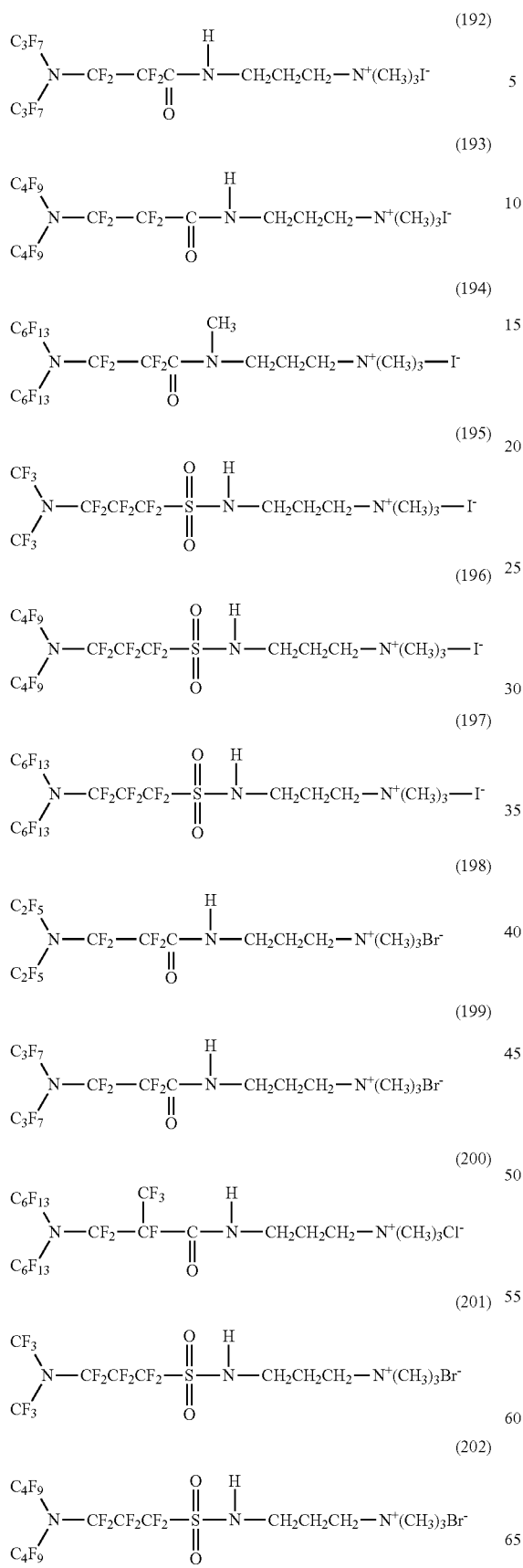
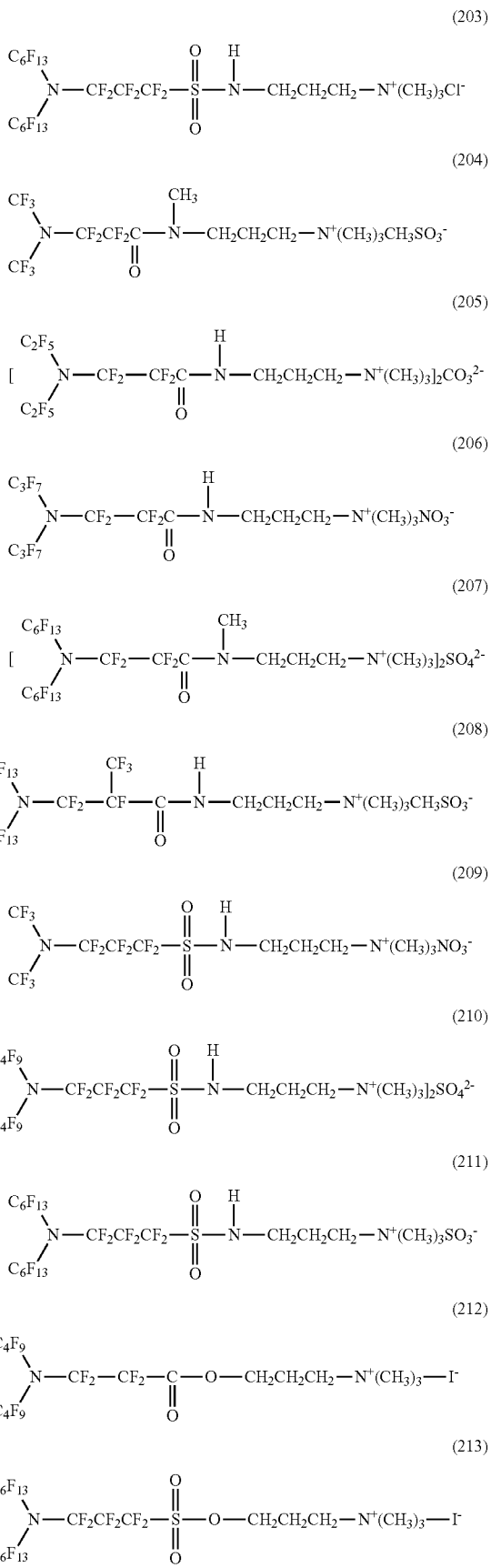

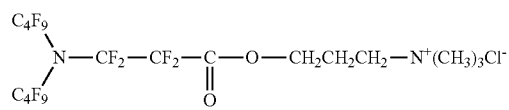 (214)
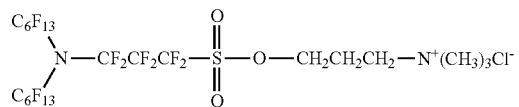 (215)
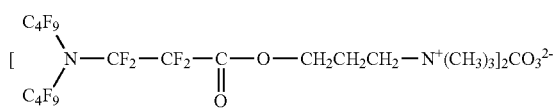 (216)
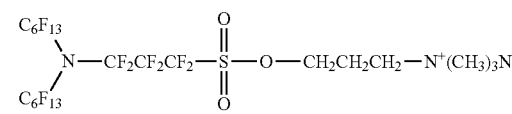 (217)
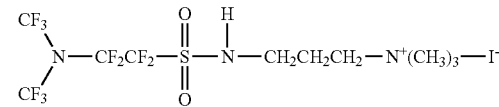 (218)
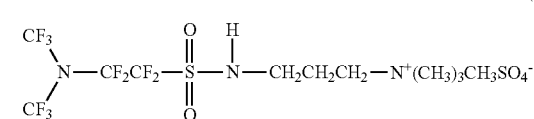 (219)
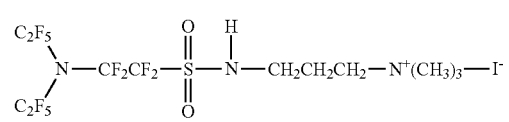 (220)
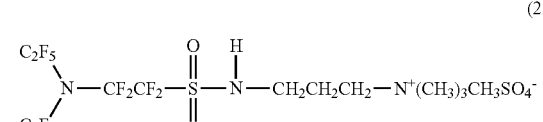 (221)
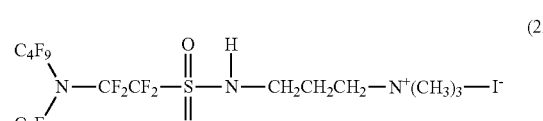 (222)
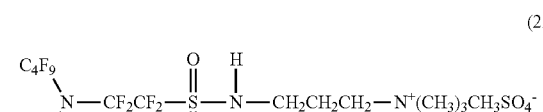 (223)
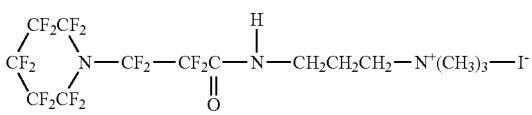 (224)
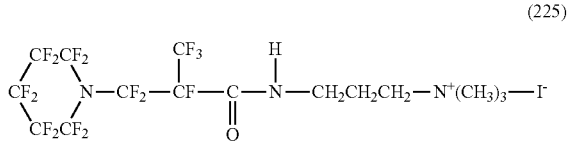 (225)
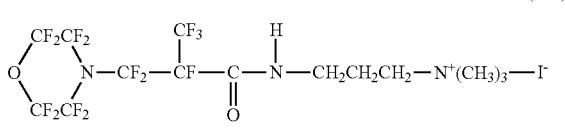 (226)
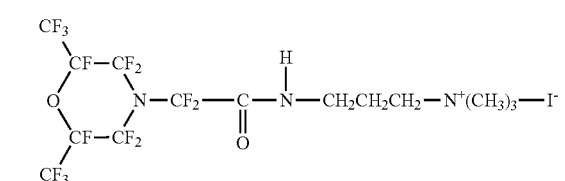 (227)
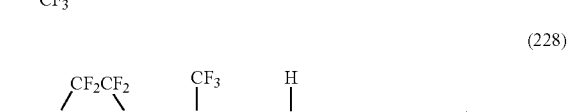 (228)
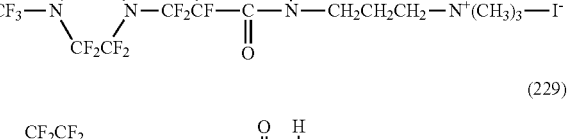 (229)
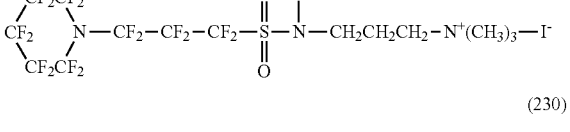 (230)
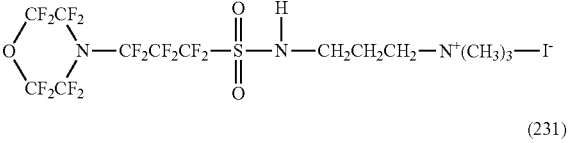 (231)
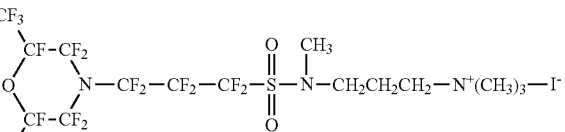 (232)
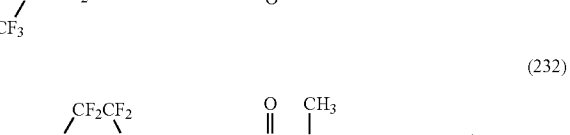 (233)
In contrast, specific examples of the structure of the hydrophilic oil repellent represented by the formula (3) or (4) (that is, a cyclic nitrogen-containing fluorine-based compound) include structures of the following formulas (224) to (258).

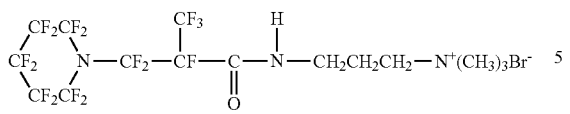
(234)
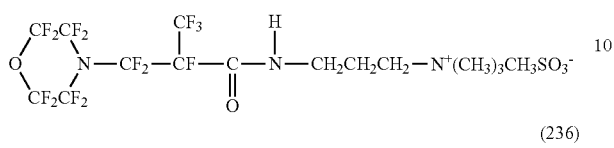
(235)
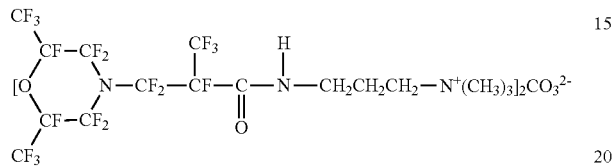
(236)
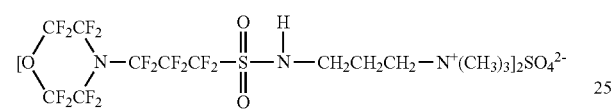
(237)
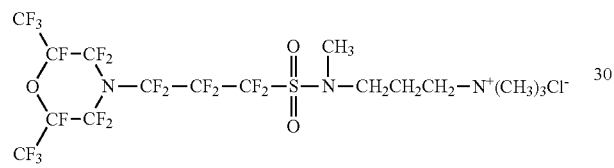
(238)
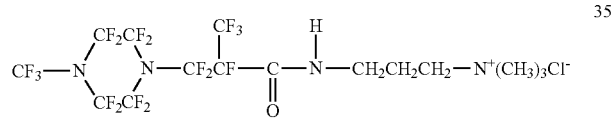
(239)
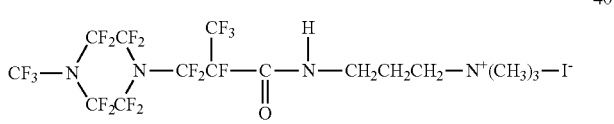
(240)
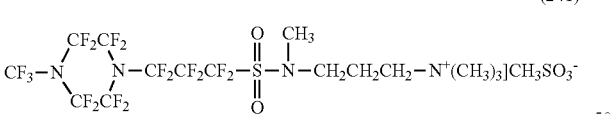
(241)
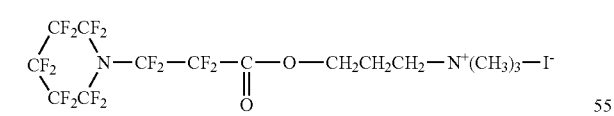
(242)
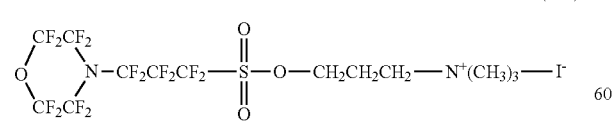
(243)
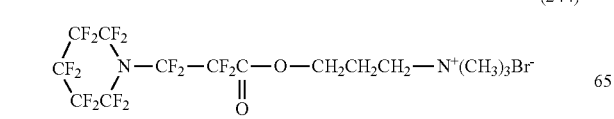
(244)
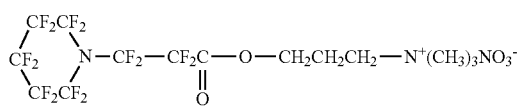
(245)
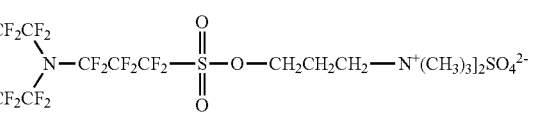
(246)
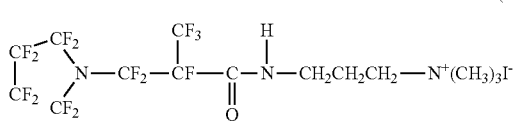
(247)
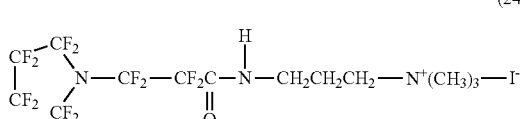
(248)
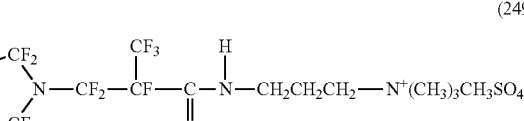
(249)
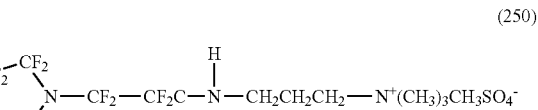
(250)
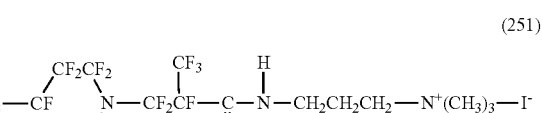
(251)
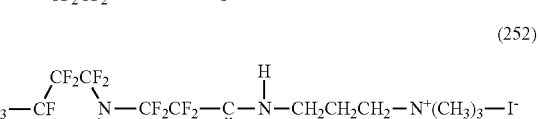
(252)
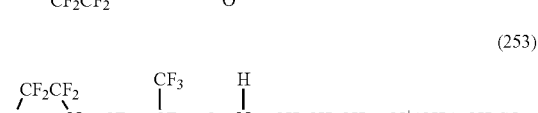
(253)
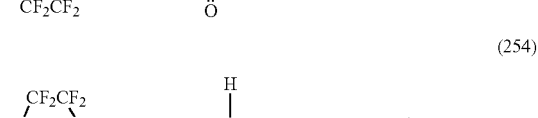
(254)
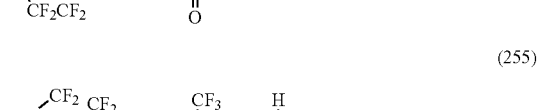
(255)
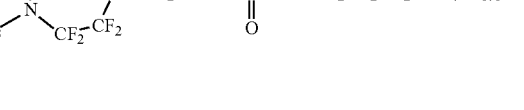

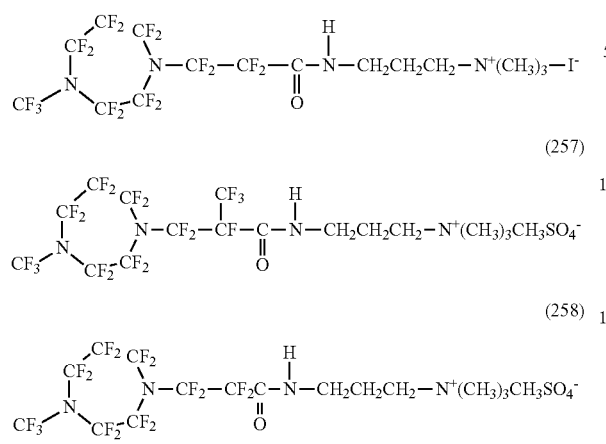

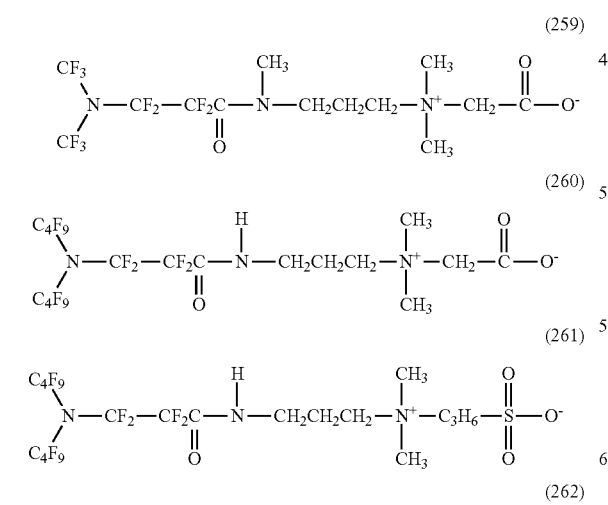

"Amphoteric Type"

In a case where the hydrophilicity imparting group X is an amphoteric type, X has a carboxy betaine type "—$N^+R^8R^9(CH_2)_nCO_2^-$", a sulfobetaine type "—$N^+R^8R^9(CH_2)_nSO_3^-$", an amine oxide type "—$N^+R^8R^9O^-$", or phosphobetaine type "—$OPO_3^-(CH_2)_nR^8R^9R^{10}$" (n is an integer of 1 to 5, $R^8$ and $R^9$ are a hydrogen atom or an alkyl group having 1 to 10 carbon atoms, and $R^{10}$ is a hydrogen atom or an alkyl group having 1 to 10 carbon atoms or an alkylene group having 1 to 10 carbon atoms) at the terminal. Here, if the number of carbon atoms is 10 or less, since the hydrophilicity and oil repellency is not impaired, this is preferable.

Here, in a case where the hydrophilicity imparting group X is an amphoteric type, specific examples of the structure of the hydrophilic oil repellent represented by the formula (1) or (2) (that is, a linear nitrogen-containing fluorine-based compound) include structures of the following formulas (259) to (309).

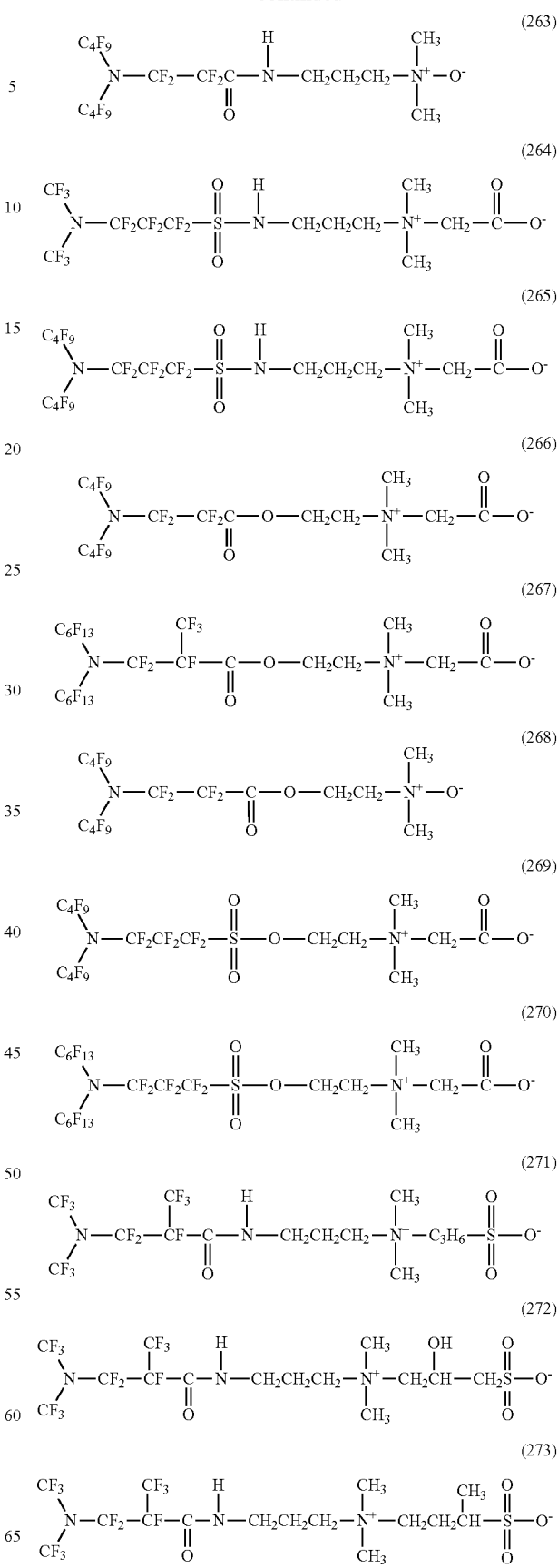

-continued
(274)
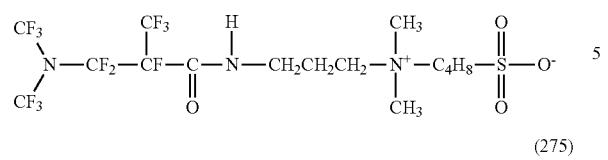
(275)
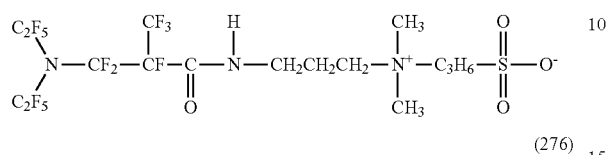
(276)
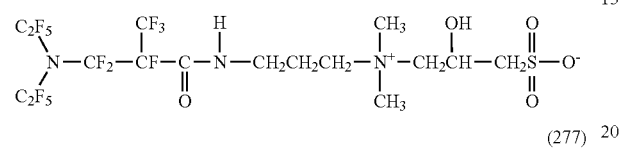
(277)
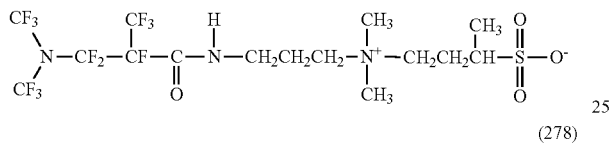
(278)
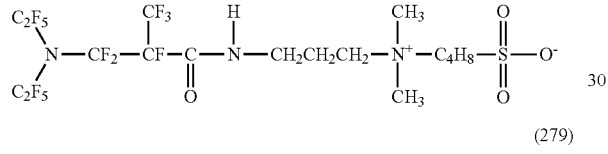
(279)
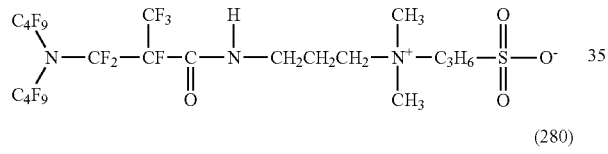
(280)
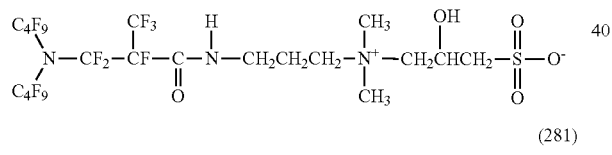
(281)
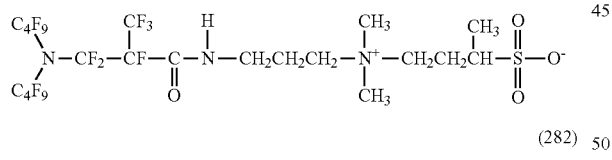
(282)
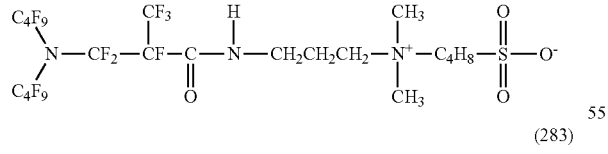
(283)
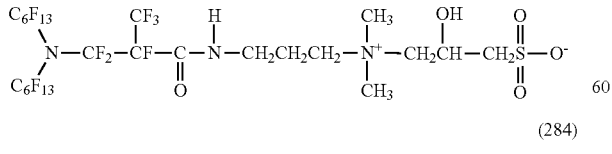
(284)
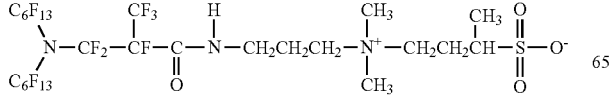
-continued
(285)
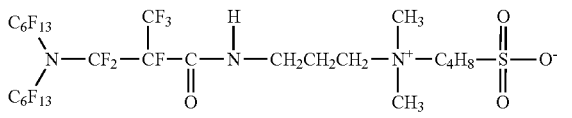
(286)
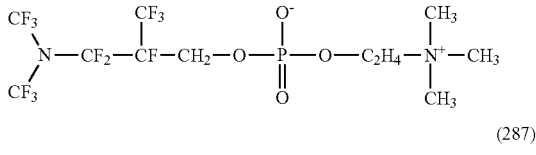
(287)
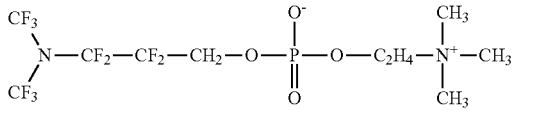
(288)
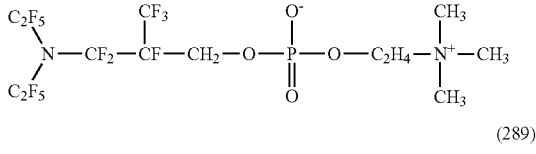
(289)
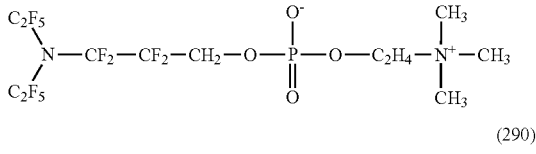
(290)
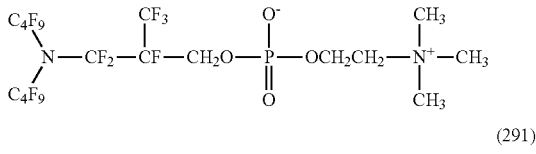
(291)
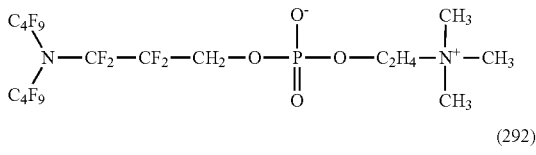
(292)
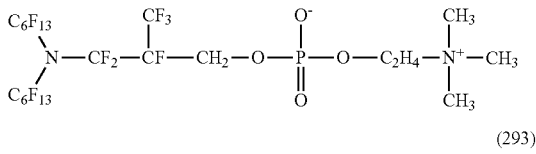
(293)
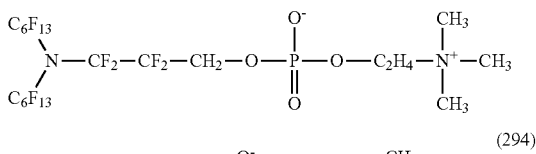
(294)
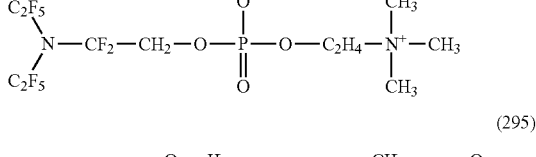
(295)
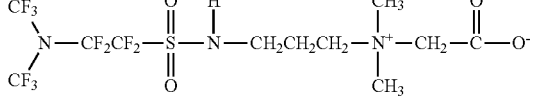

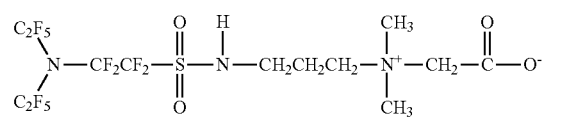 (296)
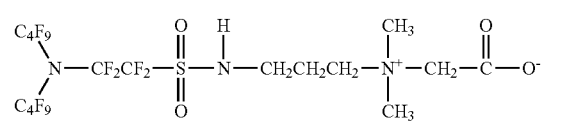 (297)
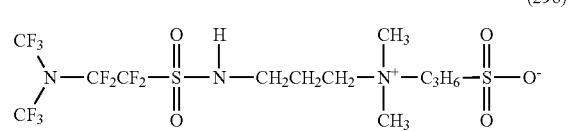 (298)
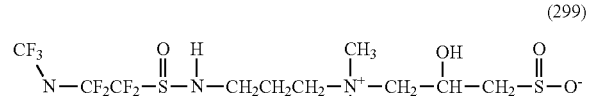 (299)
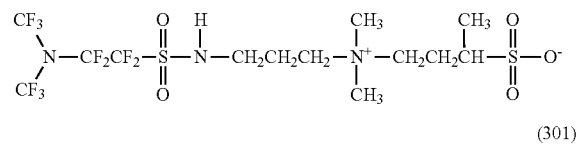 (300)
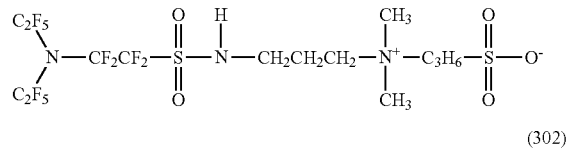 (301)
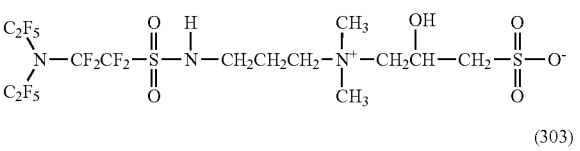 (302)
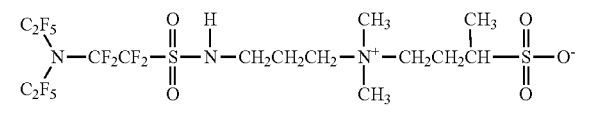 (303)
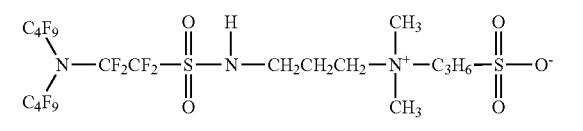 (304)
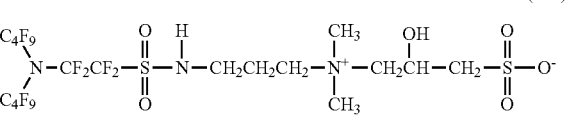 (305)
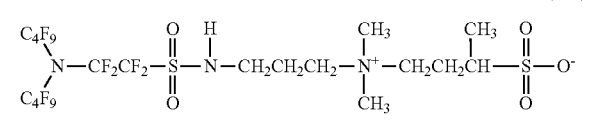 (306)
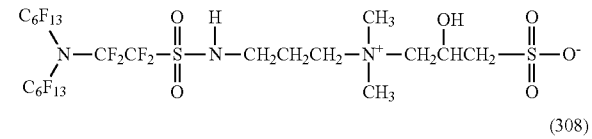 (307)
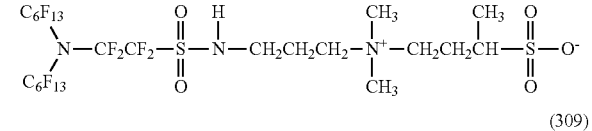 (308)
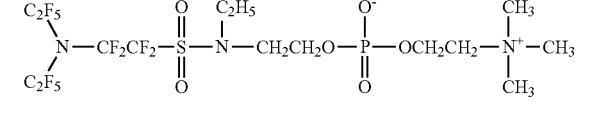 (309)
In contrast, specific examples of the structure of the hydrophilic oil repellent represented by the formula (3) or (4) (that is, a cyclic nitrogen-containing fluorine-based compound) include structures of the following formulas (310) to (375).
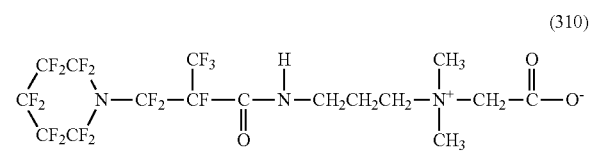 (310)
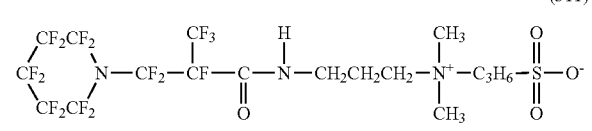 (311)
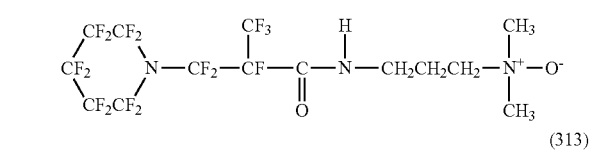 (312)
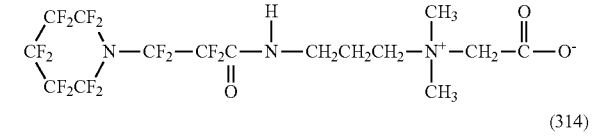 (313)
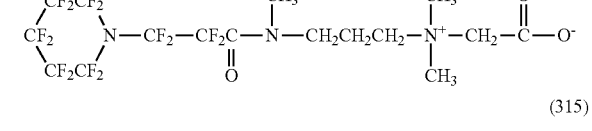 (314)
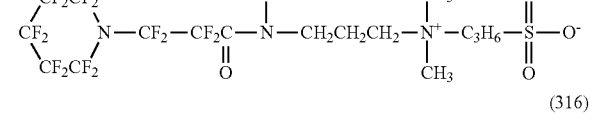 (315)
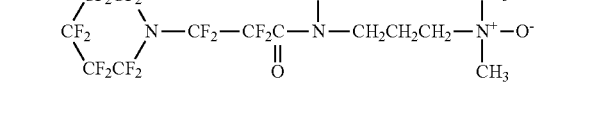 (316)

(317) 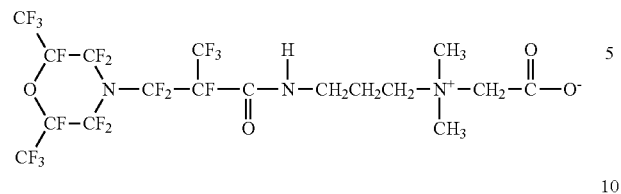
(318) 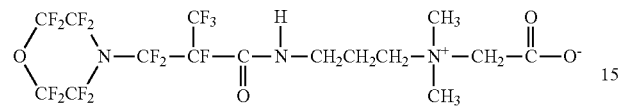
(319) 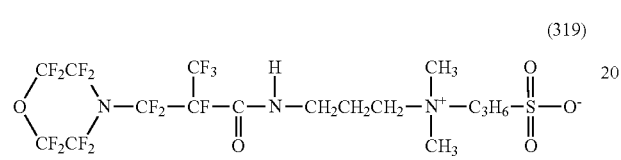
(320) 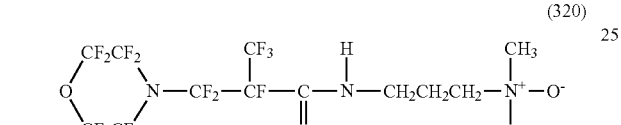
(321) 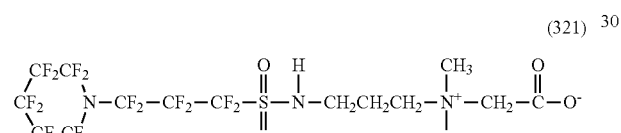
(322) 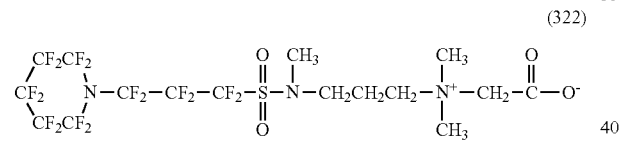
(323) 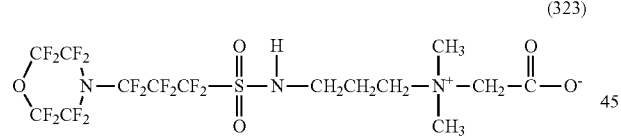
(324) 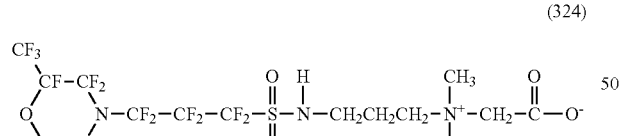
(325) 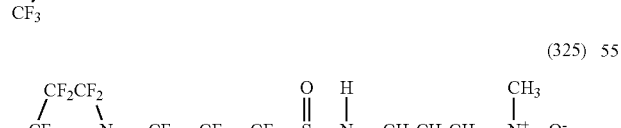
(326) 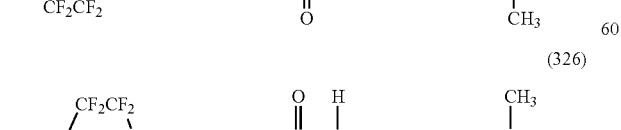
(327) 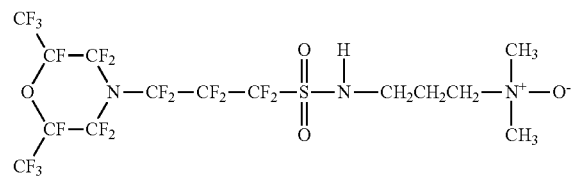
(328) 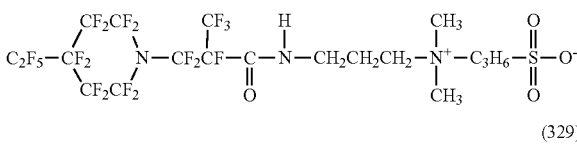
(329) 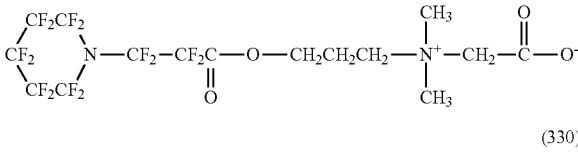
(330) 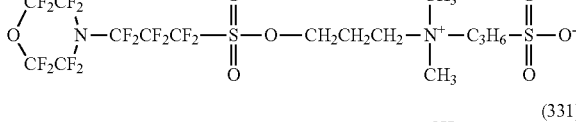
(331) 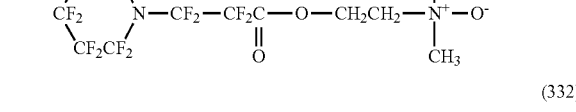
(332) 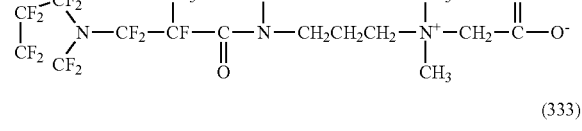
(333) 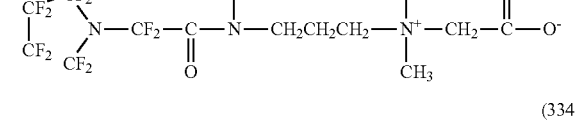
(334) 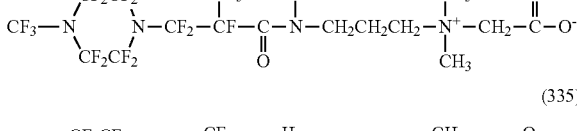
(335) 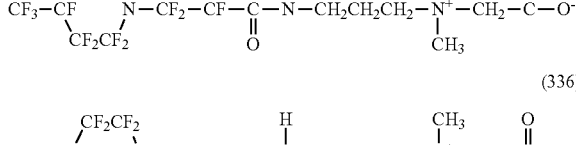
(336) 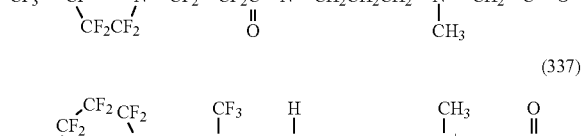
(337)

(338) 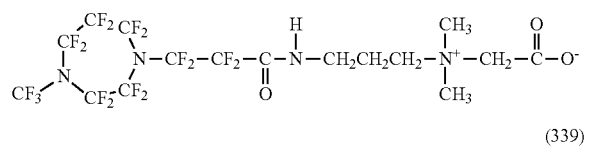
(339) 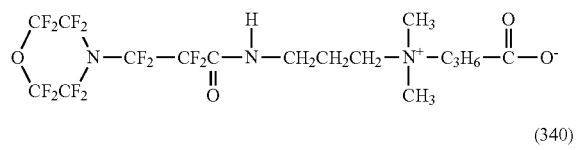
(340) 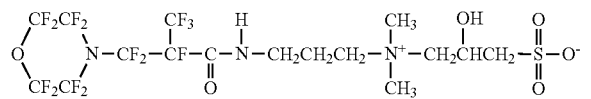
(341) 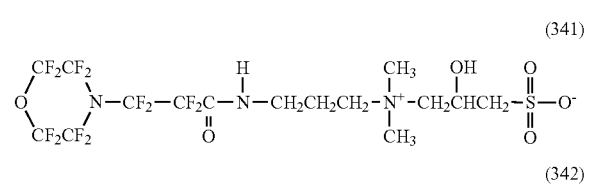
(342) 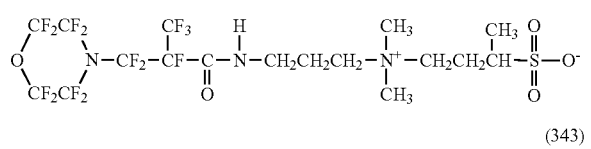
(343) 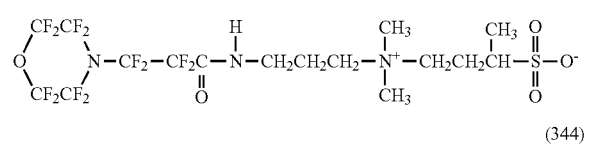
(344) 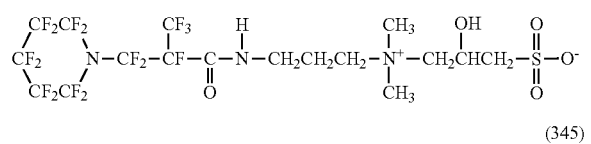
(345) 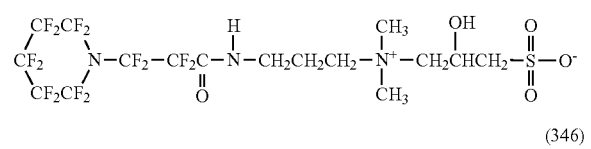
(346) 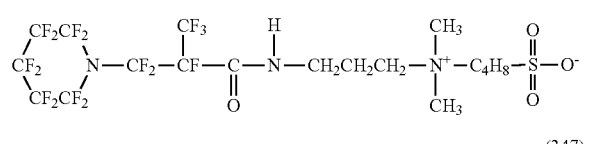
(347) 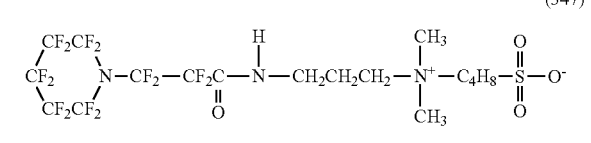
(348) 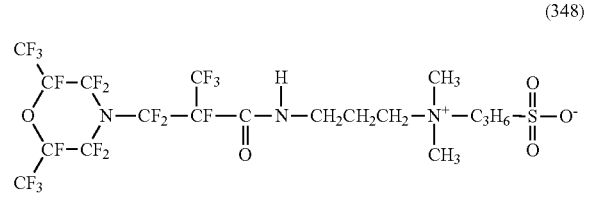
(349) 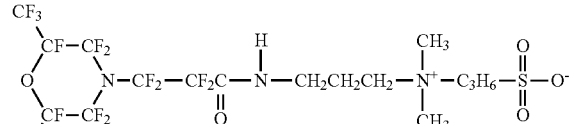
(350) 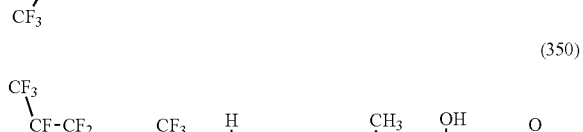
(351) 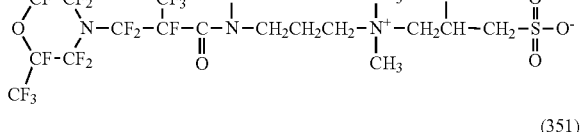
(352) 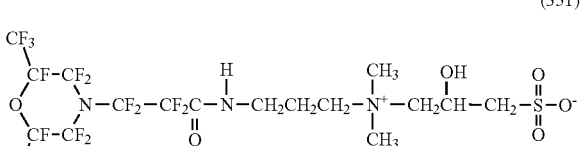
(353) 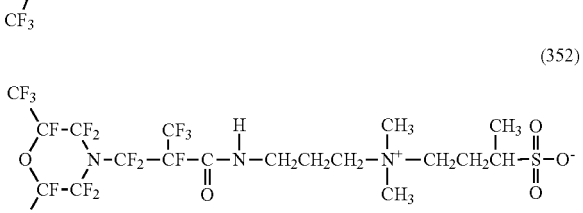
(354) 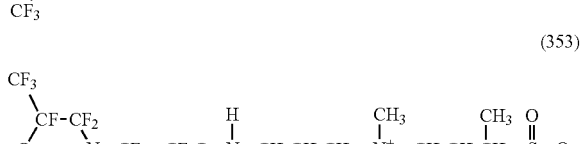
(355) 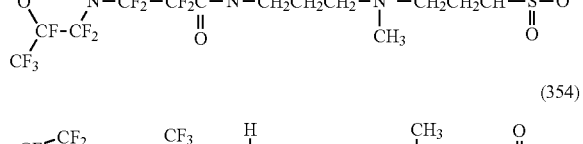
(356) 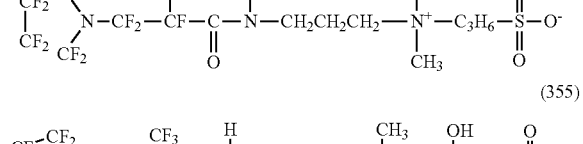
(357) 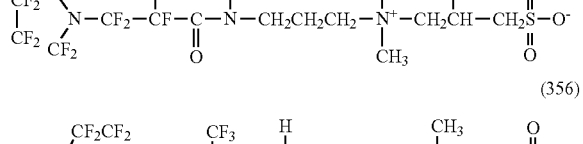
(358) 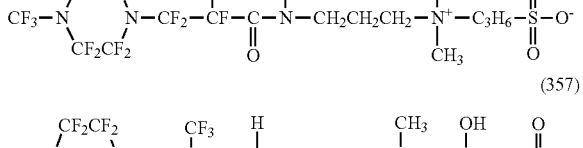

-continued (359) 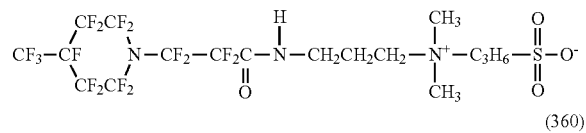

(360) 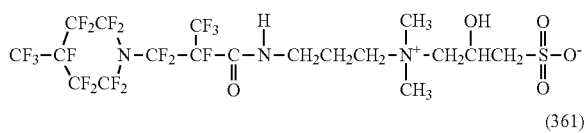

(361) 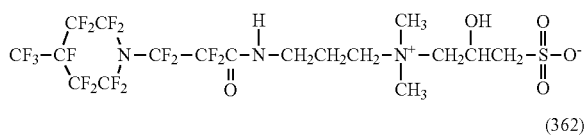

(362) 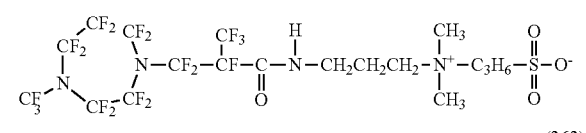

(363) 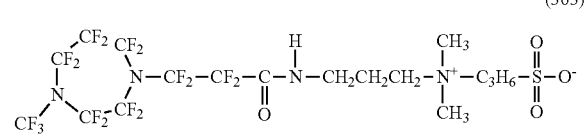

(364) 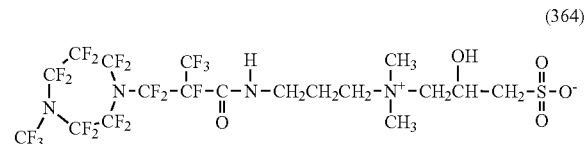

(365) 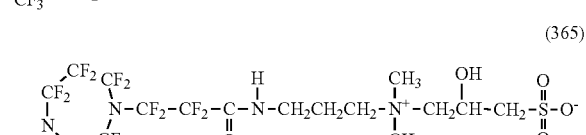

(366) 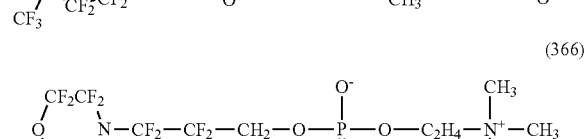

(367) 

(368) 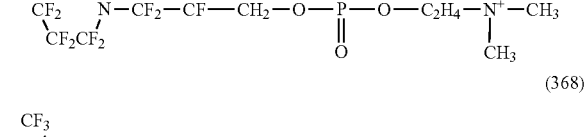

(369) 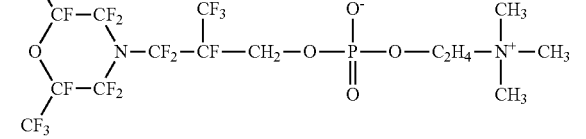

-continued (370) 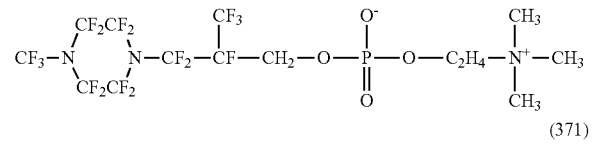

(371) 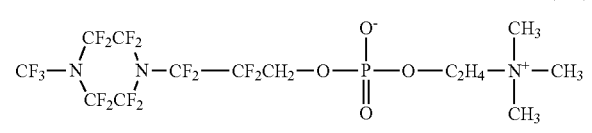

(372) 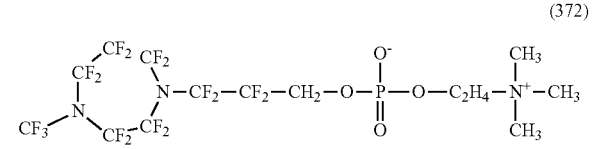

(373) 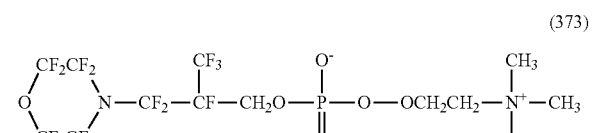

(374) 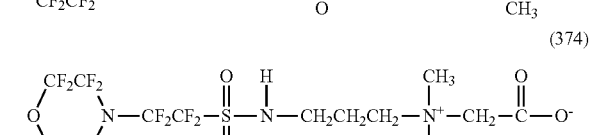

(375) 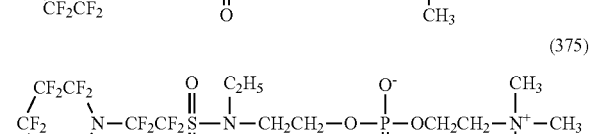

The specific examples of the structure of the hydrophilic oil repellent used in the surface coating material of the present embodiment described above are simply examples, and the technical scope of the present invention is not limited to the above specific examples. That is, the hydrophilic oil repellent used in the surface coating material of the present embodiment may have at least one or more oil repellency imparting groups formed of a nitrogen-containing perfluoroalkyl group and at least one or more hydrophilicity imparting groups of any types of an anion type, a cation type, and an amphoteric type, in the molecule, respectively.

In addition, the hydrophilic oil repellent used in the surface coating material of the present embodiment described above sufficiently exhibits hydrophilicity and oil repellency by itself, but, since in the practical environment, acid, alkali, oil, and the like are included, there are many differences, and thus, in the case of considering practical durability, it is desirable to increase the durability against the practical environment by suitably combining hydrophilic oil repellents.

To the hydrophilic oil repellent used in the surface coating material of the present invention, various modifications can be added in a range not departing from the scope of the present invention. For example, in the specific examples of the structure of the hydrophilic oil repellent used in the surface coating material of the present embodiment described above, as an oil repellency imparting group formed of a nitrogen-containing perfluoroalkyl group, a case where $R^{f1}$ and $R^{f2}$ shown in the formulas (1) and (2) are symmetric has been described, but the present invention is not limited thereto, and $R^{f1}$ and $R^{f2}$ may be asymmetric.

In addition, the hydrophilic oil repellent used in the surface coating material of the present embodiment may have two or more same or different oil repellency imparting groups in the molecule. Furthermore, in the case of having two or more oil repellency imparting groups in the molecule, the oil repellency imparting groups may be provided at both terminals of the molecule or may be provided in the molecular chain.

In addition, the hydrophilic oil repellent used in the surface coating material of the present embodiment may have two or more same or different hydrophilicity imparting groups in the molecule.

In addition, the hydrophilic oil repellent used in the surface coating material of the present embodiment may have two or more same or different bonds in the linking group. Furthermore, in a case where the linking group is a polymer type, the repeat number and the bonding order of unit are not particularly limited.

Next, the evaluation method of the nitrogen-containing fluorine-based compound (hydrophilic oil repellent) represented by each of the formulas (1) to (4) will be described. Here, evaluation of hydrophilicity and oil repellency, specifically, can be performed by a contact angle measurement (droplet method).

In the contact angle measurement, first, the nitrogen-containing fluorine-based compound represented by each of the above formulas (1) to (4) is dissolved in methanol to obtain a methanol solution. Next, after a soda glass plate has been immersed in a 1 N potassium hydroxide aqueous solution at room temperature for 2 hours in advance, the soda glass plate is washed with pure water and washed with acetone, and dried. The soda glass plate is immersed (dip coated) in the methanol solution, then, the methanol is removed by drying at room temperature, whereby a coating film is formed on the glass plate. Next, water and n-hexadecane are dropped onto the coating film, and the static contact angle (unit: o (degree), 1° = (π/180) rad) between the coating film and the droplet is measured at room temperature (22±1° C.), respectively. As a result of the contact angle measurement, in a case where the static contact angle for water to the coating film is 15° or less and the static contact angle for n-hexadecane is 65° or greater, it is assumed that the nitrogen-containing fluorine-based compound has hydrophilicity and oil repellency (that is, the nitrogen-containing fluorine-based compound is a hydrophilic oil repellent).

In the contact angle measurement, the dropping method of water and n-hexadecane is performed using the following conditions.

Dropping volume: 2 μL/drop (water)
Dropping volume: 2 μL/drop (n-hexadecane)
Measurement temperature: room temperature (22±1° C.)
(Production Method of Hydrophilic Oil Repellent)

Next, the production method of a hydrophilic oil repellent used in the surface coating material of the present embodiment will be described.

In the production method of a hydrophilic oil repellent used in the surface coating material of the present embodiment, the nitrogen-containing fluorine-based compound represented by each of the above formulas (1) to (4) is produced using a carboxylic acid halide or a sulfonic acid halide having a nitrogen-containing perfluoroalkyl group represented by the following formula (5) or (6) as a raw material. Specifically, the nitrogen-containing fluorine-based compound represented by the formula (1) or (2) is produced using a carboxylic acid halide or a sulfonic acid halide having a nitrogen-containing perfluoroalkyl group represented by the following formula (5) as a raw material. In addition, the nitrogen-containing fluorine-based compound represented by the formula (3) or (4) is produced using a carboxylic acid halide or a sulfonic acid halide having a nitrogen-containing perfluoroalkyl group represented by the following formula (6) as a raw material.

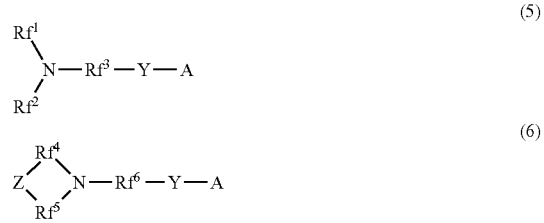

Here, in the above Formula (5), $Rf^1$ and $Rf^2$ each represents a linear or branched perfluoroalkyl group having 1 to 6 carbon atoms, which are the same as or different from each other. In addition, $Rf^3$ represents a linear or branched perfluoroalkylene group having 1 to 6 carbon atoms.

$Rf^1$ and $Rf^2$ each preferably represents a linear or branched perfluoroalkyl group having 1 to 4 carbon atoms, which are the same as or different from each other. In addition, $Rf^3$ preferably represents a linear or branched perfluoroalkyl group having 1 to 4 carbon atoms.

In addition, in the above Formula (6), $Rf^4$, $Rf^5$, and $Rf^6$ each represents a linear or branched perfluoroalkylene group having 1 to 6 carbon atoms, which are the same as or different from each other.

$Rf^4$, $Rf^5$, and $Rf^6$ each preferably represents a linear or branched perfluoroalkylene group having 1 to 4 carbon atoms, which are the same as or different from each other.

In addition, Z includes any one of an oxygen atom, a nitrogen atom, a $CF_2$ group, and a CF group. In addition, in a case where Z includes a nitrogen atom or a CF group, a perfluoroalkyl group branched from Z may be bonded to Z.

In addition, in the above formulas (5) and (6), Y is CO or $SO_2$.

Furthermore, in the above formulas (5) and (6), A is any one halogen atom selected from the group consisting of fluorine, chlorine, bromine, and iodine.

The production method of a hydrophilic oil repellent used in the surface coating material of the present embodiment is a production method different depending on the type of X shown in the above formulas (1) to (4). The cases will be explained separately below.

(Case of Anion Type)

First, a case of producing a nitrogen-containing fluorine-based compound shown in the above formula (1) or (3) will be described.

Among the raw materials shown in the above formula (5) or (6), in a case where Y is CO (in the case of being carboxylic acid-based), the raw material is added dropwise to the aqueously solubilized $M(OH)_m$ (M is Li, Na, K, Ca, Mg, or Al, m is 1 in the case of a monovalent cation such as Li, Na, or K, m is 2 in the case of a divalent cation such as Ca or Mg, and m is 3 in case of a trivalent cation such as Al) and in a case where Y is $SO_2$ (in the case of being sulfonic acid-based), the raw material is added dropwise to the aqueously solubilized $M(OH)_m$ (M is Li, Na, K, $R^1R^2R^3R^4N^+$, Ca, Mg, or Al, m is 1 in case of a monovalent cation such as Li, Na, or K, m is 2 in the case of a divalent cation such as Ca or Mg, m is 3 in case of a trivalent cation such as Al, and $R^1$ to $R^4$ are each independently a hydrogen atom or a linear or branched alkyl group having 1 to 20 carbon atoms) to perform a neutralization reaction, and the resulting product is solidified by drying. The objective substance is extracted from the obtained solid by performing dry solidification using a solvent in which the objective substance is soluble and M(A), $M(A)_2$, or $M(A)_3$ which is a by-product is insoluble, then, by further performing dry solidification on this extraction solvent, the objective substance can be obtained. If necessary, this salt can be converted to carboxylic acid or sulfonic acid using an acid such as sulfuric acid, and by making a desired salt using $M(OH)_m$ again after distillation, it is also possible to make highly pure.

Next, a case of producing a nitrogen-containing fluorine-based compound shown in the above formula (2) or (4) will be described.

Specifically, for example, in the case of introducing a linking group R having an amide bond between an oil repellency imparting group (nitrogen-containing perfluoroalkyl group) and an anion type hydrophilicity imparting group, first, by reacting a nitrogen-containing perfluoroalkylcarbonyl fluoride or a sulfonyl fluoride with an aminoalkylcarboxylic acid or aminophenylsulfonic acid and then reacting with alkali hydroxide, an alkali metal salt of a carboxylic acid or sulfonic acid having an amide bond is obtained.

In addition, for example, in the case of introducing a linking group R having an ester bond between an oil repellency imparting group (nitrogen-containing perfluoroalkyl group) and an anion type hydrophilicity imparting group, first, by reacting a nitrogen-containing perfluoroalkylcarbonyl fluoride or a sulfonyl fluoride with a hydroxyphenyl organic acid and then reacting with alkali hydroxide, an alkali metal salt of a carboxylic acid or sulfonic acid having an ester bond is obtained.

In addition, for example, in the case of introducing a linking group R having an ether bond between an oil repellency imparting group (nitrogen-containing perfluoroalkyl group) and an anion type hydrophilicity imparting group, first, nitrogen-containing perfluoroalkylcarbonyl fluoride is reduced with lithium aluminum hydride ($LiAlH_4$) or sodium borohydride ($NaBH_4$) to produce an alcohol having a nitrogen-containing perfluoroalkyl group. Next, the alcohol is converted to potassium alcoholate with t-butoxypotassium or the like, and then by reacting with a metal salt of a halogenated organic acid, an alkali metal salt of a carboxylic acid having an ether bond is obtained.

(Case of Cation Type)

Specifically, for example, among the raw materials shown in the above formula (5) or (6), nitrogen-containing perfluoroalkylcarbonyl fluoride or sulfonyl fluoride is amide-bonded with N,N-dialkylaminoalkyleneamine to give a terminal tertiary amine, and by performing quaternization with an alkylating agent such as methyl iodide ($CH_3I$), methyl bromide ($CH_3Br$), or dimethyl sulfate (($CH_3)_2SO_4$), a nitrogen-containing fluorine-based compound having a cation type hydrophilicity imparting group is obtained.

In addition, for example, among the raw materials shown in the above formula (5) or (6), nitrogen-containing perfluoroalkylcarbonyl fluoride or sulfonyl fluoride is ether-bonded with N,N-dialkylaminoalkylene alcohol to give a terminal tertiary amine, and by performing quaternization with an alkylating agent such as methyl iodide ($CH_3I$), methyl bromide ($CH_3Br$), or dimethyl sulfate (($CH_3)_2SO_4$), a nitrogen-containing fluorine-based compound having a cation type hydrophilicity imparting group is obtained.

(Case of Amphoteric Type)

Specifically, for example, in the case of a carboxybetaine type, among the raw materials shown in the above formula (5) or (6), nitrogen-containing perfluoroalkylcarbonyl fluoride or sulfonyl fluoride is amide-bonded with N,N-dialkylaminoalkyleneamine or ether-bonded with N,N-dialkylaminoalkylene alcohol to give a terminal tertiary amine, and by reacting with sodium monochloroacetate, a nitrogen-containing fluorine-based compound having an amphoteric type hydrophilicity imparting group is obtained.

In addition, for example, in the case of a sulfobetaine type, after making a terminal tertiary amine as described above, by reacting this with a cyclic sulfonic acid ester compound represented by 1,3-propane sultone or the like, a nitrogen-containing fluorine-based compound having an amphoteric type hydrophilicity imparting group is obtained.

In addition, for example, in the case of an amine oxide type, after making a terminal tertiary amine as described above, by reacting this with hydrogen peroxide, a nitrogen-containing fluorine-based compound having an amphoteric type hydrophilicity imparting group is obtained.

In addition, for example, in the case of a phosphobetaine type, by reacting an alcohol form obtained by reducing nitrogen-containing perfluorocarbonyl fluoride or one obtained by introducing a hydroxyl group at the terminal by sulfonamidating nitrogen-containing perfluoroalkylsulfonyl fluoride with an amino alcohol, with, for example, phosphorus oxychloride in the presence of a base such as trimethylamine, a dichlorophosphoric acid ester having a nitrogen-containing perfluoroalkyl group is obtained. Next, by reacting the obtained dichlorophosphoric acid ester having a nitrogen-containing perfluoroalkyl group with bromoethanol and then reacting trimethylamine in the presence of a silver carbonate catalyst, a quaternary ammonium salt is obtained, and finally, by performing hydrolysis, a nitrogen-containing fluorine-based compound having an amphoteric type hydrophilicity imparting group is obtained.

(Binder)

The surface coating material of the present embodiment includes a binder. Since the surface coating material includes a binder, when a surface coating layer (coating film) is formed on at least a part of the surface of the substrate by applying the surface coating material to the surface of the substrate to be treated, it is possible to enhance adhesion between the surface of the substrate and the surface coating layer (coating film). Furthermore, when a surface coating layer (coating film) is formed, the binder included in the surface coating material has a function of reducing the area in contact with the environment of the hydrophilic oil repellent itself by enclosing the hydrophilic oil repellent (nitrogen-containing fluorine-based compound), and thus, it is possible to improve sustainability of the hydrophilic oil repellent effect.

Specific examples of the binder include a resin or an inorganic glass. Examples of the resin include a thermoplastic resin, a thermoplastic elastomer, a thermosetting resin, a UV curable resin, and specific examples thereof include thermoplastic resins such as polyvinyl chloride, polyethylene, polypropylene, polycarbonate, polyester, polystyrene, a silicone resin, polyvinyl acetal, polyvinyl alcohol, an acrylic polyol-based resin, a polyester polyol-based resin, a urethane resin, a fluororesin, and a thermoplastic acrylic resin, and thermosetting resins such as an epoxy resin, a phenol resin, and a thermosetting acrylic resin.

Furthermore, to exhibit the characteristics of hydrophilicity and oil repellency at the maximum, hydrophilic polymers are preferably used as a binder. In addition, among the hydrophilic polymers, a hydrophilic polymer containing a hydroxyl group which bring about adhesion to the substrate or interaction such as a hydrogen bond with a hydrophilic oil repellent composite is preferable.

Specific examples of the hydrophilic polymer include polysaccharides such as polyvinyl alcohol, polyvinyl butyral and cellulose, and derivatives thereof. These may be used alone or in combination of two or more types thereof. The hydrophilic polymer may be crosslinked with a crosslinking agent. By such crosslinking, the durability of paint is improved.

The crosslinking agent is not particularly limited, and can be suitably selected depending on the purpose. Specific examples thereof include an epoxy compound, an isocyanate compound, an aldehyde compound, an ultraviolet crosslinking type compound, a leaving group-containing compound, a carboxylic acid compound, and a urea compound.

Specific examples of the inorganic glass include silane compounds such as a trialkoxysilane represented by the chemical formula $[R^{14}Si(OR^{15})_3]$ and a tetraalkoxysilane represented by the chemical formula $[Si(OR^{16})_4]$ ($R^{14}$ to $R^{16}$ are each independently an alkyl group having 1 to 6 carbon atoms), and water glass. Among these, since water glass has a high durability-improving effect, this is preferable.

In the surface coating material of the present embodiment, the mass composition ratio between a fluorine-based compound (hydrophilic oil repellent) described above and a binder is preferably within a range of 0.2 to 99.9:99.8 to 0.1, more preferably within a range of 2 to 98:98 to 2, and still more preferably within a range of 10 to 90:90 to 10. If the mass composition ratio of the hydrophilic oil repellent is 0.2 or greater, since the hydrophilicity and oil repellency is sufficiently obtained, this is preferable.

(Solvent)

Here, examples of the solvent which can be used in the surface coating material of the present embodiment include water, an organic solvent, and a mixture of water and an organic solvent. In addition, examples of the organic solvent include methanol, ethanol, IPA, tetrahydrofuran, hexane, chloroform, toluene, ethyl acetate, DMSO, DMF, acetone, and a fluorine-based solvent. In particular, from the viewpoint of ease of drying, ease of use, and environmental effects, water or alcohols such as methanol, ethanol, and IPA, or a mixture of water and alcohol is preferable. In addition, it is also possible to use a mixed solvent obtained by mixing a solvent compatible with these solvents. Specific examples of such solvents include ether-based solvents such as tetrahydrofuran, aliphatic hydrocarbon-based solvents such as hexane, halogenated hydrocarbon-based solvents such as chloroform, aromatic hydrocarbon-based solvents such as toluene, ester-based solvents such as ethyl acetate, ketone-based solvents such as acetone, and fluorine-based solvents such as hexafluoroxylene.

Here, in the surface coating material, the mass composition ratio between a fluorine-based compound (hydrophilic oil repellent) and a solvent is preferably within a range of 0.05 to 50:99.95 to 50, more preferably within a range of Ito 20:99 to 80, and still more preferably within a range of 2 to 10:98 to 90. If the mass composition ratio of the fluorine-based compound (hydrophilic oil repellent) in the surface coating material is 0.05 or greater, when treated, since it is possible to sufficiently render hydrophilicity and oil repellency to the entirety of the substrate, this is preferable. On the other hand, if the mass composition ratio of the fluorine-based compound in the surface coating material is 50 or less, since the solution dispersion stability of the surface coating material is excellent, this is preferable. In consideration of coatability and durability of products, the mass composition ratio between the fluorine-based compound in the surface coating material and the solvent is preferably within a range of 2 to 10:98 to 90.

According to the related art, a silane compound is used when hydrophilicity and oil repellency is imparted to a substrate. Therefore, there is a problem that the substrate to be treated is limited to glass.

In contrast, according to the surface coating material of the present embodiment, the binder can be suitably selected depending on the type or the shape of the substrate to be treated, or the application, and thus, it is possible to impart sufficient hydrophilicity and oil repellency to various substrates, and it is possible to improve sustainability of a hydrophilic oil repellent effect.

In addition to the fluorine-based compound (hydrophilic oil repellent) described above, the binder, and the solvent, to impart functions other than hydrophilicity and oil repellency, the surface coating material may further include an additive such as a pigment, a conductivity imparting agent, or a leveling agent, as an optional component.

<Production Method of Surface Coating Material>

The production method of the surface coating material of the present embodiment is not particularly limited as long as it is a mixing method in which the fluorine-based compound (hydrophilic oil repellent) can be dispersed or dissolved in a solvent. Specific examples of such a mixing method include a ball mill, a roll mill, a sand mill, a paint shaker, a homogenizer, an impeller stirrer, an ultrasonic disperser, and a magnetic stirrer.

<Coating Film>

By using the surface coating material described above, at least a part of the surface of the substrate can be coated with the coating film (surface coating layer). In the coating film, the mass composition ratio between the fluorine-based compound (hydrophilic oil repellent) and the binder is preferably within a range of 0.2 to 99.9:99.8 to 0.1. Here, if the mass composition ratio of the fluorine-based compound is 0.2 or greater, since sufficient hydrophilicity and oil repellency is obtained, this is preferable. In consideration of the adhesion to the substrate and the durability of the coating film, the mass composition ratio is more preferably within a range of 2 to 98:98 to 2, and particularly preferably within a range of 10 to 90:90 to 10.

<Forming Method of Coating Film>

As a forming method (that is, a usage method of a surface coating material) of a coating film (surface coating layer), specifically, for example, the surface coating material described above is applied onto at least a part of the surface of a substrate, and then, a drying treatment is performed for removing the solvent. Thereby, it is possible to form the coating film (surface coating layer) on at least a part of the surface of the substrate.

The substrate is not particularly limited, and glass, plastic, metal, ceramics, stainless steel, aluminum, wood, stone, cement, concrete, fiber, cloth, paper, leather, a combination thereof, a structure thereof, or a laminate thereof can be used.

The method of applying the surface coating material to the surface of a substrate is not particularly limited. Specific example thereof includes a dipping method of dipping a substrate in a surface coating material, a bar coater method, and a method using application means such as a spray, a brush, or a roller, or using a printing technique. Thereby, it is possible to form the coating film (surface coating layer) on a part or all of the surface of the substrate.

Although the conditions of the drying treatment of the coating film (surface coating layer) formed vary depending on the type and content of the solvent included in the surface coating material, for example, drying at room temperature for 1 to 24 hours, or drying by heating to an extent that the substrate is not influenced can be exemplified. Thereby, it is possible to form a coating film (hydrophilic oil repellent layer) including the nitrogen-containing fluorine-based compound (hydrophilic oil repellent) described above on a part or all of the surface of the substrate. In other words, it is possible to coat a part or all of the surface of the substrate with the coating film (hydrophilic oil repellent layer).

That is, it is possible to obtain a hydrophilic oil repellent member in which a coating film (hydrophilic oil repellent layer) has been provided on a part or all of the surface of the substrate.

<Hydrophilic Oil Repellent Member>

First, the hydrophilic oil repellent member which is one embodiment to which the present invention is applied will be described. The hydrophilic oil repellent member of the present embodiment is a hydrophilic oil repellent member in which a hydrophilic oil repellent layer (coating film) has been provided on a part or all of the surface of a substrate by the surface coating material described above.

As the substrate, the substrates (materials to be treated) exemplified as the treatment target of the surface coating material described above can be used.

Among these substrates, for example, a transparent resin substrate such as a PET film or a transparent inorganic material substrate such as plate glass (that is, glass plate) is preferably used. Thereby, it is possible to provide a hydrophilic oil repellent member having excellent transparency.

The hydrophilic oil repellent layer is a coating film formed on a part or all of the surface of a substrate using the surface coating material described above. Therefore, the hydrophilic oil repellent layer includes one or more nitrogen-containing fluorine-based compounds represented by the formulas (1) to (4) and a binder. In addition, the mass composition ratio between the nitrogen-containing fluorine-based compound and the binder in the hydrophilic oil repellent layer is preferably within a range of 0.2 to 99.9:99.8 to 0.1, as the mass composition ratio in the surface coating material. Here, if the mass composition ratio of the fluorine-based compound is 0.2 or greater, since sufficient hydrophilicity and oil repellency is obtained, this is preferable. In consideration of the adhesion to the substrate and the durability of the hydrophilic oil repellent layer (coating film), the mass composition ratio is more preferably within a range of 2 to 98:98 to 2, and particularly preferably within a range of 10 to 90:90 to 10.

(Evaluation of Hydrophilicity and Oil Repellency)

For the hydrophilic oil repellent member of the present embodiment, the evaluation of hydrophilicity and oil repellency can be performed by contact angle measurement, as in the surface coating material described above.

Specifically, as a result of the contact angle measurement, in a case where the static contact angle for water to a hydrophilic oil repellent layer (that is, a coating film formed by the surface coating material described above) provided on the surface of a substrate is 15° or less and the static contact angle for n-hexadecane is 65° or greater, the substrate is defined to have hydrophilicity and oil repellency (that is, a hydrophilic oil repellent member). Thus, oil stains are less likely to adhere to the surface of the hydrophilic oil repellent substrate. In addition, due to the presence of a hydrophilic group, even in a case where stains adhere, water easily infiltrates between the hydrophilic oil repellent layer (coating film) and the stains, and it is possible to make stains rise up and easily remove the stains.

In the hydrophilic oil repellent member of the present embodiment, it is preferable that the static contact angle for water in the hydrophilic oil repellent layer provided on the surface of a substrate be 15° or less, and the static contact angle for n-hexadecane be 65° or greater. If the static contact angle is within the above range, the action of the oil repellency imparting group and the hydrophilicity imparting group is excellent, and thus, it is possible to realize a hydrophilic oil repellent having excellent low adhesiveness of oil stains (that is, antifouling properties) and easy cleaning properties by water.

(Evaluation of Sustainability)

For the hydrophilic oil repellent member of the present embodiment, the evaluation of the sustainability of a hydrophilic oil repellent effect (that is, the durability of a hydrophilic oil repellent effect) can be performed by immersing the hydrophilic oil repellent member in water at room temperature for 1 hour, by drying, and by measuring the static contact angle for water and oil of the hydrophilic oil repellent layer (coating film) provided on the surface of the hydrophilic oil repellent. As a result of the static contact angle measurement for water and oil, if the difference between the measured values of the static contact angle for water and oil before and after immersion and drying is within 5°, it is determined that the sustainability of the hydrophilic oil repellent effect is good.

In the substrate to which hydrophilicity and oil repellency has been imparted by a method in the related art, in most cases, the adhesion between the coating film which exhibits hydrophilicity and oil repellency and the substrate is not sufficient or the durability of the coating film itself to water is not sufficient, and thus, if washing with water is performed after once being contaminated, there is a problem that hydrophilicity and oil repellency disappears. That is, there is a problem in the sustainability of the hydrophilic oil repellent effect.

In contrast, according to the hydrophilic oil repellent member of the present embodiment, the hydrophilic oil repellent layer provided on the surface of a substrate has a configuration including a binder suitable for improving adhesion to the substrate and durability to water. Therefore, the hydrophilic oil repellent layer has excellent adhesion to the substrate and durability to water, and thus, even in a case where washing with water is performed after once being contaminated, hydrophilicity and oil repellency does not disappear. That is, it is possible to provide a hydrophilic oil repellent member having excellent sustainability of the hydrophilic oil repellent effect.

(Evaluation of transparency)

For the hydrophilic oil repellent member formed of a transparent substrate, the evaluation of transparency can be performed by the total light transmittance (%). Here, the total light transmittance (%) can be measured using a haze meter ("NDH-300A" manufactured by Nippon Denshoku Industries Co., Ltd. or the like). Specifically, the total light transmittance (%) of the entire hydrophilic oil repellent member including the hydrophilic oil repellent layer was measured, and in a case where the total light transmittance is 90% or greater, it can be determined to be a hydrophilic oil repellent member having excellent transparency.

According to a transparent hydrophilic oil repellent member having excellent antifouling properties and easy cleaning properties, a member in the related art requiring transparency can also be replaced with the transparent hydrophilic oil repellent member. Thus, in the case of applications requiring transparency, for example, in a case where it is necessary to ensure visibility and the like, it is possible to easily maintain transparency over a long period of time.

Specifically, for example, according to the hydrophilic oil repellent member using a transparent glass plate, by replacing in application using a glass plate in the related art, it is possible to simply impart antifouling properties and easy cleaning properties to the glass plate of the application.

In addition, according to the hydrophilic oil repellent member having excellent flexibility and using a transparent PET film, by providing the PET film on the surface of another member as a protection film, it is possible to simply impart antifouling properties and easy cleaning properties to another member.

As described above, according to the surface coating material of the present embodiment, a specific nitrogen-containing fluorine-based compound is included as a hydrophilic oil repellent, and thus, it is possible to impart excellent hydrophilicity and oil repellency (hydrophilicity and oil repellency) to the substrate to be treated. Furthermore, the surface coating material of the present embodiment includes a binder suitably selected depending on the type of the substrate to be treated at a required mass composition ratio with respect to the nitrogen-containing fluorine-based compound, and since it is possible to improve the adhesion between the hydrophilic oil repellent layer (coating film) exhibiting hydrophilic and oil repellency and the substrate, improve the durability of the hydrophilic oil repellent layer itself, or improve the durability to water, it is possible to improve sustainability of the hydrophilic oil repellent effect.

In addition, according to the surface coating material of the present embodiment, by suitably selecting the types of the nitrogen-containing fluorine-based compound which becomes a hydrophilic oil repellent and the binder, it is possible to form a hydrophilic oil repellent layer (coating film) which exhibits hydrophilicity and oil repellency to the substrate without impairing the transparency of the substrate.

Furthermore, since the surface coating material of the present embodiment includes only the nitrogen-containing fluorine-based compound represented by the formulas (1) to (4) as a hydrophilic oil repellent and does not contain a perfluoroalkyl group having 8 or more carbon atoms which are continuously bonded, while the surface coating material has a chemical structure without concern of generating PFOS or PFOA which becomes a problem in terms of bioaccumulation and environmental adaptability, and can impart excellent hydrophilicity and oil repellency to the substrate.

Since a hydrophilic oil repellent layer which exhibits hydrophilicity and oil repellency is provided on the surface of a substrate by the surface coating material described above, the hydrophilic oil repellent member of the present embodiment has excellent antifouling properties and easy cleaning properties. Furthermore, since the adhesion between the hydrophilic oil repellent layer (coating film) and the substrate, the durability of the hydrophilic oil repellent layer itself, and the durability to water are excellent, the sustainability of effect is also excellent.

In addition, according to the hydrophilic oil repellent member having excellent transparency, a member (for example, a glass plate or the like) in the related art requiring transparency can also be easily replaced with the transparent hydrophilic oil repellent member, and it is possible to simply impart antifouling properties and easy cleaning properties to the member.

<Member with Stain Adhesion-preventing Film>

Hereinafter, as a specific aspect of the hydrophilic oil repellent member described above, a member with a stain adhesion preventing film will be described in detail.

The member with a stain adhesion preventing film which is one aspect of the hydrophilic oil repellent member described above is roughly configured to have a main body (substrate) and a stain adhesion preventing film (coating film or surface coating layer) formed on at least a part of the surface of the main body.

(Main body)

The main body to which a stain adhesion preventing film is imparted is not particularly limited as long as it is a member in which stains is less likely to adhere on the surface of the member and in which stains is desired to be easily removed by washing with water. Examples of such a member include a kitchen utensil and a sanitary utensil.

Specific examples of a kitchen utensil include a kitchen panel, a range hood, a gas table, and a cooking utensil.

Specifically, for example, the sanitary utensil is a member used in a sanitary facility such as a toilet, a bathroom, or a washroom, and examples thereof include ceiling, a wall, a door, and a mirror of a toilet, a bathroom and a washroom, a washstand, a bathtub, and a toilet bowl.

In addition, as the main body of the member with a stain adhesion preventing film of the present aspect, a resin film such as a PET film having a total light transmittance of 90% or greater may be used. Thus, by using a resin film such as a PET film having excellent transparency as the main body, it is possible to provide a hydrophilic oil repellent film having good familiarity with water (static contact angle for water, at most 15°) while showing stain low adhesion performance in which oil (here, n-hexadecane) is repelled and oil droplets are scattered if air is sprayed.

The evaluation of transparency of the resin film can be performed by the total light transmittance (%). Here, the total light transmittance (%) can be measured using a haze meter ("NDH-300A" manufactured by Nippon Denshoku Industries Co., Ltd. or the like). Specifically, the total light transmittance (%) of the entire main body is measured, and in a case where the total light transmittance is 90% or greater, this can be used as the main body of the present aspect.

(Stain Adhesion Preventing Film)

The stain adhesion preventing film of the present aspect is a film (corresponds to the coating film and the surface coating layer described above) which exhibits hydrophilicity and oil repellency, provided on a part or all of the surface of the substrate of the main body. Although the surface of the main body is not particularly limited, at least, it is possible to select an arbitrary place such as a place where stains easily adhere or a place where it is desired to prevent adhesion of stains. In addition, the stain prevention film may be a continuous film or a discontinuous film.

(Evaluation of Hydrophilicity and Oil Repellency)

For the member with a stain adhesion preventing film of the present aspect, the evaluation of hydrophilicity and oil repellency can be performed by contact angle measurement, as in the hydrophilic oil repellent member described above.

Specifically, as a result of the contact angle measurement, in a case where the static contact angle for water to the stain adhesion preventing film provided on the surface of the main body is 15° or less and the static contact angle for n-hexadecane is 65° or greater, the member is defined to have hydrophilicity and oil repellency (that is, a member with a stain adhesion preventing film). Thus, oil stains are less likely to adhere to the surface of the main body which became hydrophilic oil repellent. In addition, due to the presence of a hydrophilic group, even in a case where stains adhere, water easily infiltrates between the stain adhesion preventing film (coating film, surface coating layer) and the stains, and it is possible to make stains rise up and easily remove the stains.

In the member with a stain adhesion preventing film of the present aspect, it is preferable that the static contact angle for water in the stain adhesion preventing film provided on the surface of the main body be 15° or less, and the static contact angle for n-hexadecane be 65° or greater. If the static contact angle is within the above range, the action of the oil repellency imparting group and the hydrophilicity imparting group is excellent, and thus, it is possible to realize a member with a stain adhesion preventing film having excellent low adhesiveness of oil stains (that is, antifouling properties) and easy cleaning properties by water.

(Evaluation of transparency)

For the member with a stain adhesion preventing film formed of a transparent main body, the evaluation of transparency can be performed by the total light transmittance (%). Here, the total light transmittance (%) can be measured using a haze meter ("NDH-300A" manufactured by Nippon Denshoku Industries Co., Ltd. or the like). Specifically, the total light transmittance (%) of the entire member with a stain adhesion preventing film including the stain adhesion preventing film (coating film, surface coating layer) is measured, and in a case where the total light transmittance is 90% or greater, it is possible to determine to be a member with a stain adhesion preventing film having excellent transparency.

In addition, according to the member with a stain adhesion preventing film (film with a stain adhesion preventing film) having excellent antifouling properties and easy cleaning properties and using a transparent PET film, by providing the PET film on the surface of another member as a protection film, it is possible to simply impart antifouling properties and easy cleaning properties to another member.

<Production Method of Member with Stain Adhesion-preventing Film>

In the production method (that is, a method of forming a stain adhesion preventing film) of producing the member with a stain adhesion preventing film of the present aspect, specifically, for example, the surface coating material described above is applied to the surface of the main body, and then, a drying treatment is performed to remove the solvent component included in the surface coating material. Thus, it is possible to form a coating film (stain adhesion preventing film) on the surface of the main body.

For example, in the member with a stain adhesion preventing film in the related art in the applications for kitchen and sanitary, in a surface modifying agent, in particular, materials exhibiting hydrophilic and oil repellency, it is necessary to design and synthesize at least two or more compounds to impart hydrophilicity or oil repellency, or both characteristics, it is also necessary to study the composition ratio and to study combination methods for adjusting the balance between hydrophilicity and oil repellency, and there is a problem that sufficient antifouling properties and easy cleaning properties cannot be obtained due to the fact that handling of a plurality of compounds is difficult.

In contrast, according to the member with a stain adhesion preventing film of the present aspect, it is possible to easily provide a stain adhesion preventing film (coating film, surface coating layer) that exhibits hydrophilicity and oil repellency on the surface of the main body by the surface coating material described above. In addition, since the stain adhesion preventing film including the specific nitrogen-containing fluorine-based compound described above as a hydrophilic oil repellent is provided in the member with a stain adhesion preventing film of the present aspect, the member has excellent antifouling properties and easy cleaning properties. Furthermore, since the adhesion between the stain adhesion preventing film and the surface of the main body and the durability of the stain adhesion preventing film itself are excellent, the sustainability of effect is also excellent.

In addition, according to the member with a stain adhesion preventing film having excellent flexibility and using a transparent PET film, by providing the PET film on the surface of another member as a protection film, it is possible to simply impart antifouling properties and easy cleaning properties to another member.

Furthermore, since the member with a stain adhesion preventing film of the present aspect includes only the nitrogen-containing fluorine-based compound represented by the formulas (1) to (4) as a hydrophilic oil repellent and does not contain a perfluoroalkyl group having 8 or more carbon atoms which are continuously bonded, while the surface coating material has a chemical structure without concern of generating PFOS or PFOA which becomes a problem in terms of bioaccumulation and environmental adaptability, and can exhibit excellent hydrophilicity and oil repellency.

<Oil Contamination Protection Tool>

Next, as a specific aspect of the hydrophilic oil repellent member described above, an oil contamination protection tool will be described with reference to the drawings in detail. In the drawings used in the following description, to make the characteristics of the present invention easy to understand, there are cases where the main portion is shown in an enlarged view for convenience, and the dimensional ratio of each constituent element is not necessarily the same as the actual.

The oil contamination protection tool which is another aspect of the hydrophilic oil repellent described above is an oil contamination protection tool for preventing sticking of oils, having a substrate covering a part of the body and an oil/water separator having hydrophilicity and oil repellency formed on at least a part of the substrate, and the oil/water separator has a configuration in which a fluorine-based compound having an oil repellency imparting group and a hydrophilicity imparting group is included.

(First Example)

As a first example of the oil contamination protection tool which is another aspect of the hydrophilic oil repellent described above, work shoes used in a workshop where fats and oils are present on the floor surface are exemplified.

FIG. 1(a) is a side plan view showing a work shoe (oil contamination protection tool) in the first example, and FIG. 1(b) is a plan view showing a ground surface of the shoe sole of the work shoe.

The work shoe (oil contamination protection tool) 20 in the first example is formed of an upper portion 21 and a shoe sole (substrate) 22 bonded to the upper part 21. The upper portion 21 is formed of, for example, soft cloth or leather in which the surface has been subjected to waterproof finish.

The shoe sole 22 is entirely formed of a resilient synthetic resin, for example, ethylene vinyl acetate (EVA) or polyvinyl chloride (PVC). On the ground surface 22a of the shoe sole 22, a plurality of island-shape tread patterns 23 for preventing slip at the time of walking are formed. The respective tread patterns 23 are partitioned by the groove portion 24.

Figure 2:
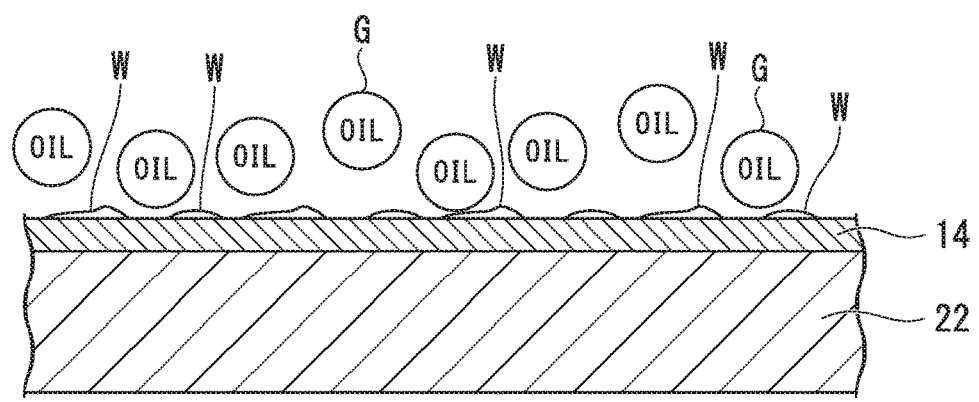
FIG. 2 is an enlarged sectional schematic view of a main portion showing a substrate on which an oil/water separator has been formed.

As shown in FIG. 2, an oil/water separator 14 is applied in a layer shape to the groove portion 24 (refer to FIG. 1) of the shoe sole (substrate) 22. The oil/water separator 14 is configured of a material including a fluorine-based compound having an oil repellency imparting group and a hydrophilicity imparting group. The oil repellency imparting group is a functional group that forms oil droplets with a static contact angle of, for example, 65° or greater on the surface of the oil/water separator 14. In addition, the hydrophilicity imparting group is a functional group that imparts the wettability to moisture with a static contact angle of, for example, 15° or less on the surface of the oil/water separator 14. Such a contact angle can be measured by, for example, an automatic contact angle meter ("Drop Master 701" manufactured by Kyowa Interface Science Co., Ltd.).

Due to the presence of such an oil repellency imparting group and a hydrophilicity imparting group, the oil/water separator 14 imparts hydrophilicity and oil repellency to the groove portion 24 of the shoe sole (substrate) 22. If oil (fat and oil) such as lard comes into contact with the groove portion 24 to which the oil/water separator 14 has been applied, due to the oil repellency of the oil/water separator 14, the oil agglomerates as oil droplets (oil clot) G having a large static contact angle.

For example, if water is sprayed to the shoe sole (substrate) 22 to which the oil droplets G have adhered, due to the hydrophilicity of the oil/water separator 14, the water becomes an aqueous layer having a small static contact angle and spreads along the shoe sole (substrate) 22, and oil droplets (oil clot) G are easily peeled off. By such action, the oil/water separator 14 repels oil so as not to be stuck to the shoe sole (substrate) 22, and it is possible to easily wash off oil by washing with water due to hydrophilicity.

The fluorine-based compound configuring the oil/water separator 14 includes, for example, at least one or more of fluorine-based compounds represented by the formulas (1) to (4). As described above, the fluorine-based compound represented by the formulas (1) to (4) is a hydrophilic oil repellent including an oil repellency imparting group and a hydrophilicity imparting group in the molecule. In addition, a mixture including one or more fluorine-based compounds selected from among the group consisting of fluorine-based compounds represented by the formulas (1) to (4) may be used as the oil/water separator 14.

"Binder"

The oil/water separator 14 in the first example is a separator in which the nitrogen-containing fluorine-based compound (hydrophilic oil repellent) represented by the formulas (1) to (4) is applied alone to a substrate such as a shoe sole, or applied to a substrate such as a shoe sole together with a binder. In other words, the fluorine-based compound (hydrophilic oil repellent) configuring the oil/water separator 14 exists on the substrate. In addition, since the fluorine-based compound is not lost by moisture or the like, the fluorine-based compound is preferably stuck to the substrate as the oil/water separator 14.

Specifically, a part or all of the surface of the substrate 22 may be coated with a coating film including the nitrogen-containing fluorine-based compound (hydrophilic oil repellent) represented by the formulas (1) to (4) or a coating film including the nitrogen-containing fluorine-based compound represented by the formulas (1) to (4) and a binder.

There is a case where the coating film is formed of only the fluorine-based compound (hydrophilic oil repellent), and there is a case where the coating film includes a binder. In the case of including a binder, the mass composition ratio between a hydrophilic oil repellent and a binder is preferably within a range of 0.2 to 99.9:99.8 to 0.1, more preferably within a range of 2 to 98:98 to 2, and still more preferably within a range of 10 to 90:90 to 10. If the mass composition ratio of the hydrophilic oil repellent is 0.2 or greater, since the hydrophilicity and oil repellency is sufficiently obtained, this is preferable.

Examples of the binder include an organic binder (resin) or an inorganic binder (inorganic glass) described above.

To exhibit the characteristics of hydrophilicity and oil repellency which the oil/water separator 14 has at the maximum, it is desirable to use a binder. As the binder, it is preferable to use a hydrophilic polymer. In addition, as the hydrophilic polymer, a hydrophilic polymer containing a hydroxyl group is preferable.

Specific examples of the hydrophilic polymer include polyvinyl alcohol, polyvinyl butyral, and polysaccharides such as cellulose, and derivatives thereof. These may be used alone or in combination of two or more types thereof. The hydrophilic polymer may be crosslinked with the crosslinking agent described above. By such crosslinking, the durability of a coating film is improved.

Specific examples of the inorganic binder (inorganic glass) include a silane compound and water glass, as described above. Among these, since water glass has a high durability-improving effect, this is preferable.

In addition, inorganic particles such as fumed silica or colloidal silica can also be used as an inorganic reinforcing material, and by adding an inorganic reinforcing material, it is possible to reduce the dissolution properties of the nitrogen-containing fluorine-based compound into water and to improve the strength of the coating film.

When the oil/water separator 14 is actually formed on the substrate such as the shoe sole 22, for example, it is preferable to form an oil/water separation layer by applying a coating material including a solvent and a binder to the substrate.

"Substrate"

The organic material capable of being used as the substrate 22 of the work shoe in the first example is not particularly limited, and specific examples thereof include ethylene vinyl acetate (EVA), polyvinyl chloride (PVC), cellulose cloth (polyester, polyethylene, polypropylene, polytetrafluoroethylene, nylon, polyimide, polyacrylonitrile, polysulfone, polyether sulfone, polyphenylene sulfide and the like), nonwoven fabric (polyester, polyethylene, polypropylene, rayon, nylon, polyphenylene sulfide, and the like), and fiber (a resin, glass, ceramics, and metal).

In the oil/water separator 14, the fluorine-based compound (hydrophilic oil repellent) represented by the formulas (1) to (4) is supported on the substrate.

As a method of supporting the fluorine-based compound on a substrate, a method in which a substrate to be supported is immersed in a solution or a dispersion of the fluorine-based compound (hydrophilic oil repellent) or a substrate to be supported is spray-coated with the solution or the dispersion, and the solvent is removed by drying can be applied.

In addition to a hydrophilic oil repellent, a binder, and an inorganic reinforcing material, the oil/water separator 14 may further include an additive to impart functions other than the hydrophilicity and oil repellency, such as a fluidity improver, a surfactant, a flame retardant, a conductivity imparting agent, and a fungicide, as optional components.

The action of a work shoe which is one example of the oil contamination protection tool having such a configuration will be described.

For example, when the work shoe (oil contamination protection tool) 20 in the first example is used in a kitchen or a food processing factory, even if oil (fat and oil) adheres to the groove portion 24 of the shoe sole (substrate) 22, it is possible to easily wash out the adhered oil by washing with water. That is, by the oil/water separator 14 formed in the groove portion 24 of the shoe sole 22, hydrophilicity and oil repellency is imparted to the groove portion 24 of the shoe sole 22.

If oil (fat and oil) such as lard comes into contact with the groove portion 24 to which the oil/water separator 14 has been applied so as to be a layer, due to the oil repellency of the oil/water separator 14, the oil agglomerates as oil droplets (oil clot) G having a large static contact angle. Only by spraying water, due to the hydrophilicity of the oil/water separator 14, moisture becomes an aqueous layer having a small static contact angle and spreads along the shoe sole (substrate) 22, and oil droplets (oil clot) G are easily peeled off and washed off. As work shoes in the related art, it is prevented that water is repelled by water repellency of the resin, and due to this, removal of oil by washing with water becomes difficult. In addition, increase in environmental burden due to use of a surfactant (detergent) or abrasion of the shoe sole due to use of brush or the like can be prevented.

(Second Example)

Next, as a second example of the oil contamination protection tool, work gloves used in factories where machine oil or the like is present are exemplified.

Figure 3:
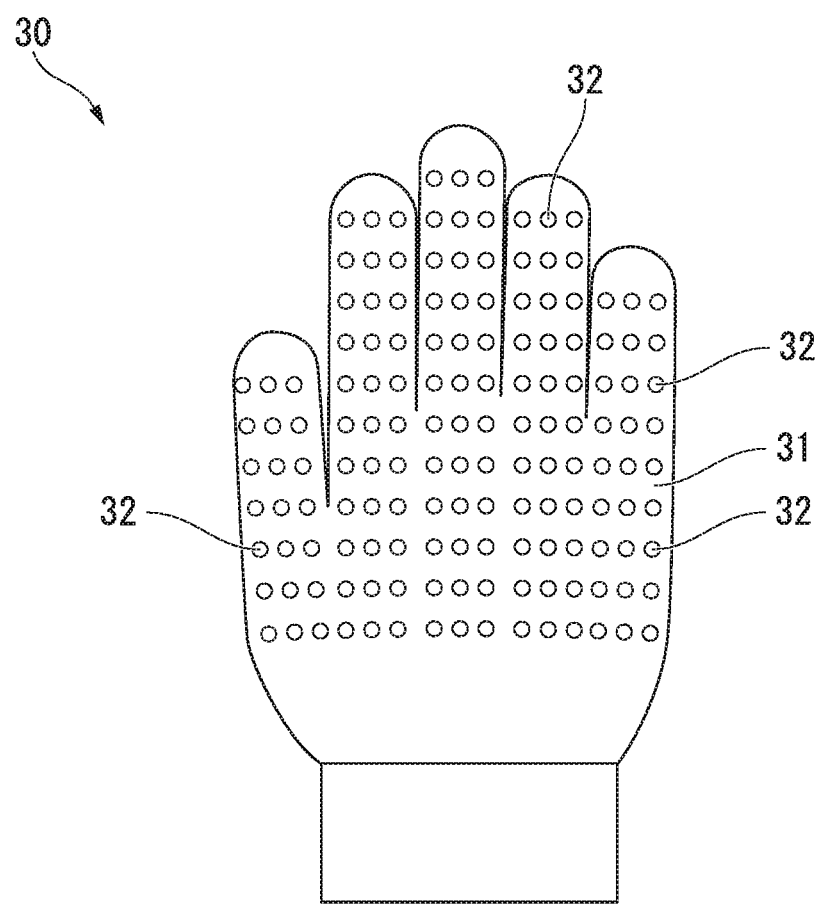
FIG. 3 is a plan view showing a glove which is one example of the oil contamination protection tool.

FIG. 3 is a plan view showing a glove (oil contamination protection tool) in the second example.

The glove (oil contamination protection tool) 30 in the second example has a bag shape substrate 31 representing a palm and a large number of protrusions 32 formed of the resin formed on the holding surface of the substrate 31. The protrusion 32 prevents slip and is configured of an elastic resin.

The substrate 31 of the glove (oil contamination protection tool) 30 is formed of a fibrous material, for example, a woven fabric. The oil/water separator 14 as shown in FIG. 2 is formed on the substrate 31.

According to the glove (oil contamination protection tool) 30 of the second example, even if oil adheres to the substrate 31, it is possible to easily wash out the adhered oil by washing with water. That is, since hydrophilicity and oil repellency is imparted by the oil/water separator 14 formed on the substrate 31, even if machine oil or the like adheres to the fibrous substrate 31, the oil agglomerates as oil droplets having a large static contact angle. Only by washing the glove 30 with water, due to the hydrophilicity of the oil/water separator 14, moisture becomes an aqueous layer having a small static contact angle and is soaked into the substrate 31, and due to this, oil droplets float up. Thus, even without using a surfactant (detergent) or the like, it is possible to easily remove the oil adhered to the glove 30 only by washing with water.

(Third Example)

Besides the work shoe of the first example and the glove of the second example, the oil contamination protection tool which is another aspect of the hydrophilic oil repellent member described above can be applied to various protection tools for preventing adhesion of oil in the environment where oil is present.

Figure 4:
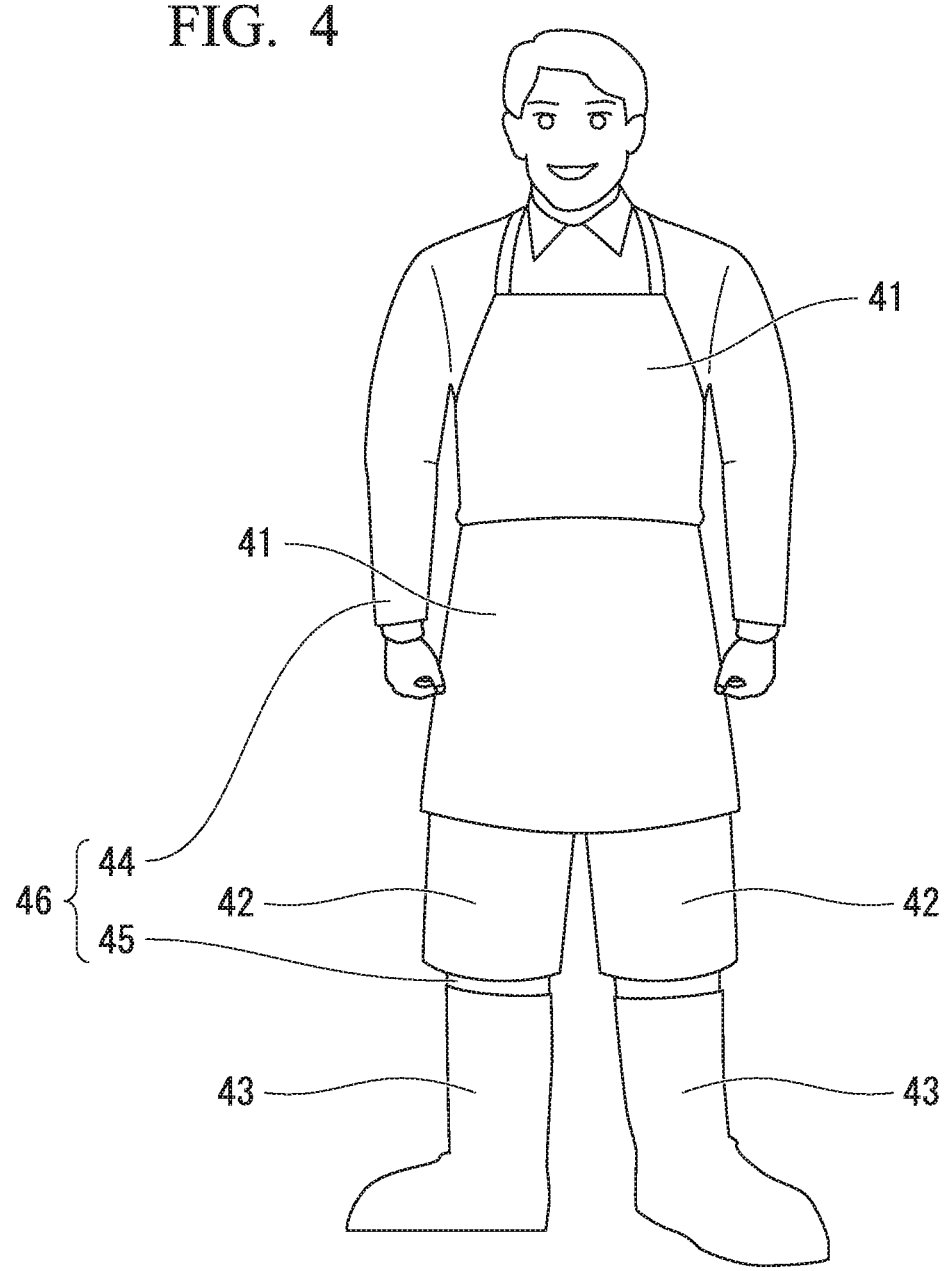
FIG. 4 is a plan view showing another example of the oil contamination protection tool.

For example, as shown in FIG. 4, an apron 41 covering the chest or the waist of the body can also be applied to a knee pad 42 covering the leg including the knee portion or boots 43. By forming an oil/water separator on the substrate configuring the apron 41, the knee pad 42, or the boots 43, hydrophilicity and oil repellency is imparted, and it is possible to easily remove the oil adhered only by washing with water.

In addition, it is also preferable to form an oil/water separator on the substrate (cloth) configuring working clothes 46 such as an upper garment 44 and trousers 45 worn by the operator. By forming an oil/water separator in the working clothes 46 to impart hydrophilicity and oil repellency, it is possible to easily remove the oil adhered to the working clothes 46 only by washing with water.

The technical scope of the present invention is not limited to the above embodiments, and various modifications are possible without departing from the scope of the present invention.

EXAMPLES

Examples of the invention will be described below together with Comparative Examples. The present invention is not limited to these examples.

<Nitrogen-Containing Fluorine-Based Compound>

Synthesis Example 1

Synthesis of 2-[3-[[perfluoro(3-dibutylaminopropanoyl)]amino]propyl-dimethyl-ammonium] acetate 20 g of perfluoro(3-dibutylaminopropionic acid) fluoride obtained by electrolytic fluorination of methyl 3-dibutylaminopropionate was added dropwise to a solution obtained by dissolving 4 g of dimethylaminopropylamine in 50 ml of an IPE solvent, in an ice bath. After the resulting product was stirred at room temperature for 2 hours, filtration was performed, then, IPE layer of the filtrate was subjected to a washing treatment with an NaHCO$_3$ aqueous solution and an NaCl aqueous solution, and after liquid-liquid separation was performed, washing with water was performed. Thereafter, the IPE was distilled off, whereby 14 g of (C$_4$F$_9$)$_2$NC$_2$F$_4$CONHC$_3$H$_6$N(CH$_3$)$_2$ was obtained as a crude product (yield of 60%).

Next, 3 g of (C$_4$F$_9$)$_2$NC$_2$F$_4$CONHC$_3$H$_6$N(CH$_3$)$_2$ obtained above was refluxed overnight with sodium monochloroacetate under stirring in ethanol, whereby 3 g of dimethyl betaine substance represented by the following Formula (376) was obtained (yield of 92%).

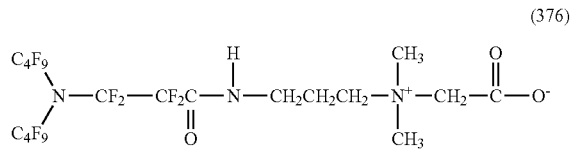

(376)

Synthesis Example 2

Synthesis of 2-[3-[[perfluoro(2-methyl-3-dibutylaminopropanoyl)]amino]propyl-dimethyl-ammonium] acetate 160 g of perfluoro(2-methyl-3-dibutylaminopropionic acid) fluoride obtained by electrolytic fluorination of methyl 2-methyl-3-dibutylaminopropionate was added dropwise to a solution obtained by dissolving 50 g of dimethylaminopropylamine in 500 ml of an IPE solvent, in an ice bath. After the resulting product was stirred at room temperature for 2 hours, filtration was performed, then, IPE layer of the filtrate was subjected to a washing treatment with an NaHCO$_3$ aqueous solution and an NaCl aqueous solution, and after liquid-liquid separation was performed, washing with water was performed. Thereafter, the IPE was distilled off, and distillation was further performed, whereby 94 g of (C$_4$F$_9$)$_2$NCF$_2$CF(CF$_3$)CONHC$_3$H$_6$N(CH$_3$)$_2$ was obtained as a crude product (yield of 52%).

Next, 66 g of (C$_4$F$_9$)$_2$NCF$_2$CF(CF$_3$)CONHC$_3$H$_6$N(CH$_3$)$_2$ obtained above was refluxed overnight with sodium monochloroacetate under stirring in ethanol, and the resulting product was filtered and concentrated, whereby 65 g of dimethyl betaine substance represented by the following Formula (377) was obtained (yield of 91%).

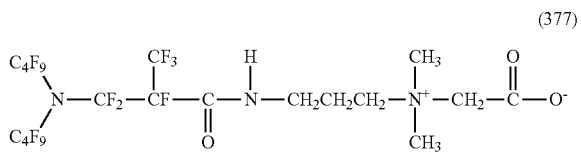

(377)

Synthesis Example 3

Synthesis of perfluoro(3-dibutylaminopropionic acid) calcium 352 g of a 12.5% (mass percent concentration, and hereinafter, the same is applied) sodium hydroxide aqueous solution was put into a 2 L glass flask, and by adding 837 g of perfluoro(3-dibutylaminopropionic acid) fluoride obtained by electrolytic fluorination of methyl 3-dibutylaminopropionate dropwise thereto, a reaction was performed. After adding dropwise, 500 mL of ethyl acetate was added thereto, and by extraction, perfluoro(3-dibutylaminopropionic acid) sodium was obtained. After the ethyl acetate layer and the water were separated, the ethyl acetate was distilled off using a rotary evaporator, whereby 488 g of perfluoro (3-dibutylaminopropionic acid) sodium was obtained as a pale yellow solid.

Next, 488 g of perfluoro(3-dibutylaminopropionic acid) sodium and 280 g of 95% sulfuric acid were put into a 1 L glass flask, followed by mixing, and distillation was performed under reduced pressure, whereby 436 g of perfluoro (3-dibutylaminopropionic acid) which was a solid at room temperature was obtained (the yield from the sodium salt was 93%).

23.5 g of perfluoro(3-dibutylaminopropionic acid) was neutralized with 1.5 g of calcium hydroxide in a methanol/water mixed solution. The precipitated crystals were separated by filtration, and dried at 100° C., whereby 23.5 g of perfluoro(3-dibutylaminopropionic acid) calcium represented by the following Formula (378) was obtained (yield of 97%). The solubility of the present compound in water at room temperature (25° C.) was 2 [g/100 g-H$_2$O].

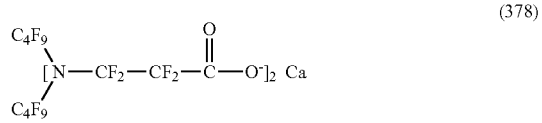

(378)

Synthesis Example 4

Synthesis of 3-[[perfluoro(3-dibutylaminopropanoyl)]amino]propyl-trimethyl-ammonium iodide 10 g of perfluoro(3-dibutylaminopropionic acid) fluoride obtained by electrolytic fluorination of methyl 3-dibutylaminopropionate was added dropwise to a solution obtained by dissolving 4 g of dimethylaminopropylamine in 50 ml of an IPE solvent, in an ice bath. After the resulting product was stirred at room temperature for 2 hours, filtration was performed, then, IPE layer of the filtrate was subjected to a washing treatment with an NaHCO$_3$ aqueous solution and an NaCl aqueous solution, and after liquid-liquid separation was performed, washing with water was performed. Thereafter, the IPE was distilled off, whereby 7 g of (C$_4$F$_9$)$_2$NC$_2$F$_4$CONHC$_3$H$_6$N(CH$_3$)$_2$ was obtained as a crude product (yield of 62%).

Next, methyl iodide was added to the obtained crude product in methyl ethyl ketone, and the resulting product was stirred at room temperature overnight. After the reaction ended, collection by filtration was performed, whereby 6 g of a quaternary ammonium iodide represented by the following Formula (379) was obtained (yield of 71%).

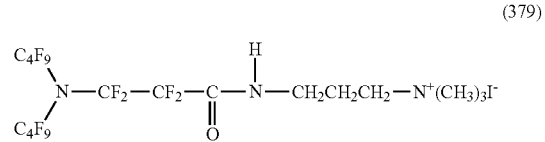

(379)

Synthesis Example 5

Synthesis of 2-[3-[[perfluoro(2-diethylaminoethylsulfonyl)]amino]propyl-dimethyl-ammonium] acetate Perfluoro(3-diethylamino)propionyl fluoride obtained by electrolytic fluorination of methyl 3-diethylaminopropionate was derived to perfluoro[2-(diethylamino)ethanesulfonic acid fluoride by the method described in Japanese Patent No. 4406700, and 50 g thereof was added dropwise to a solution obtained by dissolving 24.1 g of dimethylaminopropylamine in 250 ml of an IPE solvent, in an ice bath. After the resulting product was stirred at room temperature for 2 hours, filtration was performed, then, IPE layer of the filtrate was subjected to a washing treatment with an NaHCO$_3$ aqueous solution and an NaCl aqueous solution, and after liquid-liquid separation was performed, washing with water was performed. Thereafter, the IPE was distilled off, and distillation was further performed, whereby 29.4 g of (C$_2$F$_5$)$_2$NCF$_2$CF$_2$SO$_2$NHC$_3$H$_6$N(CH$_3$)$_2$ was obtained as a crude product (yield of 50%).

Next, 10 g of (C$_2$F$_5$)$_2$NCF$_2$CF$_2$SO$_2$NHC$_3$H$_6$N(CH$_3$)$_2$ obtained above was refluxed overnight with sodium monochloroacetate under stirring in ethanol, and the resulting product was filtered and concentrated, whereby 11 g of dimethyl betaine substance represented by the following Formula (380) was obtained (yield of 99%).

(380)

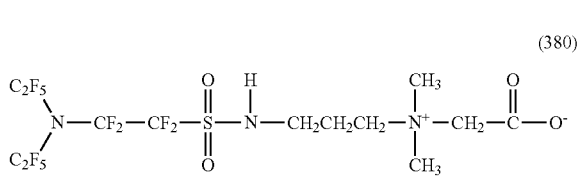

Synthesis Example 6

Synthesis of 2-[3-[[perfluoro(2-methyl-3-dihexylaminopropanoyl)]amino]propyl-dimethyl-ammonium] acetate 20 g of perfluoro(2-methyl-3-dihexylaminopropionic acid) fluoride obtained by electrolytic fluorination of methyl 2-methyl-3-dihexylaminopropionate was added dropwise to a solution obtained by dissolving 5 g of dimethylaminopropylamine in 50 ml of an IPE solvent, in an ice bath. After the resulting product was stirred at room temperature for 2 hours, filtration was performed, then, IPE layer of the filtrate was subjected to a washing treatment with an $NaHCO_3$ aqueous solution and an NaCl aqueous solution, and after liquid-liquid separation was performed, washing with water was performed. Thereafter, the IPE was distilled off, and distillation was further performed, whereby 7.7 g of $(C_6F_{13})_2 NCF_2CF(CF_3)CONHC_3H_6N(CH_3)_2$ was obtained as a crude product (yield of 35%).

Next, 5 g of $(C_6F_{13})_2NCF_2CF(CF_3)CONHC_3H_6N(CH_3)_2$ obtained above was refluxed overnight with sodium monochloroacetate under stirring in ethanol, and the resulting product was filtered and concentrated, whereby 5.2 g of dimethyl betaine substance represented by the following Formula (381) was obtained (yield of 97%).

(381)

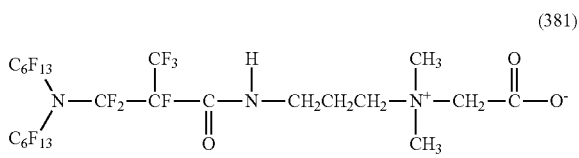

Synthesis Example 7

Synthesis of 3-[3-[[perfluoro(2-methyl-3-dibutylaminopropanoyl)]amino]propyl-dimethyl-ammonium] propanesulfonate 120 g of perfluoro(2-methyl-3-dibutylaminopropionic acid) fluoride obtained by electrolytic fluorination of methyl 2-methyl-3-dibutylaminopropionate was added dropwise to a solution obtained by dissolving 39 g of dimethylaminopropylamine in 500 ml of an IPE solvent, in an ice bath. After the resulting product was stirred at room temperature for 2 hours, filtration was performed, then, IPE layer of the filtrate was subjected to a washing treatment with an $NaHCO_3$ aqueous solution and an NaCl aqueous solution, and after liquid-liquid separation was performed, washing with water was performed. Thereafter, the IPE was distilled off, and distillation was further performed, whereby 64 g of $(C_4F_9)_2NCF_2CF(CF_3)CONHC_3H_6N(CH_3)_2$ was obtained as a crude product (yield of 47%).

Next, 1.5 g of $(C_4F_9)_2NCF_2CF(CF_3)CONHC_3H_6N(CH_3)_2$ obtained above was refluxed for 23 hours with 1,3-propanesultone under stirring in acetonitrile, and reprecipitation was performed in a mixed solvent of a fluorine-based solvent (manufactured by Asahi Glass Co., Ltd., AK 225) and IPE, whereby 1.3 g of sulfobetaine substance represented by the following Formula (382) was obtained (yield of 75%).

(382)

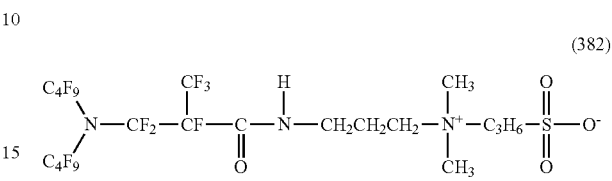

Synthesis Example 8

Synthesis of 4-[3-[[perfluoro(2-methyl-3-dibutylaminopropanoyl)]amino]propyl-dimethyl-ammonium butanesulfonate 120 g of perfluoro(2-methyl-3-dibutylaminopropionic acid) fluoride obtained by electrolytic fluorination of methyl 2-methyl-3-dibutylaminopropionate was added dropwise to a solution obtained by dissolving 39 g of dimethylaminopropylamine in 500 ml of an IPE solvent, in an ice bath. After the resulting product was stirred at room temperature for 2 hours, filtration was performed, then, IPE layer of the filtrate was subjected to a washing treatment with an $NaHCO_3$ aqueous solution and an NaCl aqueous solution, and after liquid-liquid separation was performed, washing with water was performed. Thereafter, the IPE was distilled off, and distillation was further performed, whereby 64 g of $(C_4F_9)_2NCF_2CF(CF_3)CONHC_3H_6N(CH_3)_2$ was obtained as a crude product (yield of 47%).

Next, 15 g of $(C_4F_9)_2NCF_2CF(CF_3)CONHC_3H_6N(CH_3)_2$ obtained above was refluxed for 18 hours with 4.2 g of 1,4-butanesultone under stirring in acetonitrile, and reprecipitation was performed in a mixed solvent of a fluorine-based solvent (manufactured by Asahi Glass Co., Ltd AK 225) and IPE, whereby 13.3 g of sulfobetaine substance represented by the following Formula (383) was obtained (yield of 75%).

(383)

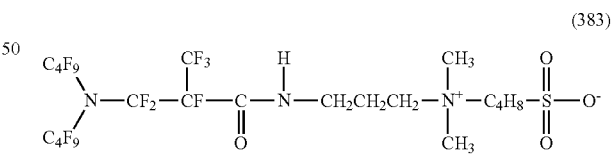

Synthesis Example 9

Synthesis of 3-[3-[[perfluoro(2-methyl-3-dibutylaminopropanoyl)]amino]propyl-dimethyl-ammonium] 2-hydroxypropane-1-sulfonate 120 g of perfluoro(2-methyl-3-dibutylaminopropionic acid) fluoride obtained by electrolytic fluorination of methyl 2-methyl-3-dibutylaminopropionate was added dropwise to a solution obtained by dissolving 39 g of dimethylaminopropylamine in 500 ml of an IPE solvent, in an ice bath.

After the resulting product was stirred at room temperature for 2 hours, filtration was performed, then, IPE layer of the filtrate was subjected to a washing treatment with an $NaHCO_3$ aqueous solution and an NaCl aqueous solution, and after liquid-liquid separation was performed, washing with water was performed. Thereafter, the IPE was distilled off, and distillation was further performed, whereby 64 g of $(C_4F_9)_2NCF_2CF(CF_3)CONHC_3H_6N(CH_3)_2$ was obtained as a crude product (yield of 47%).

Next, 5.0 g of $(C_4F_9)_2NCF_2CF(CF_3)CONHC_3H_6N(CH_3)_2$ obtained above was mixed with 2.0 g of sodium 3-chloro-2-hydroxypropanesulfonate, 10 ml of ethanol, and 2.1 g of water, and the resulting product was refluxed for 20 hours. Thereafter, 0.7 g of sodium carbonate was added thereto, and the resulting product was further refluxed for 4 hours. After the reaction ended, the reaction solution was poured into water, and reprecipitation was performed on the obtained solid in a mixed solvent of a fluorine-based solvent (manufactured by Asahi Glass Co., Ltd.: AK 225) and IPE, whereby 3.5 g of sulfobetaine represented by the following Formula (384) was obtained (yield of 59%).

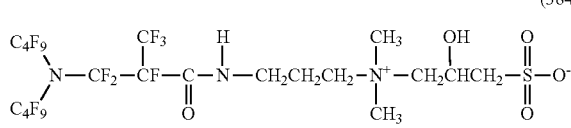

(384)

Synthesis Example 10

Synthesis of 2-[3-[[perfluoro(2-methyl-3-piperidino-panoyl)]amino]propyl-dimethyl-ammonium] acetate 20 g of perfluoro(2-methyl-3-piperidinopropionic acid) fluoride obtained by electrolytic fluorination of methyl 2-methyl-3-piperidinopropionate was added dropwise to a solution obtained by dissolving 9 g of dimethylaminopropylamine in 110 ml of an IPE solvent, in an ice bath. After the resulting product was stirred at room temperature for 2 hours, filtration was performed, the IPE layer of the filtrate was subjected to a washing treatment with an $NaHCO_3$ aqueous solution and an NaCl aqueous solution, and after liquid-liquid separation was performed, washing with water was performed, and IPE was distilled off, whereby 18 g of $CF_2(CF_2CF_2)_2NCF_2CF(CF_3)CONHC_3H_6N(CH_3)_2$ was obtained (crude product yield of 76%).

Next, 10 g of the above-obtained crude product $CF_2N(CF_2CF_2)_2NCF_2CF(CF_3)CONHC_3H_6N(CH_3)_2$ was refluxed overnight with 3 g of sodium monochloroacetate under stirring in ethanol, whereby 11 g of dimethyl betaine substance represented by the following Formula (385) was obtained (yield of 99%).

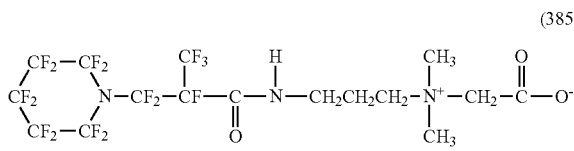

(385)

Synthesis Example 11

Synthesis of 2-[3-[perfluoro(2-methyl-3-morpholinopropanoyl)]oxypropyl-dimethyl-ammonium] acetate 21 g of perfluoro(3-methyl-3-morpholinopropionic acid) fluoride obtained by electrolytic fluorination of methyl 2-methyl-3-morpholinopropionate was added dropwise to a solution obtained by dissolving 10 g of N,N-dimethylpropanolamine in 100 mL of an IPE solvent, in an ice bath. Thereafter, after the resulting product was stirred at room temperature for 2 hours, filtration was performed, the IPE layer of the filtrate was subjected to a washing treatment with an $NaHCO_3$ aqueous solution and an NaCl aqueous solution, and after liquid-liquid separation was performed, washing with water was performed, and IPE was distilled off, whereby 22 g of $O(CF(CF_2)CF_2)_2NCF_2CF(CF_3)COOC_3H_6N(CH_3)_2$ was obtained as a crude product (crude product yield of 88%).

Next, 10 g of the above-obtained crude product $O(CF(CF_3)CF_2)_2NCF_2COOC_3H_6N(CH_3)_2$ was refluxed overnight with 3 g of sodium monochloroacetate under stirring in ethanol, whereby 11 g of dimethyl betaine substance represented by the following Formula (386) was obtained (yield of 99%).

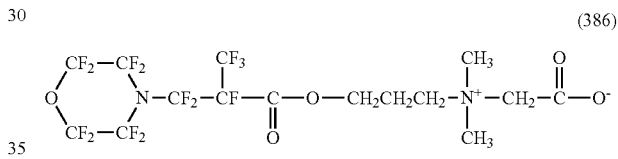

(386)

Synthesis Example 12

Synthesis Example 12

Synthesis of 3-[3-[[perfluoro(2-methyl-3-morpholinopropanoyl)]amino]propyl-dimethyl-ammonium] propanesulfonate 21 g of perfluoro(2-methyl-3-morpholinopropionic acid) fluoride obtained by electrolytic fluorination of methyl 2-methyl-3-morpholinopropionate was added dropwise to a solution obtained by dissolving 10 g of dimethylaminopropylamine in 100 ml of an IPE solvent, in an ice bath. Thereafter, after the resulting product was stirred at room temperature for 2 hours, filtration was performed, the IPE layer of the filtrate was subjected to a washing treatment with an $NaHCO_3$ aqueous solution and an NaCl aqueous solution, and after liquid-liquid separation was performed, washing with water was performed, and IPE was distilled off, whereby 22 g of $O(CF_2CF_2)_2NCF_2CF(CF_3)CONHC_3H_6N(CH_3)_2$ was obtained as a crude product (crude product yield of 88%).

Next, 2 g of $O(CF_2CF_2)_2NCF_2CF(CF_3)CONHC_3H_6N(CH_3)_2$ obtained above was refluxed overnight with 1,3-propanesultone in methylene chloride, and reprecipitation was performed in a mixed solvent of a fluorine-based solvent (manufactured by Asahi Glass Co., Ltd., AK 225) and IPE, whereby 2.2 g of sulfobetaine substance represented by the following Formula (387) was obtained (yield of 98%).

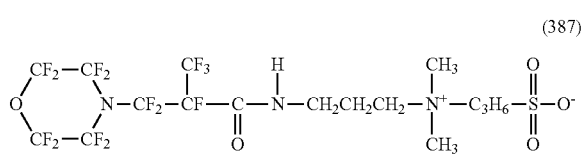

(387)

Synthesis Example 13

Synthesis of 2-[3-[[perfluoro(2-methyl-3-(4-methyl-1-piperazyl)propanoyl)]amino]propyl-dimethyl-ammonium] acetate 20 g of perfluoro(2-methyl-3-(4-methyl-1-piperazyl)propionic acid) fluoride obtained by electrolytic fluorination of methyl 2-methyl-3-(4-methyl-1-piperazyl) propionate was added dropwise to a solution obtained by dissolving 8.5 g of dimethylaminopropylamine in 100 ml of an IPE solvent, in an ice bath. Thereafter, after the resulting product was stirred at room temperature for 2 hours, filtration was performed, the IPE layer of the filtrate was subjected to a washing treatment with an $NaHCO_3$ aqueous solution and an NaCl aqueous solution, and after liquid-liquid separation was performed, washing with water was performed, and IPE was distilled off, whereby 19.8 g of $CF_3N(CF_2CF_2)_2NCF_2CF(CF_3)CONHC_3H_6N(CH_3)_2$ was obtained (crude product yield of 85%).

Next, 10 g of the above-obtained crude product $CF_3N(CF_2CF_2)_2NCF_2CF(CF_3)CONHC_3H_6N(CH_3)_2$ was refluxed overnight with 3 g of sodium monochloroacetate under stirring in ethanol, whereby 10.9 g of dimethyl betaine substance represented by the following Formula (388) was obtained (yield of 99%).

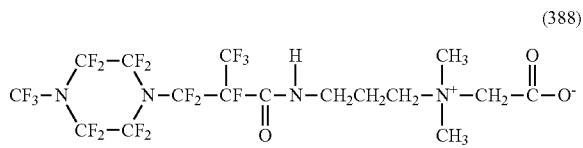

(388)

Example A

<Production of Hydrophilic Oil Repellent Substrate>

Example A1

As a solvent, a solution obtained by mixing hexafluoro-m-xylene, ethanol, and n-butanol at ratio of 57.0% by mass, 38.0% by mass, and 5.0% by mass, respectively, was prepared, and a nitrogen-containing fluorine-based compound synthesized in Synthesis Example 1 and a polyvinyl butyral resin (S-LEC BL-1 manufactured by Sekisui Chemical Co., Ltd.) as a binder were added to the solvent and dissolved, whereby a surface coating material of Example A1 was produced. The mass composition ratio of the nitrogen-containing fluorine-based compound and the binder in the surface coating material is adjusted to be 0.2% by mass and 0.2% by mass, respectively.

Next, the produced surface coating material was applied to a PET film (Panak Corporation, product name: Lumirror, product number: 100T60) using a bar coater No. 3, and the solvent was removed by natural drying at room temperature, whereby an evaluation substrate of Example A1 provided with a coating film on the surface was produced. The production conditions are shown in Table 1 below.

Example A2

A surface coating material of Example A2 was produced in the same manner as in Example A1 except that the mass composition ratio of the nitrogen-containing fluorine-based compound and the binder in the surface coating material was 16.7% by mass and 16.7% by mass, respectively.

In addition, an evaluation substrate of Example A2 was produced in the same manner as in Example A1 except that the surface coating material of Example A2 was used. The production conditions are shown in the following Table 1.

Example A3

A surface coating material of Example A3 was produced in the same manner as in Example A1 except that the nitrogen-containing fluorine-based compound of Synthesis Example 2 was used instead of the nitrogen-containing fluorine-based compound of Synthesis Example 1, and the mass composition ratio of the nitrogen-containing fluorine-based compound and the binder in the surface coating material was 0.2% by mass and 1.8% by mass, respectively.

In addition, an evaluation substrate of Example A3 was produced in the same manner as in Example A1 except that the surface coating material of Example A3 was used. The production conditions are shown in the following Table 1.

Example A4

A surface coating material of Example A4 was produced in the same manner as in Example A3 except that the mass composition ratio of the nitrogen-containing fluorine-based compound and the binder in the surface coating material was 33.3% by mass and 0.3% by mass, respectively.

Next, the produced surface coating material was applied to a glass substrate using a bar coater No. 3, and the solvent was removed by natural drying at room temperature, whereby an evaluation substrate of Example A4 provided with a coating film on the surface was produced. The production conditions are shown in the following Table 1.

Example A5

0.5% by mass of the nitrogen-containing fluorine-based compound synthesized in Synthesis Example 3, 4.5% by mass of water glass (No. 3 manufactured by Fuji Kagaku CORP.) as a binder, and 95.0% by mass of methanol as a solvent were mixed at this ratio, whereby a surface coating material of Example A5 was produced.

Next, a glass plate was dipped in the produced surface coating material and then taken out, and methanol was removed by natural drying. Thereby, an evaluation substrate of Example A5 provided with a coating film on the glass plate was produced. The production conditions are shown in the following Table 1.

Example A6

1.0% by mass of the nitrogen-containing fluorine-based compound synthesized in Synthesis Example 4, 5.0% by mass of polyvinyl butyral (S-LEC BL-1 manufactured by Sekisui Chemical Co., Ltd.) as a binder, and 94.0% by mass of ethanol as a solvent were mixed at this ratio, whereby a surface coating material of Example A6 was produced.

Next, the produced surface coating material was applied to a PET film (Panak Corporation, product name: Lumirror, product number: 100T60) using a bar coater No. 3, and the solvent was removed by natural drying at room temperature, whereby an evaluation substrate of Example A6 provided with a coating film on the surface was produced. The production conditions are shown in the following Table 1.

Example A7

2.0% by mass of the nitrogen-containing fluorine-based compound synthesized in Synthesis Example 5, 2.0% by mass of a polyvinyl butyral resin (S-LEC BL-1 manufactured by Sekisui Chemical Co., Ltd.) as a binder, and 96.0% by mass of methanol as a solvent were mixed at this ratio, whereby a surface coating material of Example A7 was produced.

Next, the produced surface coating material was applied to the surface of an ABS resin (AS ONE Corporation, product name: test piece, ABS/Black) by a dip method, and the solvent was removed by natural drying at room temperature, whereby an evaluation substrate of Example A7 provided with a coating film on the surface was produced. The production conditions are shown in the following Table 1.

Example A8

5.0% by mass of the nitrogen-containing fluorine-based compound synthesized in Synthesis Example 1, 20.0% by mass of a fluorine resin (BONNFLON #6200 manufactured by manufactured by AGC Coat-tech) as a binder, and 75.0% by mass of a mixed solution of xylene, ethylbenzene, and methyl isobutyl ketone having a mass ratio of 20:20:60 as a solvent were mixed at this ratio, and the resulting product was sufficiently dispersed, whereby a surface coating material of Example A8 was produced.

Next, in the same manner as in Example A1 except that the drying temperature was 120° C. and the drying time was 1 hour, a coating film of a surface coating material was produced on an SUS substrate (AS ONE Corporation, product name: test piece, material: SUS304), whereby an evaluation substrate of Example A8 was produced. The production conditions are shown in the following Table 1.

Example A9

5.0% by mass of the nitrogen-containing fluorine-based compound synthesized in Synthesis Example 2, 25.0% by mass of a UV curable urethane acrylate resin (U-10HA manufactured by Shin-Nakamura Chemical Co.) as a binder, and 70.0% by mass of a mixed solution of isobutyl ketone and ethanol having a mass ratio of 97:3 as a solvent were mixed at this ratio, and the resulting product was sufficiently dispersed, whereby a surface coating material of Example A9 was produced.

Next, the produced surface coating material was applied to a glass substrate using a bar coater No. 3, and after natural drying, a curing treatment of the coating film was performed by irradiation with ultraviolet rays of 150 mJ/cm$^2$ at 70° C. for 30 seconds, whereby an evaluation substrate of Example A9 was produced. The production conditions are shown in the following Table 1.

Example A10

0.9% by mass of the nitrogen-containing fluorine-based compound synthesized in Synthesis Example 6, 0.9% by mass of a polyvinyl butyral resin (S-LEC BL-1 manufactured by Sekisui Chemical Co., Ltd.) and 8.2% by mass of tetraethoxysilane (reagent manufactured by Wako Pure Chemical Industries, Ltd.) as a binder, and 90.0% by mass of methanol as a solvent were mixed at this ratio, whereby a surface coating material of Example A10 was produced.

Next, a glass plate was dipped in the produced surface coating material and then taken out, and methanol was removed by natural drying. Thereby, an evaluation substrate of Example Al 0 provided with a coating film on the glass plate was produced. The production conditions are shown in the following Table 1.

Example A11

0.2% by mass of the nitrogen-containing fluorine-based compound synthesized in Synthesis Example 7, 7.0% by mass of polycarbonate (WAN-1000U manufactured by TAISEI FINE CHEMICAL CO,. LTD.) and 3.0% by mass of polyester (WAN-6000 manufactured by TAISEI FINE CHEMICAL CO LTD.) as a binder, and 89.8% by mass of a mixed solution of water and ethanol having a mass ratio of 85:15 as a solvent were mixed at this ratio, and the resulting product was sufficiently dispersed, whereby a surface coating material of Example A11 was produced.

Next, in the same manner as in Example 1, a coating film of a surface coating material was produced on an SUS substrate (AS ONE Corporation, product name: test piece, material: SUS304), whereby an evaluation substrate of Example A11 was produced. The production conditions are shown in the following Table 1.

Example A12

0.2% by mass of the nitrogen-containing fluorine-based compound synthesized in Synthesis Example 7, 10.0% by mass of polyvinyl alcohol (Kanto Chemical Co., Inc.) as a binder, and 89.8% by mass of a mixed solution of water and ethanol having a mass ratio of 90:10 as a solvent were mixed at this ratio, and the resulting product was sufficiently dispersed, whereby a surface coating material of Example A12 was produced.

Next, the produced surface coating material was applied to a PET film (Panak Corporation, product name: Lumirror, product number: 100T60) using a bar coater No. 3, and drying was performed at 110° C. for 1 hour, whereby an evaluation substrate of Example A12 provided with a coating film on the surface was produced. The production conditions are shown in the following Table 1.

Example A13

0.2% by mass of the nitrogen-containing fluorine-based compound synthesized in Synthesis Example 8, 5.0% by mass of polyester (Superflex 150 manufactured by Dai-ichi Kogyo Seiyaku Co., Ltd.) and 5.0% by mass of polyurethane (PLAS COAT Z221 manufactured by GOO CHEMICAL CO., LTD.) as a binder, and 89.8% by mass of a mixed solution of water and ethanol having a mass ratio of 85:15 as a solvent were mixed at this ratio, and the resulting product was sufficiently dispersed, whereby a surface coating material of Example A13 was produced.

Next, in the same manner as in Example 1, a coating film of a surface coating material was produced on an SUS substrate (AS ONE Corporation, product name: test piece, material: SUS304), whereby an evaluation substrate of Example A13 was produced. The production conditions are shown in the following Table 2.

Example A14

5.0% by mass of the nitrogen-containing fluorine-based compound synthesized in Synthesis Example 8, 20.0% by mass of a urethane acrylic resin (SU-100 manufactured by JCR co., ltd.) as a binder, and 75.0% by mass of a mixed solution of water and ethanol having a mass ratio of 90:10 as a solvent were mixed at this ratio, and the resulting product was sufficiently dispersed, whereby a surface coating material of Example A14 was produced.

Next, in the same manner as in Example A1 except that the drying temperature was 70° C., a coating film of a surface coating material was produced on an SUS substrate (AS ONE Corporation, product name: test piece, material: SUS304), whereby an evaluation substrate of Example A14 was produced. The production conditions are shown in the following Table 2.

Example A15

0.2% by mass of the nitrogen-containing fluorine-based compound synthesized in Synthesis Example 9, 10.0% by mass of polyester (PESRESIN A-125S manufactured by TAKAMATSU OIL & FAT CO., LTD.) as a binder, and 89.8% by mass of a mixed solution of water and ethanol having a mass ratio of 85:15 as a solvent were mixed at this ratio, and the resulting product was sufficiently dispersed, whereby a surface coating material of Example A15 was produced.

Next, in the same manner as in Example A1, a surface coating material was applied to an SUS substrate (AS ONE Corporation, product name: test piece, material: SUS304), and the resulting product was dried at 110° C. for 1 hour to produce a coating film, whereby an evaluation substrate of Example A15 was produced. The production conditions are shown in the following Table 2.

Example A 16

0.2% by mass of the nitrogen-containing fluorine-based compound synthesized in Synthesis Example 9, 10.0% by mass of sodium silicate (Kanto Chemical Co., Inc.) as a binder, and 89.8% by mass of a mixed solution of water and ethanol having a mass ratio of 97:3 as a solvent were mixed at this ratio, and the resulting product was sufficiently dispersed, whereby a surface coating material of Example A16 was produced.

Next, the produced surface coating material was applied to a glass substrate using a bar coater No. 3, and drying was performed at 110° C. for 1 hour, whereby an evaluation substrate of Example A16 provided with a coating film on the surface was produced. The production conditions are shown in the following Table 2.

Example A17

1.3% by mass of the nitrogen-containing fluorine-based compound synthesized in Synthesis Example 10, 0.6% by mass of a polyvinyl butyral resin (S-LEC KX-5 manufactured by Sekisui Chemical Co., Ltd.) as a binder, and 98.1% by mass of methanol as a solvent were mixed at this ratio, whereby a surface coating material of Example A17 was produced.

Next, a glass plate was dipped in the produced surface coating material and then taken out, and methanol was removed by natural drying. Thereby, an evaluation substrate of Example A17 provided with a coating film on the glass plate was produced. The production conditions are shown in the following Table 2.

Example A18

0.2% by mass of the nitrogen-containing fluorine-based compound obtained in Synthesis Example 11, 10.0% by mass of polyvinyl butyral ("S-LECB BL-1" manufactured by Sekisui Chemical Co., Ltd.) as a binder, and 89.8% by mass of a mixed solution of hexafluoro-m-xylene/ethanol/n-butanol having a mass ratio of 57/38/5 as a solvent were mixed at this ratio, whereby a surface coating material of Example A18 was produced.

Next, the produced surface coating material was applied to a PET film (Panak Corporation, product name: Lumirror, product number: 100T60) using a bar coater No. 3, and the solvent was removed by natural drying at room temperature, whereby an evaluation substrate of Example A18 provided with a coating film on the surface was produced. The production conditions are shown in the following Table 2.

Example A19

0.2% by mass of the nitrogen-containing fluorine-based compound obtained in Synthesis Example 12, 10.0% by mass of polyvinyl butyral ("S-LECB BL-1" manufactured by Sekisui Chemical Co., Ltd.) as a binder, and 89.8% by mass of a mixed solution of hexafluoro-m-xylene/ethanol/n-butanol having a mass ratio of 57/38/5 as a solvent were mixed at this ratio, whereby a surface coating material of Example A19 was produced.

Next, the produced surface coating material was applied to a PET film (Panak Corporation, product name: Lumirror, product number: 100T60) using a bar coater No. 3, and the solvent was removed by natural drying at room temperature, whereby an evaluation substrate of Example A19 provided with a coating film on the surface was produced. The production conditions are shown in the following Table 2.

Example A20

0.9% by mass of the nitrogen-containing fluorine-based compound synthesized in Synthesis Example 13, 0.9% by mass of a polyvinyl butyral resin (S-LEC BL-1 manufactured by Sekisui Chemical Co., Ltd.) and 8.2% by mass of tetraethoxysilane (reagent manufactured by Wako Pure Chemical Industries, Ltd.) as a binder, and 90.0% by mass of methanol as a solvent were mixed at this ratio, whereby a surface coating material of Example A20 was produced.

Next, a glass plate was dipped in the produced surface coating material and then taken out, and methanol was removed by natural drying. Thereby, an evaluation substrate of Example A20 provided with a coating film on the glass plate was produced. The production conditions are shown in the following Table 2.

Example A21

0.06% by mass of the nitrogen-containing fluorine-based compound synthesized in Synthesis Example 7, 4.5% by mass of polyester (Superflex 150 manufactured by Dai-ichi Kogyo Seiyaku Co., Ltd.) and 10.5% by mass of polyurethane (PLAS COAT Z221 manufactured by GOO CHEMI- CAL CO., LTD.) as a binder, and 84.9% by mass of a mixed solution of water and ethanol having a mass ratio of 77.5:22.5 as a solvent were mixed at this ratio, and the resulting product was sufficiently dispersed, whereby a surface coating material of Example A21 was produced.

Next, in the same manner as in Example A1, a coating film of a surface coating material was produced on an SUS substrate (AS ONE Corporation, product name: test piece, material: SUS304), whereby an evaluation substrate of Example A21 was produced. The production conditions are shown in the following Table 2.

Comparative Example A1

A surface coating material of Comparative Example A1 was produced using the nitrogen-containing fluorine-based compound synthesized in Synthesis Example 1 and the same binder as in Example 1, by making the mass composition ratio of the nitrogen-containing fluorine-based compound and the binder in the surface coating material be 34.0% by mass and 33.0% by mass, respectively, and using a solvent having the same composition as in Example A1.

In addition, an evaluation substrate of Comparative Example A1 was produced in the same manner as in Example A1 except that the surface coating material of Comparative Example A1 was used. The production conditions are shown in the following Table 2.

Comparative Example A2

A surface coating material of Comparative Example A2 was produced in the same manner as in Comparative Example A1 except that the nitrogen-containing fluorine-based compound synthesized in Synthesis Example 2 was used, and the mass composition ratio of the nitrogen-containing fluorine-based compound and the binder in the surface coating material was 25.0% by mass and 0.02% by mass, respectively.

In addition, an evaluation substrate of Comparative Example A2 was produced in the same manner as in Comparative Example A1 except that the surface coating material of Comparative Example A2 was used. The production conditions are shown in the following Table 2

<Evaluation of Hydrophilicity and Oil Repellency>

The contact angle measurement (droplet method) was performed on the evaluation substrates of Examples A1 to A21 and Comparative Examples A1 to A2, and evaluation of hydrophilicity and oil repellency was performed.

Each of water and n-hexadecane (hereinafter, referred to as oil) was dropped on the coating film provided on the surface of the evaluation substrates of Examples A1 to A21 and Comparative Examples A1 and A2, the angle (static contact angle, unit: o (degree), $1°=(\pi/180)$ rad) formed at the contact portion between the evaluation substrate and the droplet was measured using an automatic contact angle meter (manufactured by Kyowa Interface Science Co., Ltd., "Drop Master 701").

In the dropping method of water and n-hexadecane, the following conditions were used.
Dropping volume: 2 μL/drop (water)
Dropping volume: 2 μL/drop (n-hexadecane)
Measurement temperature: room temperature (22±1° C.)

Here, as the static contact angle value for water was lower, the hydrophilicity was excellent, the static contact angle value of oil was increased, oil was likely to be repelled, that is, it could be said that oil repellency was excellent.

Therefore, in the evaluation of hydrophilicity and oil repellency, as a result of the contact angle measurement, in a case where the static contact angle for water to a coating film was 15° or less and the static contact angle for n-hexadecane was 65° or greater, it was assumed that the coating film has hydrophilicity and oil repellency (the coating film is a hydrophilic oil repellent layer). That is, it was assumed that the evaluation substrate is a hydrophilic oil repellent. The results are shown in the following Tables 1 and 2.

<Evaluation of Durability>

The evaluation substrates of Examples A1 to A21 and Comparative Examples A1 and A2 were immersed in water at room temperature for 1 hour, and then dried. The static contact angle for water and oil on the evaluation substrate after immersion and drying was measured, and if the difference between the measured values of the static contact angle before and after immersion and drying was within 5°, it was determined that the durability of the coating film to water (that is, sustainability of a hydrophilic oil repellent effect) was good (described as "A" in Table 1), and in a case where the difference was greater than 5°, it was determined that the coating film did not to have durability (described as "B" in Table 1). The results are shown in the following Tables 1 and 2.

<Evaluation of Total Light Transmittance>

The total light transmittance (%) of the coating films provided on the evaluation substrates of Examples A1 to A21 and Comparative Examples A1 and A2 was measured using a haze meter (model number: NDH-300A) manufactured by Nippon Denshoku Industries Co., Ltd.). In a case where the total light transmittance was 90% or greater, it was determined to be a hydrophilic oil repellent substrate having excellent transparency. The results are shown in the following Tables 1 and 2.

TABLE 1

| | Substrate | Treated compound | (% by mass) | Binder | (% by mass) | Solvent | (% by mass) | Contact angle (°) Water | n-Hexa- decane | Dura- bility | Total light transmittance (%) |
|---|---|---|---|---|---|---|---|---|---|---|---|
| Example A1 | PET film | Synthesis Example 1 | 0.2 | Polyvinyl butyral BL-1 | 0.2 | Entirety Hexafluoroxylene Ethanol n-Butanol | 99.6 57 38 5 | 7 | 74 | A | 96 |
| Example A2 | PET film | Synthesis Example 1 | 16.7 | Polyvinyl butyral BL-1 | 16.7 | Entirety Hexafluoroxylene Ethanol n-Butanol | 66.6 57 38 5 | 11 | 71 | A | 92 |
| Example A3 | PET film | Synthesis Example 2 | 0.2 | Polyvinyl butyral BL-1 | 1.8 | Entirety Hexafluoroxylene Ethanol n-Butanol | 98.0 57 38 5 | 13 | 66 | A | 94 |

TABLE 1-continued

| | Substrate | Treated compound | (% by mass) | Binder | (% by mass) | Solvent | (% by mass) | Contact angle (°) Water | n-Hexa-decane | Dura-bility | Total light transmittance (%) |
|---|---|---|---|---|---|---|---|---|---|---|---|
| Example A4 | Glass | Synthesis Example 2 | 33.3 | Polyvinyl butyral BL-1 | 0.3 | Entirety Hexafluoroxylene Ethanol n-Butanol | 66.4 57 38 5 | 8 | 71 | A | 91 |
| Example A5 | Glass | Synthesis Example 3 | 0.5 | Water glass | 4.5 | Entirety Methanol | 95.0 100 | 12 | 70 | A | 90 |
| Example A6 | PET film | Synthesis Example 4 | 1.0 | Polyvinyl butyral BL-1 | 5.0 | Entirety Ethanol | 94.0 100 | 15 | 75 | A | 90 |
| Example A7 | ABS resin | Synthesis Example 5 | 2.0 | Polyvinyl butyral BL-1 | 2.0 | Entirety Methanol | 96.0 100 | 15 | 70 | A | — |
| Example A8 | SUS304 | Synthesis Example 1 | 5.0 | Fluorine resin | 20.0 | Entirety Xylene Ethylbenzene Methyl isobutyl ketone | 75.0 20 20 60 | 15 | 68 | A | — |
| Example A9 | Glass | Synthesis Example 2 | 5.0 | Urethane acrylate (UV curing) | 25.0 | Entirety Methyl isobutyl ketone Ethanol | 70.0 97 3 | 10 | 65 | A | 90 |
| Example A10 | Glass | Synthesis Example 6 | 0.9 | BL-1 Tetraethoxysilane | 0.9 8.2 | Entirety Methanol | 90.0 100 | 13 | 65 | A | 90 |
| Example A11 | SUS304 | Synthesis Example 7 | 0.2 | Polycarbonate, polyester | 10.0 | Entirety Water Ethanol | 89.8 85 15 | 12 | 71 | A | — |
| Example A12 | PET film | Synthesis Example 7 | 0.2 | Polyvinyl alcohol | 10.0 | Entirety Water Ethanol | 89.8 90 10 | 14 | 65 | A | 90 |

TABLE 2

| | Substrate | Treated compound | (% by mass) | Binder | (% by mass) | Solvent | (% by mass) | Contact angle (°) Water | n-Hexa-decane | Dura-bility | Total light transmittance (%) |
|---|---|---|---|---|---|---|---|---|---|---|---|
| Example A13 | SUS304 | Synthesis Example 8 | 0.2 | Polyester, polyurethane | 10.0 | Entirety Water Ethanol | 89.8 85 15 | 15 | 73 | A | — |
| Example A14 | SUS304 | Synthesis Example 8 | 5.0 | Urethane acryl | 20.0 | Entirety Water Ethanol | 75.0 90 10 | 15 | 66 | A | — |
| Example A15 | SUS304 | Synthesis Example 9 | 0.2 | Polyester | 10.0 | Entirety Water Ethanol | 89.8 85 15 | 11 | 70 | A | — |
| Example A16 | Glass | Synthesis Example 9 | 0.2 | Sodium silicate | 10.0 | Entirety Water Ethanol | 89.8 97 3 | 10 | 65 | A | 90 |
| Example A17 | Glass | Synthesis Example 10 | 1.3 | Polyvinyl butyral KX-5 | 0.6 | Entirety Methanol | 98.1 100 | 14 | 69 | A | 90 |
| Example A18 | PET film | Synthesis Example 11 | 0.2 | Polyvinyl butyral BL-1 | 10.0 | Entirety Hexafluoroxylene Ethanol n-Butanol | 89.8 57 38 5 | 14 | 65 | A | 90 |
| Example A19 | PET film | Synthesis Example 12 | 0.2 | Polyvinyl butyral BL-1 | 10.0 | Entirety Hexafluoroxylene Ethanol n-Butanol | 89.8 57 38 5 | 14 | 65 | A | 90 |
| Example A20 | Glass | Synthesis Example 13 | 0.9 | BL-1 Tetraethoxysilane | 0.9 8.2 | Entirety Methanol | 90.0 100 | 13 | 65 | A | 90 |
| Example A21 | SUS304 | Synthesis Example 7 | 0.06 | Polyester, polyurethane | 15.0 | Entirety Water Ethanol | 84.94 77.5 22.5 | 10 | 68 | A | — |
| Comparative Example A1 | PET film | Synthesis Example 1 | 34.0 | Polyvinyl butyral BL-1 | 33.0 | Entirety Hexafluoroxylene Ethanol n-Butanol | 33.0 57 38 5 | 18 | 68 | A | 82 |

TABLE 2-continued

| | Substrate | Treated compound | (% by mass) | Binder | (% by mass) | Solvent | (% by mass) | Contact angle (°) Water | n-Hexa- decane | Dura- bility | Total light transmittance (%) |
|---|---|---|---|---|---|---|---|---|---|---|---|
| Comparative Example A2 | PET film | Synthesis Example 2 | 25.0 | Polyvinyl butyral BL-1 | 0.02 | Entirety Hexafluoroxylene Ethanol n-Butanol | 75.0 57 38 5 | 14 | 65 | B | 80 |

As shown in Tables 1 and 2, as a result of the contact angle measurement, the evaluation substrates of Examples A1 to A21 had a static contact angle for water of 15° or less, and a static contact angle for n-hexadecane of 65° or greater, for all the coating films. Therefore, it was confirmed that the coating films obtained by the surface coating materials of Examples A1 to A21 were hydrophilic oil repellent layers, and the evaluation substrates were hydrophilic oil repellents.

In addition, as a result of durability evaluation, the evaluation substrates of Examples A1 to A21 had good durability against water for all the coating films.

Furthermore, as a result of the total light transmittance evaluation, it was confirmed that the evaluation substrates of Examples A1 to A6, A9, A10, A12, and A16 to A20 had a total light transmittance of 90% or greater, and were hydrophilic oil repellents having excellent transparency, for all the evaluation substrates.

In contrast, it was confirmed that the evaluation substrate of Comparative Example A1 exhibited hydrophilicity and oil repellency since the amount of fluorine-based compound with respect to the solvent was large, but the total light transmittance was less than 90%.

In addition, it was confirmed that in the evaluation substrate of Comparative Example A2, the coating film did not have durability since the amount of the binder with respect to the fluorine-based compound was small.

Example B

<Production of Member with Stain Adhesion-preventing Film>

Example B1

A nitrogen-containing fluorine-based compound and a binder were added to a solvent such that the nitrogen-containing fluorine-based compound synthesized in Synthesis Example 1, a polyvinyl butyral resin (S-LEC BL-1 manufactured by Sekisui Chemical Co., Ltd.) as a binder, and ethanol as a solvent became 2.0% by mass, 4.0% by mass, and 94.0% by mass, respectively, and dissolved, whereby a surface coating material B1 was produced.

Next, the produced surface coating material was applied to the surface of a SUS substrate (AS ONE Corporation, product name: test piece, material: SUS304) by a dip method, and the solvent was removed by natural drying at room temperature, whereby an evaluation substrate of Example B1 provided with a coating film on the surface was produced.

Example B2

An evaluation substrate of Example B2 was produced in the same manner as in Example B1 except that a PE substrate (AS ONE Corporation, product name: polyethylene plate, material: PE) was used instead of the SUS substrate.

Example B3

An evaluation substrate of Example B3 was produced in the same manner as in Example B1 except that an acryl substrate (AS ONE Corporation, product name: acryl plate, material: acryl) was used instead of the SUS substrate.

Example B4

A nitrogen-containing fluorine-based compound and a binder were added to a solvent such that the nitrogen-containing fluorine-based compound synthesized in Synthesis Example 1, DIANAL BR-80 (manufactured by Mitsubishi Rayon Co., Ltd.) as a binder, and a solution obtained by mixing 5% by mass of ethanol and 95% by mass of toluene as a solvent in this ratio became 0.3% by mass, 0.5% by mass, and 99.2% by mass, respectively, and dissolved, whereby a surface coating material B4 was produced.

Next, the produced surface coating material B4 was applied to the surface of a SUS substrate by a dip method, and the solvent was removed by natural drying at room temperature, whereby an evaluation substrate of Example B4 provided with a coating film on the surface was produced.

Example B5

An evaluation substrate of Example B5 was produced in the same manner as in Example B4 except that a PE substrate was used instead of the SUS substrate.

Example B6

An evaluation substrate of Example B6 was produced in the same manner as in Example B4 except that an acryl substrate was used instead of the SUS substrate.

Example B7

An evaluation substrate of Example B7 was produced in the same manner as in Example B4 except that a PET film (Panak Corporation, product name: Lumirror, product number: 100T60) was used instead of the SUS substrate.

Comparative Examples B1 to B3

An untreated SUS substrate, an untreated PE substrate, and an untreated acryl substrate, on which a treatment with the surface coating material had not been performed were used as the evaluation substrates of Comparative Examples B1 to B3, respectively.

<Evaluation of Antifouling Properties by Contact Angle Measurement>

The contact angle measurement (droplet method) was performed on the evaluation substrates of Examples B1 to B7 and Comparative Examples B1 to B3, and evaluation of antifouling properties was performed.

Each of water and n-hexadecane (hereinafter, referred to as oil) was dropped on the coating film provided on the surface of the evaluation substrates of Examples B1 to B7 and Comparative Examples B1 to B3, the angle (static contact angle, unit: o (degree), $1°=(\pi/180)$ rad) formed at the contact portion between the evaluation substrate and the droplet was measured using an automatic contact angle meter (manufactured by Kyowa Interface Science Co., Ltd., "Drop Master 701").

In the dropping method of water and n-hexadecane, the following conditions were used.

Dropping volume: 2 μL/drop (water)
Dropping volume: 2 μL/drop (n-hexadecane)
Measurement temperature: room temperature (22±1° C.)

Here, as the static contact angle value of water was lower, the hydrophilicity was excellent, the static contact angle value of oil was increased, oil was likely to be repelled, that is, it could be said that the coating film provided on the surface of the evaluation substrate had excellent oil repellency (antifouling properties).

Therefore, in the evaluation of antifouling properties, as a result of the contact angle measurement, in a case where the static contact angle for water to a coating film was 15° or less and the static contact angle for n-hexadecane was 65° or greater, it was assumed that the coating film has hydrophilicity and oil repellency (that is, the coating film is a stain adhesion preventing film). The results are shown in the following Table 3.

<Evaluation of Easy Cleaning Properties>

N-Hexadecane was dropped onto the surface of the coating film (stain adhesion preventing film) obtained in Examples B1 to B7 and Comparative Examples B1 to B3, and the degree of spreading of oil droplets when an aero duster (spray can ZC-32 manufactured by Engineer INC.) was sprayed on the oil droplets was observed.

Here, when an aero duster was sprayed, in a case where oil droplets on the surface of the coating film could be easily removed from the surface without wetting and spreading, the surface was defined to have easy cleaning properties. On the other hand, when an aero duster was sprayed, in a case where oil droplets on the surface of the coating film were wetted and spread and could not be removed from the surface, the surface was defined not to have easy cleaning properties.

Specifically, 50 ul of n-hexadecane was dropped onto the surface of the coating film (stain adhesion preventing film) obtained in Examples B1 to B7 and Comparative Examples B1 to B3 using a micropipettor. The degree of spreading of oil droplets when an aero duster (spray can ZC-32 manufactured by Engineer INC.) was sprayed from a place 20 to 30 cm away from the oil droplets was observed. The results are shown in the following Table 3.

In Table 3, when spraying an aero duster on oil droplets, a case where the oil droplets rolled on the surface of the coating film by 10 cm or greater while oil droplets were held and oil did not remain at the portion where oil dropped first was described as "A", and a case where the oil droplets was wetted and spread (wetted and spread in a fan shape) by greater than the diameter of oil droplets dropped first was described as "B".

<Evaluation of Transparency>

For the evaluation substrate of Example B7, the evaluation of transparency can be performed by the total light transmittance (%). Here, the total light transmittance (%) was measured using a haze meter "NDH-300A" manufactured by Nippon Denshoku Industries Co., Ltd. Specifically, the total light transmittance (%) of the entire member with a stain adhesion preventing film including the stain adhesion preventing film (that is, hydrophilic oil repellent layer) was measured, and in a case where the total light transmittance is 90% or greater, it can be said to be a member with a stain adhesion preventing film having excellent transparency.

TABLE 3

| | Substrate | Treated compound | (% by mass) | Binder | (% by mass) | Solvent | (% by mass) | Contact angle (°) Water | n-Hexa- decane | Easy cleaning properties |
|---|---|---|---|---|---|---|---|---|---|---|
| Example B1 | SUS304 | Synthesis Example 1 | 2.0 | Polyvinyl butyral BL-1 | 4.0 | Entirety Ethanol | 100 | 94.0 | 12 | 78 | A |
| Example B2 | Polyethylene | Synthesis Example 1 | 2.0 | Polyvinyl butyral BL-1 | 4.0 | Entirety Ethanol | 100 | 94.0 | 6 | 76 | A |
| Example B3 | Acryl resin | Synthesis Example 1 | 2.0 | Polyvinyl butyral BL-1 | 4.0 | Entirety Ethanol | 100 | 94.0 | 12 | 79 | A |
| Example B4 | SUS304 | Synthesis Example 1 | 0.3 | Acryl resin BR-80 | 0.5 | Entirety Ethanol Toluene | 5 95 | 99.2 | 12 | 68 | A |
| Example B5 | Polyethylene | Synthesis Example 1 | 0.3 | Acryl resin BR-80 | 0.5 | Entirety Ethanol Toluene | 5 95 | 99.2 | 12 | 70 | A |
| Example B6 | Acryl resin | Synthesis Example 1 | 0.3 | Acryl resin BR-80 | 0.5 | Entirety Ethanol Toluene | 5 95 | 99.2 | 8 | 73 | A |
| Example B7 | PET film | Synthesis Example 1 | 0.3 | Acryl resin BR-80 | 0.5 | Entirety Ethanol Toluene | 5 95 | 99.2 | 7 | 74 | A |
| Comp. Example B1 | SUS304 | — | — | — | — | — | — | 88 | 6 | B |

TABLE 3-continued

| | Substrate | Treated compound (% by mass) | Binder (% by mass) | | Solvent (% by mass) | Contact angle (°) Water | n-Hexa-decane | Easy cleaning properties |
|---|---|---|---|---|---|---|---|---|
| Comp. Example B2 | Polyethylene | — | — | — | — | 86 | 6 | B |
| Comp. Example B3 | Acryl resin | — | — | — | — | 80 | 6 | B |

As shown in Table 3, as a result of the contact angle measurement, the evaluation substrates of Examples B1 to B7 had a static contact angle for n-hexadecane of 65° or greater, for all the coating films. Therefore, it was confirmed that the coating films provided on the evaluation substrates of Examples B1 to B7 were stain adhesion preventing films since these had oil repellency (that is, antifouling property).

In addition, as a result of the contact angle measurement, the evaluation substrates of Examples B1 to B7 had a static contact angle for water of 15° or less, for all the coating films. Therefore, it was confirmed that the coating films provided on the evaluation substrates of Examples B1 to B7 had hydrophilicity.

As shown in Table 3, it was confirmed that the evaluation substrates of Examples B1 to B7 had easy cleaning properties since the results of evaluation of easy cleaning properties were all determined as "A".

As a result of the total light transmittance evaluation, it was confirmed that the evaluation substrate of Example B7 had a total light transmittance of 90%, and was members with a stain adhesion preventing film having excellent transparency.

In contrast, it was confirmed that the evaluation substrates of Comparative Examples B1 to B3 were water repellent/lipophilic since a coating film (stain adhesion preventing film) was not provided on the surface. In addition, it was confirmed that the evaluation substrates of Comparative Examples B1 to B3 did not have easy cleaning properties since the results of evaluation of easy cleaning properties were all determined as "B".

Example C

<Production of Protection Tool for Evaluation>

Example C1

After the shoe sole of commercially available lightweight work shoes (High Grip H-700N manufactured by MIDORI ANSEN Co., Ltd., shoe sole material: EVA/synthetic rubber) for the food industry was washed with a detergent and a plastic scrub, the ground portion of the shoe sole was covered with a masking tape, then, the groove portion was coated with 0.5% by mass of the nitrogen-containing fluorine-based compound synthesized in Synthesis Example 2 as a hydrophilic oil repellent, 1.0% by mass of polyvinyl butyral (S-LEC BL-1 manufactured by Sekisui Chemical Co., Ltd.) as a binder, 0.5% by mass (as $SiO_2$) of silica sol (Organosilica Sol IPA-ST, manufactured by NISSAN CHEMICAL INDUSTRIES, LTD.) as an inorganic compound, and a solution (surface coating material) produced to have a solvent of 98.0% by mass (57.0 parts by mass of hexafluoroxylene, 38.0 parts by mass of ethanol, and 5.0 parts by mass of n-butanol) by spraying, and the resulting product was natural-dried.

Example C2

After the shoe sole of the commercially available safety boots for the food industry (High Grip HG 1000 Super by manufactured by MIDORI ANSEN Co., Ltd., shoe sole material: PVC) was washed with a detergent and a plastic scrub, the ground portion of the shoe sole was covered with a masking tape, then, the groove portion was coated with the same surface coating material as in Example C1 by spraying, and the resulting product was natural-dried.

Example C3

A commercially available glove (100% cotton) was immersed in the same surface coating material as in Example C1 and natural-dried.

Example C4

After a commercially available work clothes (Men's Slacks SE 19 by manufactured by MIDORI ANSEN Co., Ltd., antistatic performance, polyester 80%-cotton 20%) was washed, the right sleeve portion was immersed in the same surface coating material as in Example C1 and natural-dried.

Example C5

Commercially available rubber gloves (Jajitemuresu No. 283 manufactured by SHOWA GLOVE Co., polyurethane) were thoroughly washed with a detergent, and then immersed in the same surface coating material as in Example C1 and natural-dried.

Comparative Example C1 to Comparative Example C5

The same substrates as in Example C1 to Example C5 were not treated with the surface coating material, and were used as protection tools of Comparative Examples C1 to C5.

For these Examples C1 to C5 and Comparative Examples C1 to C5, wettability and easy cleaning properties were evaluated according to the following procedure.

<Wettability Test>

Various edible oils were dropped to protection tools of Examples C1 to C5 which had been treated with the surface coating material and Comparative Examples C1 to C5 which had not been treated with the surface coating material, and the wettability was evaluated by visual determination. The results are shown in Table 4.

In the dropping method of various oils, the following conditions were used.

Dropping volume: (20 to 25) μL/drop

Dropping height: 5 cm from the surface of a substrate (protection tool)

Dropping jig: polyspuit

In addition, the evaluation criteria are as follows.

A: Repelling (oil)

B: Wet (with oil)

C: (Oil) penetrates

<Easy Cleaning Properties Test>

After various edible oils were dropped to protection tools of Examples C1 to C5 which had been treated with the surface coating material and Comparative Examples C1 to C5 which had not been treated with the surface coating material, 5 ml of tap water was sprayed to the portion using a polyspuit, and the degree of removal of oil was visually determined. The results are shown in Table 4.

The evaluation criteria were as follows.

A: Oil could be completely removed

B: Adhesion traces of oil remained

C: Oil could not be removed

TABLE 4

| | Substrate | Treated compound | (% by mass) | Binder or inorganic compound | (% by mass) | Solvent | (% by mass) |
|---|---|---|---|---|---|---|---|
| Example C1 | Light work shoes: EVA/Synthetic rubber | Synthesis Example 2 | 0.5 | BL-1 | 1.0 | Entirety | 98.0 |
| | | | | | | Hexafluoroxylene | 57 |
| | | | | IPA-ST | 0.5 | Ethanol | 38 |
| | | | | | | n-Butanol | 5 |
| Example C2 | Safety boots: PVC | Synthesis Example 2 | 0.5 | BL-1 | 1.0 | Entirety | 98.0 |
| | | | | | | Hexafluoroxylene | 57 |
| | | | | IPA-ST | 0.5 | Ethanol | 38 |
| | | | | | | n-Butanol | 5 |
| Example C3 | Cotton gloves: cotton | Synthesis Example 2 | 0.5 | BL-1 | 1.0 | Entirety | 98.0 |
| | | | | | | Hexafluoroxylene | 57 |
| | | | | IPA-ST | 0.5 | Ethanol | 38 |
| | | | | | | n-Butanol | 5 |
| Example C4 | Work clothes: polyester 80% cotton 20% | Synthesis Example 2 | 0.5 | BL-1 | 1.0 | Entirety | 98.0 |
| | | | | | | Hexafluoroxylene | 57 |
| | | | | IPA-ST | 0.5 | Ethanol | 38 |
| | | | | | | n-Butanol | 5 |
| Example C5 | Rubber gloves: polyurethane | Synthesis Example 2 | 0.5 | BL-1 | 1.0 | Entirety | 98.0 |
| | | | | | | Hexafluoroxylene | 57 |
| | | | | IPA-ST | 0.5 | Ethanol | 38 |
| | | | | | | n-Butanol | 5 |
| Comp. Example C1 | Light work shoes: EVA/Synthetic rubber | — | — | — | — | — | — |
| Comp. Example C2 | Safety boots: PVC | — | — | — | — | — | — |
| Comp. Example C3 | Cotton gloves: cotton | — | — | — | — | — | — |
| Comp. Example C4 | Work clothes: polyester 80% cotton 20% | — | — | — | — | — | — |
| Comp. Example C5 | Gloves: polyurethane | — | — | — | — | — | — |

| | Canola oil manufactured by The Nisshin OilliO Group. Ltd. | | AJINOMOTO olive oil | | Golden Flax Seed Mil linseed oil manufactured by NIPPON FLOUR MILLS Co., Ltd. | | Pure sesame oil manufactured by Kadoya Sesame Mills inc. | |
|---|---|---|---|---|---|---|---|---|
| | Wettability | Easy cleaning properties | Wettability | Easy cleaning properties | Wettability | Easy cleaning properties | Wettability | Easy cleaning properties |
| Example C1 | A | A | A | A | A | A | A | A |
| Example C2 | A | A | A | A | A | A | A | A |
| Example C3 | A | A | A | A | A | A | A | A |
| Example C4 | A | A | A | A | A | A | A | A |
| Example C5 | A | A | A | A | A | A | A | A |

TABLE 4-continued

| | | | | | | | | |
|---|---|---|---|---|---|---|---|---|
| Comp. Example C1 | B | B | B | B | B | B | B | B |
| Comp. Example C2 | B | B | B | B | B | B | B | B |
| Comp. Example C3 | C | C | C | C | C | C | C | C |
| Comp. Example C4 | C | C | C | C | C | C | C | C |
| Comp. Example C5 | B | B | B | B | B | B | B | B |

According to the verification results shown in Table 4, if oil was dropped to a substrate (protection tool) treated with the surface coating materials of Examples C1 to C5, the oil was repelled and became oil droplets. If water was further sprayed to the place where oil had been dropped, water wet-spread on the surface of the substrate and entered under oil droplets, and the oil droplets were peeled off from the substrate. From this, it was confirmed that oil stains can easily be removed by water washing alone from a substrate (protection tool) to which a coating film of the surface coating material had been applied.

On the other hand, as the results of Comparative Examples C1 to C5 show, if oil was dropped onto a substrate (protection tool) which had not been treated with the surface-treatment material, the oil became familiar with the substrate, adhesion traces of oil remained by just spraying water, and thus, the oil could not be completely removed.

INDUSTRIAL APPLICABILITY

Since the surface coating material and the hydrophilic oil repellent of the present invention can impart hydrophilicity and oil repellency at the same time to a substrate by the surface coating layer (coating film), the surface coating material and the hydrophilic oil repellent can be applied in a wide range of applications where hydrophilicity and oil repellency, such as kitchen equipment (range hood), a bathroom and toilet, a bathroom mirror, a sewer piping, a house wallpaper, a side mirror for automobile, railroad, an exterior wall, a tunnel, an outdoor advertisement, a road material, an electric wire, an FPD cover film, a solar cell (surface protecting material), clothing, and cosmetics, is desired.

In addition, the member with a stain adhesion preventing film which is one embodiment of the hydrophilic oil repellent of the present invention is industrially applicable in a wide range of applications where antifouling and easy cleaning properties are desired, such as kitchen utensils including a kitchen panel, a range hood, a gas table, and a cooking utensil for kitchens, a washstand, a wall and a ceiling in a bathroom, and toiletry members including a toilet bowl.

In addition, since the oil contamination protection tool which is one aspect the hydrophilic oil repellent of the present invention can impart oil repellency and hydrophilicity at the same time by an oil/water separator, the oil contamination protection tool can be widely applied to various protection tool that may be contaminated with oil.

REFERENCE SIGNS LIST 14 oil/water separator
20 work shoe (oil contamination protection tool)
21 upper portion
22 shoe sole (substrate)
23 tread pattern
24 groove portion
30 glove (oil contamination protection tool)
41 apron (oil contamination protection tool)
42 knee pad (oil contamination protection tool)
43 boots (oil contamination protection tool)
44 upper garment (oil contamination protection tool)
45 trousers (oil contamination protection tool)

The invention claimed is:
1. A surface-coating material which forms a hydrophilic/oil-repellent layer on at least a part of the surface of a substrate, comprising:
one or more fluorine-based compounds represented by the following formulas (2) to (4);
a binder; and
a solvent;

(2)

(3)

(4)

in the above formula (2), $Rf^1$ and $Rf^2$ each represent a linear or branched perfluoroalkyl group having 1 to 6 carbon atoms, which are the same as or different from each other; $Rf^3$ represents a linear or branched perfluoroalkylene group having 1 to 6 carbon atoms;
in the above formulas (3) and (4), $Rf^4$, $Rf^5$, and $Rf^6$ each represent a linear or branched perfluoroalkylene group having 1 to 6 carbon atoms, which are the same as or different from each other; Z includes any one of an oxygen atom, a nitrogen atom, a $CF_2$ group, and a CF group;
in the above formulas (2) and (4), R represents a linking group which is a divalent organic group;
in the above formulas (2) to (4), X is any one hydrophilicity imparting group selected from the group consisting of anion type hydrophilicity imparting groups, cation type hydrophilicity imparting groups, and amphoteric type hydrophilicity imparting groups;

the anion type hydrophilicity imparting groups have —$CO_2M^1$, —$SO_3M^1$, —$OSO_3M^1$, —$OP(OH)O_2M^1$, —$OPO_3M^1{}_2$, =$O_2PO_2M^1$, or —$PO(OH)_y(OM^1)_{2-y}$ at the terminal, wherein $M^1$ represents an alkali metal, an alkali earth metal, Mg, Al, or $R^1R^2R^3R^4N^+$; $R^1$ to $R^4$ are hydrogen atoms or each independently a linear or branched alkyl group having 1 to 20 carbon atoms, and preferably having 1 to 10 carbon atoms, and y represents an integer of 0 to 2 and the above-described structure of the terminal shows a case where $M^1$ is monovalent, and in a case where $M^1$ is divalent, two identical anions are bonded to $M^1$, or two different types of anions are bonded to $M^1$;

the cation type hydrophilicity imparting groups have —$N^+R^5R^6R^7.Cl^-$, —$N^+R^5R^6R^7.Br^-$, —$N^+R^5R^6R^7.I^-$, —$N^+R^5R^6R^7.CH_3SO_3{}^-$, —$N^+R^5R^6R^7.R^7SO_4{}^-$, —$N^+R^5R^6R^7.NO_3{}^-$, (—$N^+R^5R^6R^7)_2CO_3{}^{2-}$, or (—$N^+R^5R^6R^7)_2SO_4{}^{2-}$ at the terminal, wherein $R^5$ to $R^7$ are hydrogen atoms or each independently a linear or branched alkyl group having 1 to 20 carbon atoms, and preferably having 1 to 10 carbon atom; and the amphoteric type hydrophilicity imparting group has a carboxy betaine type —$N^+R^8R^9(CH_2)_nCO_2{}^-$, a sulfobetaine type —$N^+R^8R^9(CH_2)_nSO_3{}^-$, an amine oxide type —$N^+R^8R^9O^-$, or phosphobetaine type —$OPO_3{}^-(CH_2)_nN^+R^8R^9R^{10}$ at the terminal, wherein n is an integer of 1 to 5, $R^8$ and $R^9$ are hydrogen atoms or alkyl groups having 1 to 10 carbon atoms, and $R^{10}$ is a hydrogen atom or an alkyl group having 1 to 10 carbon atoms or an alkylene group having 1 to 10 carbon atoms.

2. The surface coating material according to claim 1, wherein the mass composition ratio between the fluorine-based compound and the solvent is within a range of 0.05 to 50:99.95 to 50.

3. The surface coating material according to claim 1, wherein the binder includes any one of a resin, and water glass.

4. The surface coating material according to claim 3, wherein the resin is a water soluble resin.

5. The surface coating material according to claim 1, wherein the mass composition ratio between the fluorine-based compound and the binder is within a range of 0.2 to 99.9:99.8 to 0.1.

6. The surface coating material according to claim 1, wherein the solvent is water, an organic solvent, or a mixture of water and an organic solvent.

7. A coating film, comprising:
one or more fluorine-based compounds represented by the formulas (2) to (4) in claim 1; and
a binder.

8. A hydrophilic oil repellent member, comprising:
a substrate; and
a hydrophilic oil repellent layer provided on a part or all of the surface of the substrate,
wherein the hydrophilic oil repellent layer includes one or more fluorine-based compounds represented by the formulas (2) to (4) in claim 1.

9. The hydrophilic oil repellent member according to claim 8,
wherein the hydrophilic oil repellent layer further includes a binder.

10. The hydrophilic oil repellent member according to claim 9,
wherein the binder is an organic binder or an inorganic binder.

11. The hydrophilic oil repellent member according to claim 8,
wherein the substrate is any one or a combination of two or more selected from the group consisting of glass, plastic, metal, ceramics, stainless steel, aluminum, wood, stone, cement, concrete, fiber, cloth, paper, and leather.

12. The hydrophilic oil repellent member according to claim 8,
wherein the substrate is a PET film or a glass plate.

13. The hydrophilic oil repellent member according to claim 12,
wherein the total light transmittance is 90% or greater.

14. The hydrophilic oil repellent member according to claim 8,
wherein a static contact angle for water on the surface of the substrate provided with a hydrophilic oil repellent layer is 15° or less, and a static contact angle for hexadecane is 65° or greater.

15. The hydrophilic oil repellent member according to claim 8,
wherein the substrate is a kitchen utensil used in a kitchen or a sanitary utensil used in a sanitary facility.

16. The hydrophilic oil repellent member according to claim 8,
wherein the substrate is an oil contamination protection tool for preventing sticking of oils.

17. A surface coating material which forms a hydrophilic oil repellent layer on at least a part of the surface of a substrate, comprising:
one or more fluorine-based compounds represented by the following formulas (1);
a binder; and
a solvent;

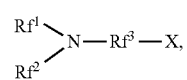

(1)

wherein in the above formulas (1), $Rf^1$ and $Rf^2$ each represents a linear or branched perfluoroalkyl group having 1 to 6 carbon atoms, which are the same as or different from each other, and $Rf^3$ represents a linear or branched perfluoroalkylene group having 1 to 6 carbon atoms;

in the above formulas (1), X represents anion type hydrophilicity imparting groups and the anion type hydrophilicity imparting groups have $CO_2M^1$, $OP(OH)O_2M^1$, $OPO_3M^1{}_2$, =$O_2PO_2M^1$, or $PO(OH)_y(OM^1)_{2-y}$, wherein $M^1$ represents an alkali metal, an alkali earth metal, Mg, Al, or $R^1R^2R^3R^4N^+$; $R^1$ to $R^4$ -are each independently a hydrogen atom or a linear or branched alkyl group having 1 to 20 carbon atoms, and preferably having 1 to 10 carbon atoms, and y represents an integer of 0 to 2;

wherein the above-described structure of the terminal shows a case where $M^1$ is monovalent, and in a case where $M^1$ is divalent, two identical anions are bonded to $M^1$, or two different types of anions are bonded to $M^1$.

18. The surface coating material according to claim 17, wherein the mass composition ratio between the fluorine-based compound and the solvent is within a range of 0.05 to 50:99.95 to 50.

19. The surface coating material according to claim 17, wherein the binder includes any one of a resin, and water glass.

20. The surface coating material according to claim 17, wherein the mass composition ratio between the fluorine-based compound and the binder is within a range of 0.2 to 99.9:99.8 to 0.1.

* * * * *